(12) United States Patent
Kusama et al.

(10) Patent No.: US 9,632,217 B2
(45) Date of Patent: *Apr. 25, 2017

(54) LIGHT DIFFUSION FILMS AND COMPOSITIONS FOR PREPARING THE SAME

(71) Applicant: LINTEC Corporation, Itabashi-Ku, Tokyo (JP)

(72) Inventors: Kentaro Kusama, Tokyo (JP); Baku Katagiri, Tokyo (JP); Tomoo Orui, Tokyo (JP); Satoru Shoshi, Tokyo (JP)

(73) Assignee: LINTEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/774,678

(22) PCT Filed: Feb. 4, 2014

(86) PCT No.: PCT/JP2014/052482
§ 371 (c)(1),
(2) Date: Sep. 10, 2015

(87) PCT Pub. No.: WO2014/156304
PCT Pub. Date: Oct. 2, 2014

(65) Prior Publication Data
US 2016/0033692 A1     Feb. 4, 2016

(30) Foreign Application Priority Data

Mar. 29, 2013   (JP) .................. 2013-072888

(51) Int. Cl.
*G02B 5/02* (2006.01)
*C08F 283/00* (2006.01)
*C08F 290/14* (2006.01)

(52) U.S. Cl.
CPC ........ *G02B 5/0236* (2013.01); *C08F 283/006* (2013.01); *C08F 290/147* (2013.01);
(Continued)

(58) Field of Classification Search
CPC ........ G02B 5/02; G02B 5/0205; G02B 5/021; G02B 5/0215; G02B 5/0231; G02B 5/0268; G02B 5/0273; G02B 5/0278
(Continued)

(56) References Cited

U.S. PATENT DOCUMENTS

| 6,424,395 B1 | 7/2002 | Sato et al. | |
| 2014/0340752 A1* | 11/2014 | Kusama | G02B 5/021 359/599 |
| 2016/0047952 A1* | 2/2016 | Kusama | G02B 5/0236 252/582 |

FOREIGN PATENT DOCUMENTS

| JP | 2006-323379 A | 11/2006 |
| JP | 2009-179704 A | 8/2009 |

(Continued)

OTHER PUBLICATIONS

English translation of JP2012-141592A, published Jul. 26, 2012.*
English translation of JP2012-141593A, published Jul. 26, 2012.*
English translation of JP2009-179704A, published Aug. 13, 2009.*

*Primary Examiner* — Arnel C Lavarias
(74) *Attorney, Agent, or Firm* — Renner, Kenner; Arthur M. Reginelli

(57) ABSTRACT

A composition for light diffusion film in which the angle of aperture of diffused light in a light diffusion film obtainable therefrom can be expanded effectively, and a light diffusion film obtainable by the composition for light diffusion film are provided.

7 Claims, 43 Drawing Sheets

(52) U.S. Cl.
CPC ......... *G02B 5/0257* (2013.01); *G02B 5/0268* (2013.01); *G02B 5/0278* (2013.01); *C08J 2367/02* (2013.01); *C08J 2433/06* (2013.01); *C08J 2475/16* (2013.01); *G02B 2207/123* (2013.01)

(58) Field of Classification Search
USPC ........ 359/599, 601, 609, 613; 428/156, 167, 428/169, 172
See application file for complete search history.

(56) References Cited

FOREIGN PATENT DOCUMENTS

| | | | |
|---|---|---|---|
| JP | 2012-141591 A | | 7/2012 |
| JP | 2012-141592 A | | 7/2012 |
| JP | 2012-246344 A | | 12/2012 |
| JP | 2013195672 A | * | 9/2013 |

* cited by examiner

LIGHT DIFFUSION INCIDENT ANGLE REGION

Fig.4(a) LIGHT DIFFUSION INCIDENT ANGLE REGION
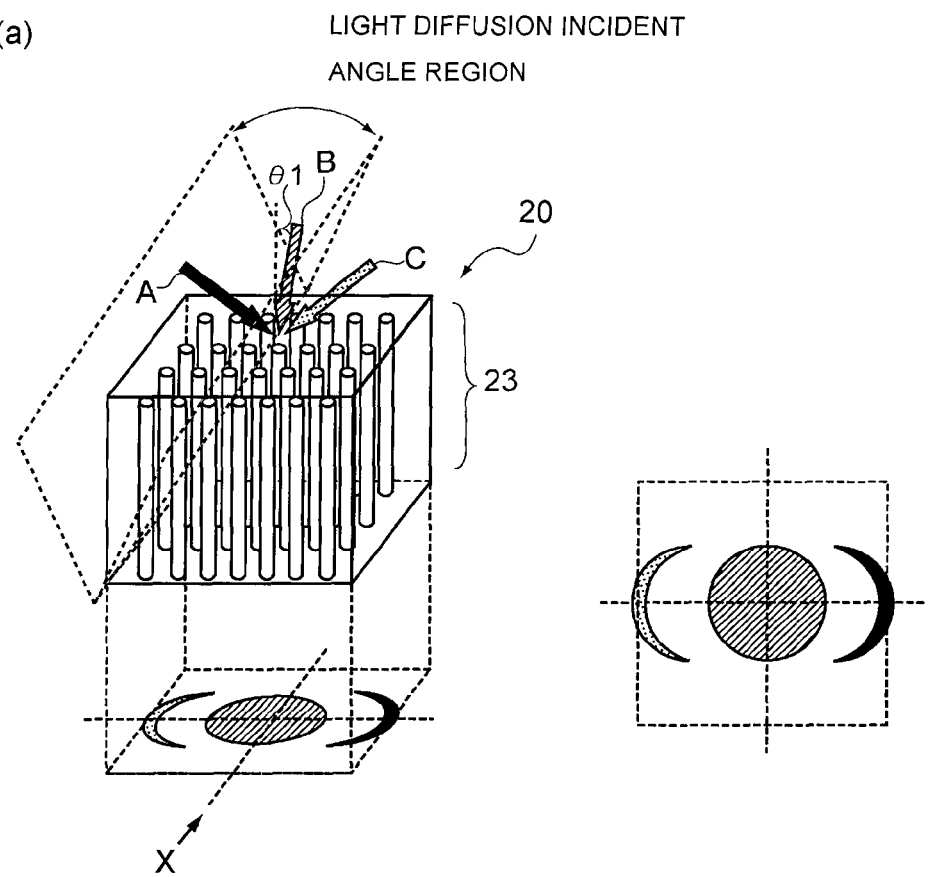
Fig.4(b)
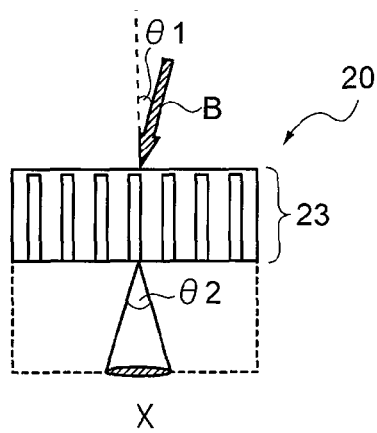

LIGHT DIFFUSION INCIDENT ANGLE REGION

LIGHT DIFFUSION INCIDENT ANGLE REGION

Example1 (θ1=10°)

Example1 (θ1=20°)

Example1 (θ1=30°)

Example2 (θ1=10°)

Example2 (θ1=20°)

Example2 (θ1=30°)

Example3 (θ1=10°)

Example3 (θ1=20°)

Example3 (θ1=30°)

Comparative Example1
(θ1=10°)

Comparative Example1
(θ1=20°)

Comparative Example1
(θ1=30°)

Example1 ( θ1=40° )

Example1 ( θ1=50° )

Example1 ( θ1=60° )

Example2 ( θ1=40° )

Example2 ( θ1=50° )

Example2 ( θ1=60° )

Example3 ( θ1=40° )

Example3 ( θ1=50° )

Example3 ( θ1=60° )

Comparative Example1
( θ1=40° )

Comparative Example1
( θ1=50° )

Comparative Example1
( θ1=60° )

Example4 ($\theta 1=10°$)

Example4 ($\theta 1=20°$)

Example4 ($\theta 1=30°$)

Example5 ($\theta 1=10°$)

Example5 ($\theta 1=20°$)

Example5 ($\theta 1=30°$)

Comparative Example1
($\theta 1=10°$)

Comparative Example1
($\theta 1=20°$)

Comparative Example1
($\theta 1=30°$)

Example4 (θ1=40°)

Example4 (θ1=50°)

Example4 (θ1=60°)

Example5 (θ1=40°)

Example5 (θ1=50°)

Example5 (θ1=60°)

Comparative Example1
(θ1=40°)

Comparative Example1
(θ1=50°)

Comparative Example1
(θ1=60°)

Example6 ($\theta 1=10°$)

Example6 ($\theta 1=20°$)

Example6 ($\theta 1=30°$)

Example7 ($\theta 1=10°$)

Example7 ($\theta 1=20°$)

Example7 ($\theta 1=30°$)

Comparative Example1 ($\theta 1=10°$)

Comparative Example1 ($\theta 1=20°$)

Comparative Example1 ($\theta 1=30°$)

Example6 (θ1=40°)

Example6 (θ1=50°)

Example6 (θ1=60°)

Example7 (θ1=40°)

Example7 (θ1=50°)

Example7 (θ1=60°)

Comparative Example1
(θ1=40°)

Comparative Example1
(θ1=50°)

Comparative Example1
(θ1=60°)

Example8 ($\theta 1=10°$)

Example8 ($\theta 1=20°$)

Example8 ($\theta 1=30°$)

Example1 ($\theta 1=10°$)

Example1 ($\theta 1=20°$)

Example1 ($\theta 1=30°$)

Comparative Example1
($\theta 1=10°$)

Comparative Example1
($\theta 1=20°$)

Comparative Example1
($\theta 1=30°$)

Example8 ($\theta 1=40°$)

Example8 ($\theta 1=50°$)

Example8 ($\theta 1=60°$)

Example1 ($\theta 1=40°$)

Example1 ($\theta 1=50°$)

Example1 ($\theta 1=60°$)

Comparative Example1
($\theta 1=40°$)

Comparative Example1
($\theta 1=50°$)

Comparative Example1
($\theta 1=60°$)

Example9 ($\theta 1=10°$)

Example9 ($\theta 1=20°$)

Example9 ($\theta 1=30°$)

Comparative Example3
($\theta 1=10°$)

Comparative Example3
($\theta 1=20°$)

Comparative Example3
($\theta 1=30°$)

Example9 (θ1=40°)

Example9 (θ1=50°)

Example9 (θ1=60°)

Comparative Example3
(θ1=40°)

Comparative Example3
(θ1=50°)

Comparative Example3
(θ1=60°)

GLASS SIDE

GLASS SIDE
155μm
175μm
7°

Comparative Example4
($\theta 1=10°$)

Comparative Example4
($\theta 1=20°$)

Comparative Example4
($\theta 1=30°$)

Example1 ($\theta 1=10°$)

Example1 ($\theta 1=20°$)

Example1 ($\theta 1=30°$)

Comparative Example1
($\theta 1=10°$)

Comparative Example1
($\theta 1=20°$)

Comparative Example1
($\theta 1=30°$)

Comparative Example4
($\theta 1=40°$)

Comparative Example4
($\theta 1=50°$)

Comparative Example4
($\theta 1=60°$)

Example1 ($\theta 1=40°$)

Example1 ($\theta 1=50°$)

Example1 ($\theta 1=60°$)

Comparative Example1
($\theta 1=40°$)

Comparative Example1
($\theta 1=50°$)

Comparative Example 1 ($\theta 1=60°$)

LIGHT DIFFUSION FILMS AND COMPOSITIONS FOR PREPARING THE SAME

TECHNICAL FIELD

The present invention relates to a composition for light diffusion film, and to a light diffusion film.

Particularly, the present invention relates to a composition for light diffusion film by which the angle of aperture of diffused light in a light diffusion film obtainable therefrom can be expanded effectively, and a light diffusion film obtained by photocuring the composition for light diffusion film.

BACKGROUND ART

Conventionally, for example, in the field of optical technology to which liquid crystal display devices and the like belong, it has been suggested to use a light diffusion film which can diffuse an incident light coming from a particular direction into particular directions, while directly transmitting an incident light coming from other directions.

A variety of forms of such a light diffusion film are known; however, in particular, a light diffusion film having, within the film, a louver structure in which plural plate-shaped regions having different refractive indices are alternately arranged in one arbitrary direction along the film plane, has been widely used.

Furthermore, regarding another type of light diffusion film, a light diffusion film having, within the film, a columnar structure in which plural pillar-shaped objects having a relatively high refractive index are arranged to stand close together in regions having a relatively low refractive index, has been widely used.

Meanwhile, it is known that such a light diffusion film having a louver structure or a columnar structure is obtained by irradiating a coating layer that is formed by applying a composition for light diffusion film containing two or more kinds of polymerizable compounds having different refractive indices into a film form, with active energy radiation by a predetermined method.

That is, a light diffusion film having a predetermined internal structure can be obtained by curing the coating layer while subjecting the two or more kinds of polymerizable compounds in the coating layer to phase separation, by irradiating the coating layer with predetermined active energy radiation having a controlled direction of propagation.

Therefore, in order to obtain a high-quality light diffusion film having a more well-defined internal structure and having satisfactory incident angle dependency in transmission and diffusion of light, there has been suggested a composition for light diffusion film, which can achieve phase separation of two or more kinds of polymerizable compounds more efficiently, and can photocure the polymerizable compounds more stably (for example, Patent Documents 1 and 2).

That is, Patent Document 1 discloses a composition for anisotropic light diffusion film including a biphenyl compound represented by the following Formula (11) as component (A), and a polymerizable compound having a weight average molecular weight value within the range of 3,000 to 20,000 as component (B), characterized in that the content of the component (A) is adjusted to a value within the range of 25 parts to 400 parts by weight relative to 100 parts by weight of the component (B):

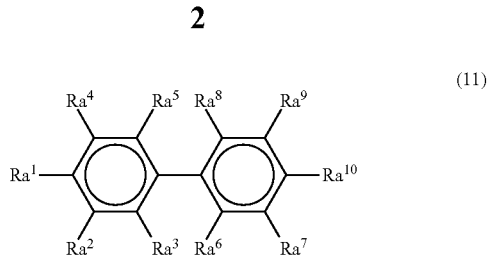

wherein in Formula (11), $Ra^1$ to $Ra^{10}$ are respectively independent of one another; and at least one of $Ra^1$ to $Ra^{10}$ represents a substituent represented by the following Formula (12), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

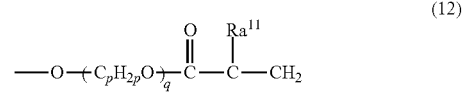

wherein in Formula (12), $Ra^{11}$ represents a hydrogen atom or a methyl group; the number of carbon atoms p represents an integer from 1 to 4; and the number of repetition q represents an integer from 1 to 10.

Furthermore, Patent Document 2 discloses a composition for an anisotropic light diffusion film, which includes a (meth)acrylic acid ester containing plural aromatic rings as component (A); and a urethane (meth)acrylate having a weight average molecular weight value within the range of 3,000 to 20,000 as component (B), characterized in that the urethane (meth)acrylate as the component (B) is a compound derived from the following components (a) to (c) as constituent components and is composed of the components at a molar ratio of component (a):component (b):component (c)=1 to 5:1:1 to 5, and the content of the component (A) is adjusted to a value within the range of 25 parts to 400 parts by weight relative to 100 parts by weight of the component (B):

(a) a compound containing two isocyanate groups via an aliphatic ring;
(b) a polyalkylene glycol; and
(c) a hydroxyalkyl (meth)acrylate.

CITATION LIST

Patent Document

Patent Document 1: JP 2012-141591 A (Claims)
Patent Document 2: JP 2012-141592 A (Claims)

DISCLOSURE OF THE INVENTION

Problem to be Solved by the Invention

However, in regard to the light diffusion films obtained by photocuring the compositions for anisotropic light diffusion films described in Patent Documents 1 and 2, there may be some variance depending on conditions such as the amount of addition of the photopolymerization initiator, the weight average molecular weight of the urethane (meth)acrylate as the component (B), and the temperature of the coating layer; however, there have been occasions of having an insufficient angle of aperture of diffused light or the like in the resulting light diffusion films, depending on the applications in the field of optical technology.

Thus, in view of such circumstances as described above, the inventors of the present invention conducted a thorough investigation, and the inventors found that when a (meth) acrylic acid ester having a particular structure, a urethane (meth)acrylate, a photopolymerization initiator, and an ultraviolet absorber are mixed at predetermined proportions, and then the mixture is cured, a light diffusion film having the angle of aperture of diffused light expanded effectively can be obtained. Thus, the inventors completed the present invention.

That is, an object of the present invention is to provide a composition for light diffusion film by which the angle of aperture of diffused light in a light diffusion film obtainable from the composition can be expanded effectively, and a light diffusion film obtained by photocuring the composition for light diffusion film.

Means for Solving Problem

According to an aspect of the present invention, there is provided a composition for light diffusion film intended for obtaining a light diffusion film which contains an internal structure including plural regions having a relatively high refractive index in a region having a relatively low refractive index, and in which the plural regions having a relatively high refractive index are each bent at an intermediate point along the film thickness direction, the composition for light diffusion film including a (meth)acrylic acid ester containing plural aromatic rings as component (A); a urethane (meth) acrylate as component (B); a photopolymerization initiator as component (C); and an ultraviolet absorber as component (D), characterized in that the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount, taken as 100 parts by weight, of the component (A) and the component (B), and the content of the component (D) is adjusted to a value within the range of below 2 parts by weight relative to the total amount, taken as 100 parts by weight, of the component (A) and the component (B). Thus, the problems described above can be solved.

That is, with the composition for light diffusion film of the present invention, since a (meth)acrylic acid ester having a particular structure as the component (A) is incorporated, and also, a urethane (meth)acrylate as the component (B) is incorporated, a predetermined difference is generated between the respective rates of polymerization (for example, rate of photoradical polymerization) of the components, and thus the two components can be prevented from being uniformly copolymerized.

This is speculated to be because compatibility between the component (A) and the component (B) is decreased to a predetermined extent, and thereby copolymerizability between the two components can be decreased.

Therefore, when the composition is irradiated with active energy radiation, the composition can be photocured while the component (A) and the component (B) are caused to undergo phase separation efficiently, and thereby, a predetermined internal structure such as a louver structure or a columnar structure can be formed in a well-defined manner within the film.

Furthermore, since the composition for light diffusion film of the present invention includes a predetermined amount of an ultraviolet absorber as the component (D), when the composition is irradiated with active energy radiation, the composition can selectively absorb an active energy radiation having a predetermined wavelength to a predetermined extent.

As a result, the predetermined internal structure formed in the film can be caused to bend, without inhibiting curing of the composition for light diffusion film, and thereby the angle of aperture of diffused light in the resulting light diffusion film can be expanded effectively.

Meanwhile, according to the present invention, the "angle of aperture of diffused light" means the width of the angle range of diffused light (hereinafter, may be referred to as "light diffusion angle region") obtainable when a point light source is fixed at an angle at which incident light is diffused most in a light diffusion film.

Furthermore, on the occasion of configuring the composition for light diffusion film of the present invention, it is preferable that the component (D) has an absorption peak for light having a wavelength of 330 nm to 380 nm.

When such a configuration is adopted, the predetermined internal structure can be caused to bend in a more well-defined manner, and thereby, the angle of aperture of diffused light in the resulting light diffusion film can be expanded more effectively.

Furthermore, on the occasion of configuring the composition for light diffusion film of the present invention, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

When such a configuration is adopted, the predetermined internal structure can be caused to bend in a more well-defined manner, and thereby the angle of aperture of diffused light in the resulting light diffusion film can be expanded more effectively.

Furthermore, on the occasion of configuring the composition for light diffusion film of the present invention, it is preferable that the component (A) is represented by the following Formula (1):

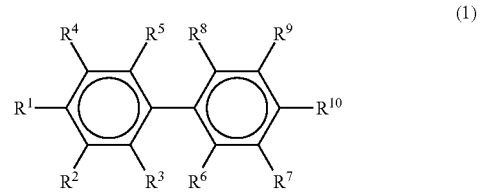

wherein in Formula (1), $R^1$ to $R^{10}$ are respectively independent of one another; and at least one of $R^1$ to $R^{10}$ represents a substituent represented by the following Formula (2), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

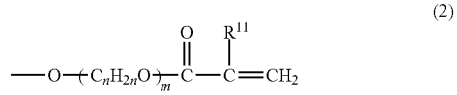

wherein in Formula (2), $R^{11}$ represents a hydrogen atom or a methyl group; the number of carbon atoms n represents an integer from 1 to 4; and the number of repetitions m represents an integer from 1 to 10.

When such a configuration is adopted, the predetermined internal structure can be formed in a more well-defined manner, and thereby the angle of aperture of diffused light in the resulting light diffusion film can be expanded more effectively.

Furthermore, on the occasion of configuring the composition for light diffusion film of the present invention, it is preferable that, in Formula (1), any one of $R^2$ to $R^9$ represents a substituent represented by Formula (2).

When such a configuration is adopted, the predetermined internal structure can be formed in a more well-defined manner, and thereby the angle of aperture of diffused light in the resulting light diffusion film can be expanded more effectively.

Furthermore, on the occasion of configuring the composition for light diffusion film of the present invention, it is preferable that the component (B) is a urethane (meth) acrylate which has a weight average molecular weight value within the range of 3,000 to 20,000, has constituent components derived from the following components (B1) to (B3), and is composed at a molar ratio of component (B1):component (B2):component (B3)=1 to 5:1:1 to 5:

(B1) a compound containing two isocyanate groups via an aliphatic ring;
(B2) a polyalkylene glycol; and
(B3) a hydroxyalkyl (meth)acrylate.

When such a configuration is adopted, the predetermined internal structure can be formed in a more well-defined manner, and thereby the angle of aperture of diffused light in the resulting light diffusion film can be expanded more effectively.

Furthermore, according to another aspect of the present invention, there is provided a light diffusion film which contains an internal structure including plural regions having a relatively high refractive index in a region having a relatively low refractive index, and in which the plural regions having a relatively high refractive index are each bent at an intermediate point along the film thickness, the light diffusion film being formed by irradiating a composition for light diffusion film with active energy radiation, and the composition for light diffusion film including a (meth) acrylic acid ester containing plural aromatic rings as component (A), a urethane (meth)acrylate as component (B), a photopolymerization initiator as component (C), and an ultraviolet absorber as component (D), characterized in that the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount, taken as 100 parts by weight, of the component (A) and the component (B), and the content of the component (D) is adjusted to a value of below 2 parts by weight relative to the total amount, taken as 100 parts by weight, of the component (A) and the component (B).

That is, since the light diffusion film of the present invention is formed by photocuring a predetermined composition for light diffusion film, a predetermined internal structure within the film has a bending, and therefore, the angle of aperture of diffused light can be expanded effectively.

BRIEF DESCRIPTION OF DRAWINGS

FIGS. 4(a) and 4(b) are diagrams provided in order to explain the incident angle dependency and isotropic light diffusion in a light diffusion film which includes a columnar structure inside the film.

MODE(S) FOR CARRYING OUT THE INVENTION

First Embodiment

A first embodiment relates to a composition for light diffusion film for obtaining a light diffusion film which contains an internal structure including plural regions having a relatively high refractive index in a region having a relatively low refractive index within a film, and in which the plural regions having a relatively high refractive index are each bent at an intermediate point along the film thickness direction, the composition for light diffusion film including a (meth)acrylic acid ester containing plural aromatic rings as component (A); a urethane (meth)acrylate as component (B); a photopolymerization initiator as component (C)); and an ultraviolet absorber as component (D), characterized in that the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount, taken as 100 parts by weight, of the component (A) and the component (B), and the content of the component (D) is adjusted to a value of below 2 parts by weight relative to the total amount, taken as 100 parts by weight, of the component (A) and the component (B).

Hereinafter, the first embodiment of the present invention will be explain specifically with appropriate reference to the drawings; however, in order to facilitate the understanding of such explanations, first, the fundamental principles of light diffusion in a light diffusion film will be explained.

1. Fundamental principles of light diffusion in light diffusion film (1) Anisotropic Light Diffusion First of all, a light diffusion film having anisotropic light diffusion characteristics will be explained using FIGS. 1 and 2.

Figure 1A:
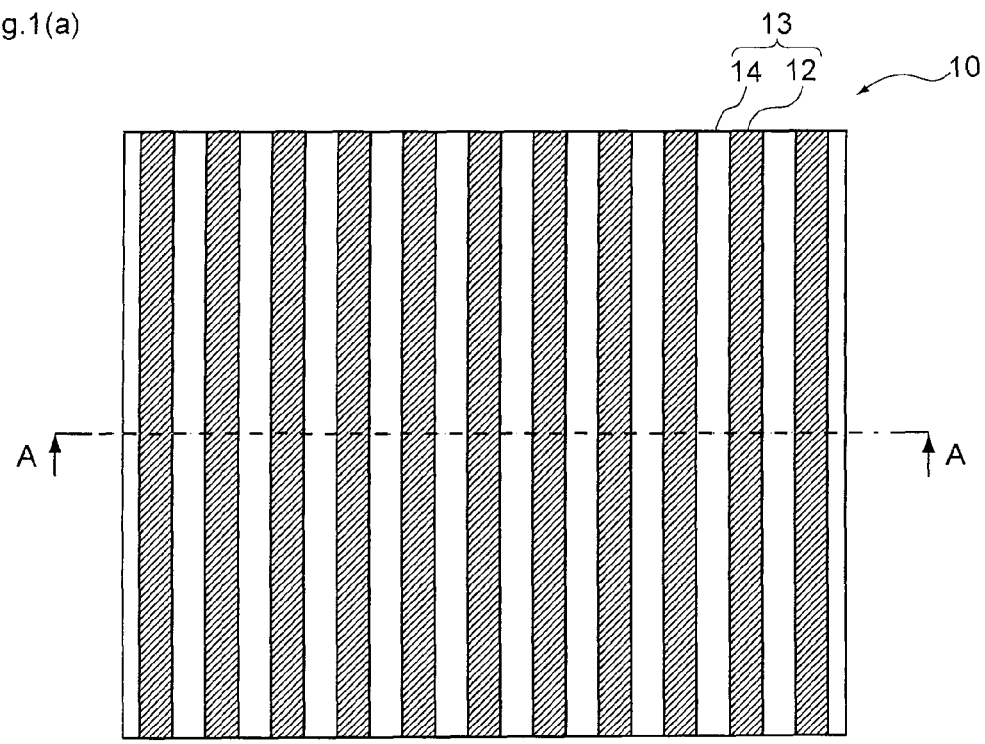
FIGS. 1(a) and 1(b) are diagrams provided in order to explain the outline of a light diffusion film which includes a louver structure inside the film.
Figure 1B:
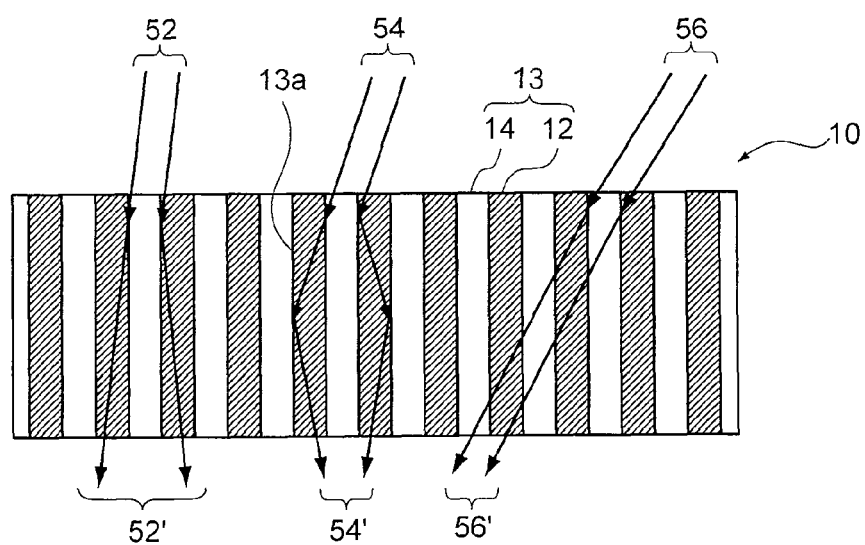

First, FIG. 1(a) shows a top view (plan view) of an anisotropic light diffusion film 10, and FIG. 1(b) shows a cross-sectional view of the anisotropic light diffusion film 10 illustrated in FIG. 1(a) in a case in which the anisotropic light diffusion film 10 is cut in a perpendicular direction along the dotted line A-A, and the cut surface is viewed from the direction indicated by the arrow.

Figure 2A:
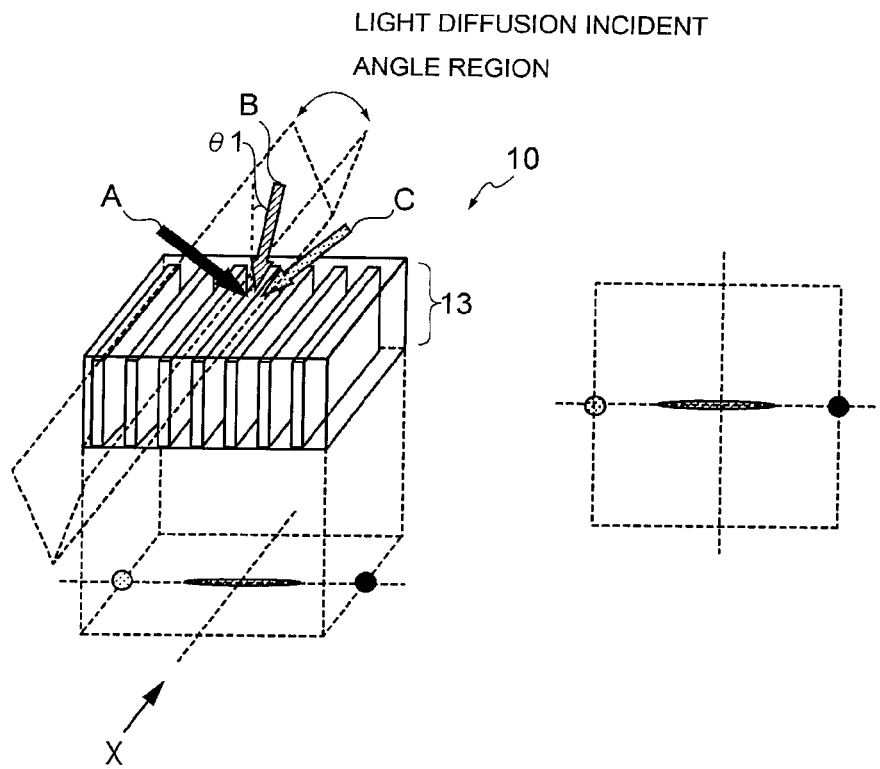
FIGS. 2(a) and 2(b) are diagrams provided in order to explain the incident angle dependency and anisotropic light diffusion in a light diffusion film which includes a louver structure inside the film.
Figure 2B:
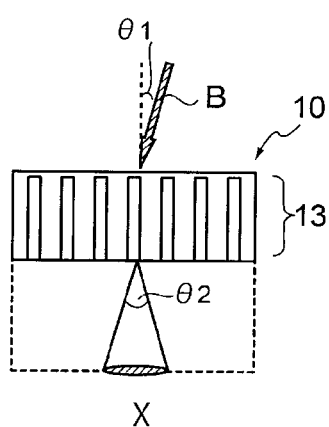

Furthermore, FIG. 2(a) shows an overall view of the anisotropic light diffusion film 10 which includes a louver structure inside the film, and FIG. 2(b) shows a cross-sectional view of the anisotropic light diffusion film 10 of FIG. 2(a) viewed from the X direction.

As shown in the plan view of FIG. 1(a), the anisotropic light diffusion film 10 is provided with a louver structure 13, in which plate-shaped regions with comparatively high refractive index 12 and plate-shaped regions with comparatively low refractive index 14 are alternately arranged in parallel in any one arbitrary direction along the film plane.

Furthermore, as shown in the cross-sectional view of FIG. 1(b), the plate-shaped regions with comparatively high refraction index 12 and the plate-shaped regions with comparatively low refractive index 14 have each a predetermined thickness and maintain the state of being alternately arranged in parallel even in the normal direction relative to the anisotropic light diffusion film 10 (the film thickness direction).

As a result, as shown in FIG. 2(a), it is presumed that, when the angle of the incident light falls within a light diffusion incident angle region, it is diffused by the anisotropic light diffusion film 10.

That is, as illustrated in FIG. 1(b), it is speculated that when the incident angle of light that is incident to an anisotropic light diffusion film 10 has a value from parallel to a predetermined angle range, that is, a value within a light diffusion incident angle region, with respect to the boundary surface 13a of the louver structure 13, incident light (52, 54) escapes from the interior of the plate-shaped region 12 having a relatively high refractive index in the louver structure, along the film thickness direction while changing its direction, and thus the direction of propagation of light from the light exit surface side is not uniform.

As a result, it is presumed that, when the incident light falls within the light diffusion incident angle region, it is diffused by the anisotropic light diffusion film 10 and becomes the diffused light (52', 54').

On the other hand, it is presumed that, when the angle of the incident light relative to the anisotropic light diffusion film 10 falls outside the light diffusion incident angle region, as shown in FIG. 1(b), the incident light 56 is directly transmitted through the anisotropic light diffusion film 10, without being diffused by the anisotropic light diffusion film, and becomes the transmitted light 56'.

Meanwhile, in the present invention, the term "light diffusion incident angle region" means, with respect to the light diffusion film, the range of angles of incident light corresponding to the emission of a diffused light, when the angle of incident light is changed from a point light source.

Furthermore, such a "light diffusion incident angle region" is an angle region determined for each light diffusion film due to the shape of the louver structure or the like in the light diffusion film, the difference in refractive index, the angle of inclination and the like, as illustrated in FIG. 2(a), FIG. 4(a), FIG. 5(a), and FIG. 6(a).

Based on the above-described fundamental principles, an anisotropic light diffusion film 10 provided with a louver structure 13, may exhibit, for example, an incident angle dependency in the transmission and diffusion of light as shown in FIG. 2(a).

Furthermore, as shown in FIG. 2(a), an anisotropic light diffusion film 10 which includes a louver structure 13, typically, exhibits light diffusion characteristics of "anisotropy".

Here, in the present invention, as shown in FIG. 2(a), the term "anisotropy" means that, when an incident light is diffused by the film, the diffusion state of light for the emitted light that has been diffused in a plane parallel to the film (shape of expansion of the diffused light) has different properties depending on the direction within the same plane.

More specifically, as illustrated in FIG. 2(a), it is speculated that, among the components included in an incident light, diffusion of light occurs selectively for a component that is perpendicular to the direction of the louver structure extended along any one arbitrary direction along the film plane, while diffusion of light does not occur easily for a component that is included in the incident light and is parallel to the direction of the louver structure, and therefore, anisotropic light diffusion is realized.

Therefore, as shown in FIG. 2(a), in a light diffusion film presenting anisotropy, the shape of expansion of the diffused light has a rod shape.

Furthermore, as described above, in an anisotropic light diffusion film, since the component of an incident light capable of contributing to light diffusion is a component that is perpendicular to the direction of the louver structure extended along any one arbitrary direction along the film plane, as illustrated in FIG. 2(b), the expression "incident angle θ1" of incident light is intended to mean the incident angle of a component that is perpendicular to the direction of the louver structure extended along ay one arbitrary direction along the film plane. Also, in this case, the incident angle θ1 is intended to mean the angle (°) when the angle with respect to the normal line of the incident side surface of the light diffusion film is designated as 0°.

Furthermore, in the present invention, the "light diffusion angle region" means the range of angles of the diffused light obtained by fixing a point light source at an angle for which the incident light is the most diffused.

Furthermore, in regard to an anisotropic light diffusion film, the "angle of aperture of diffused light" is the width of the "light diffusion angle region" described above, and as illustrated in FIG. 2(b), the "angle of aperture of diffused light" is intended to mean the angle of aperture θ2 of diffused light in a case in which a cross-section of the film is viewed from a direction parallel to the direction of the louver structure extended along any one arbitrary direction along the film plane.

Furthermore, as shown in FIG. 2(a), an anisotropic light diffusion film is such that, if the angle of the incident light is included in the light diffusion incident angle region, even if the incident angles are different, almost similar light diffusion can be induced at the light emitting surface side.

Therefore, it can be said that an anisotropic light diffusion film has a light-converging action of concentrating light to a predetermined spot.

Meanwhile, in addition to a case where the changes of direction of an incident light inside the region with comparatively high refractive index 12 of the louver structure are of a step-index type, with zigzag changes of direction by total reflection following a straight line as shown in FIG. 1(b), a case where they are of a gradient-index type, with changes of direction following a curve, is also considered.

Furthermore, in FIGS. 1(a) and 1(b), for simplicity, the interface between the plate-shaped region with comparatively high refractive index 12 and the plate-shaped region with comparatively low refractive index 14 is represented by a straight line but, in reality, the interface is slightly meandering and each of the plate-shaped regions is formed of a complex refractive index distribution structure with ramifications and extinctions.

As a result, it is presumed that a distribution of non-uniform optical properties enhances the light diffusion characteristics.

(2) Isotropic Light Diffusion

Next, a light diffusion film having isotropic light diffusion characteristics will be explained using FIGS. 3 and 4.

Figure 3A:
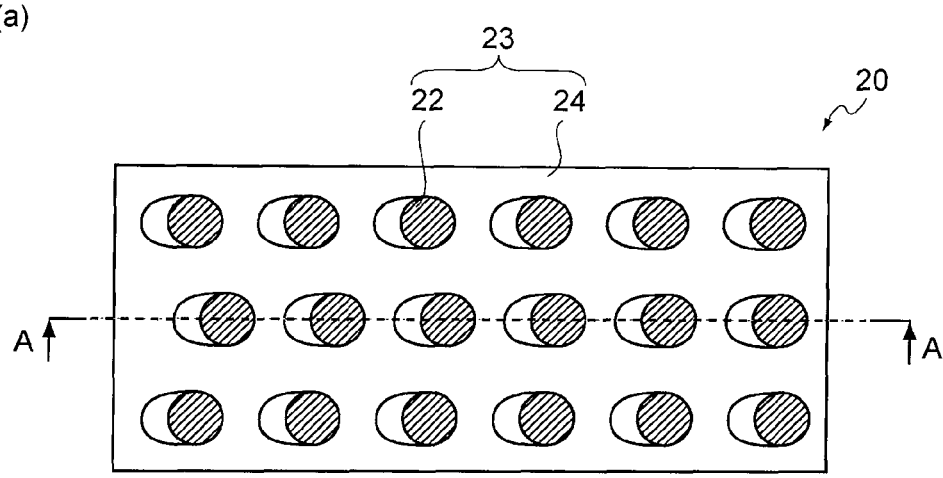
FIGS. 3(a) and 3(b) are diagrams provided in order to explain the outline of a light diffusion film which includes a columnar structure inside the film.
Figure 3B:
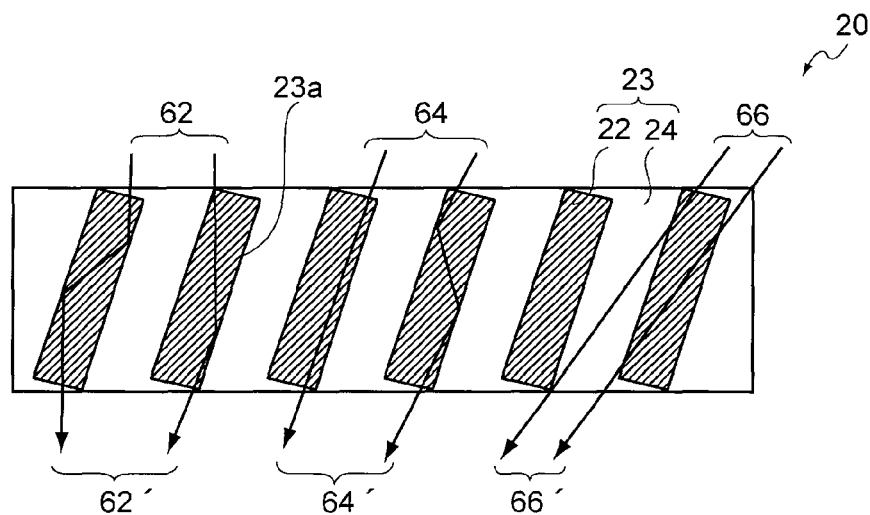

First, FIG. 3(a) illustrates a top view (plan view) of an isotropic light diffusion film 20, and FIG. 3(b) illustrates a cross-sectional view of the isotropic light diffusion film 20 in a case in which the isotropic light diffusion film 20 illustrated in FIG. 3(a) is cut in a perpendicular direction along the dotted line A-A, and the cut surface is viewed from the direction indicated by the arrow.

Furthermore, FIG. 4(a) shows an overall view of the isotropic light diffusion film 20 which includes a columnar structure inside the film, and FIG. 4(b) shows a cross-sectional view of the isotropic light diffusion film 20 of FIG. 4(a) viewed from the X direction.

In a plan view such as shown in FIG. 3(a), the isotropic light diffusion film 20 contains a columnar structure 23 composed of pillars with comparatively high refractive index 22 and a region with comparatively low refractive index 24.

Furthermore, as shown in the cross-sectional view of FIG. 3(b), the pillars with comparatively high refraction index 22 and the region with comparatively low refractive index 24 maintain the state of being alternately arranged in the normal direction relative to the isotropic light diffusion film 20 (the film thickness direction) with a predetermined width.

As a result, as shown in FIG. 4(a), it is presumed that, when the angle of the incident light falls within a light diffusion incident angle region, it is diffused by the isotropic light diffusion film 20.

That is, as illustrated in FIG. 3(b), it is speculated that when the incident angle of light incident to the isotropic light diffusion film 20 has a value in a predetermined angle range, that is, a value within a light diffusion incident angle region, with respect to the boundary surface 23a of the columnar structure 23, incident light (62, 64) escapes from the interior of the pillar-shaped objects 22 having a relatively high refractive index in the columnar structure, along the film thickness direction while changing its direction, and thus the direction of propagation of light from the light exit surface side is not uniform.

As a result, it is presumed that, when the incident light falls within the light diffusion incident angle region, it is diffused by the isotropic light diffusion film 20, and becomes the diffused light (62', 64').

On the other hand, it is presumed that, when the angle of the incident light relative to the isotropic light diffusion film 20 falls outside the light diffusion incident angle region, as shown in FIG. 3(b), the incident light 66 is directly transmitted through the isotropic light diffusion film 20, without being diffused by the isotropic light diffusion film, and becomes the transmitted light 66'.

Therefore, based on the same fundamental principles as the above-described anisotropic light diffusion film, an isotropic light diffusion film 20 provided with a columnar structure 23 can exhibit, for example, an incident angle dependency with the transmission and diffusion of light as shown in FIG. 4(a).

However, as shown in FIG. 4(a), an isotropic light diffusion film which includes a columnar structure 23, typically, presents light diffusion characteristics of "isotropy".

This is speculated to be because the columnar structure 23 is not a structure that is continuously formed along any one arbitrary direction along the film plane as in the case of the louver structure 13.

Here, in the present invention, the term "isotropy" means that, as shown in FIG. 4(a), when an incident light is diffused by the film, the diffusion state of light for the emitted light that has been diffused in a plane parallel to the film (shape of expansion of the diffused light) does not change properties depending on the direction within the same plane.

More specifically, as shown in FIG. 4(a), the diffusion state of the emitted light that has been diffused has a circular shape in a plane parallel to the film.

Furthermore, in regard to an isotropic light diffusion film, the component of incident light that contributes to light diffusion is not particularly limited, unlike an anisotropic light diffusion film.

Therefore, the expression "incident angle $\theta 1$" of the incident angle in an isotropic film means, simply, the angle (°) in a case for which the angle relative to the normal of the incident side surface of the isotropic film is 0°.

Since other contents are redundant with the explanation of the above-described anisotropic light diffusion film, they will be omitted.

(3) Bending of Internal Structure

Next, the basic configuration of a light diffusion film obtainable by irradiating the composition for light diffusion film of the present invention with active energy radiation will be explained using FIGS. 5 and 6.

Figure 5A:
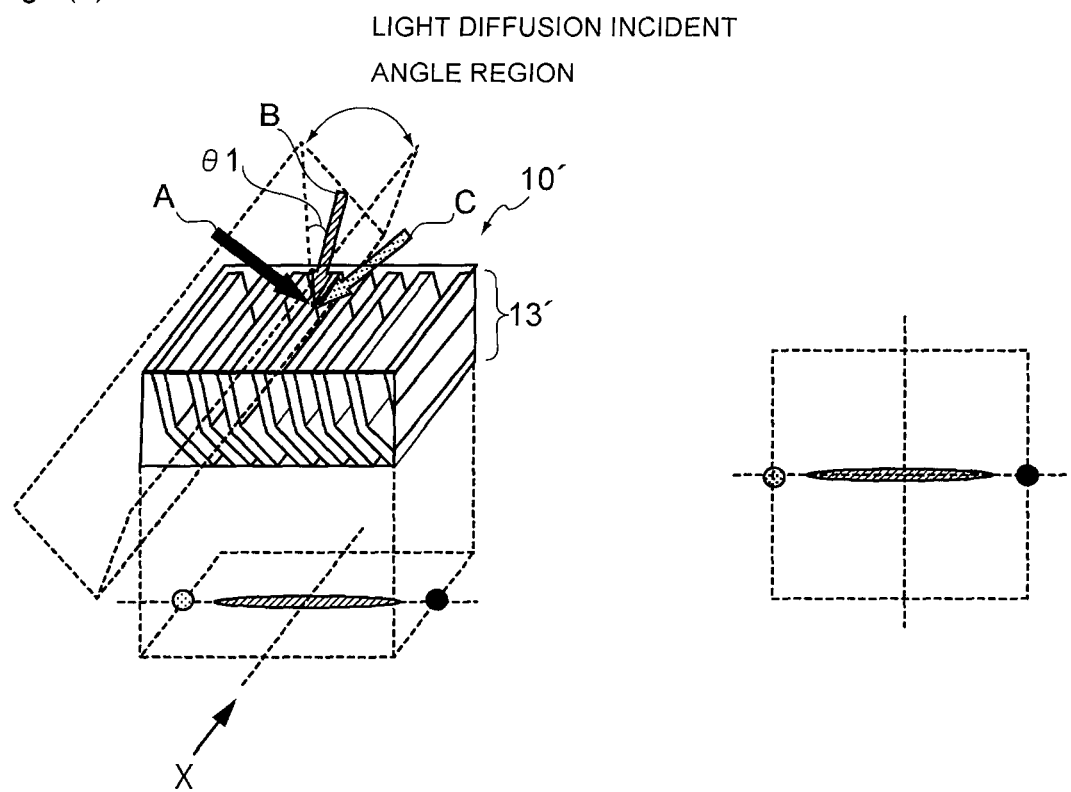
FIGS. 5(a) and 5(b) are diagrams provided to explain the incident angle dependency and anisotropic light diffusion in a light diffusion film having a bent louver structure within the film.
Figure 5B:
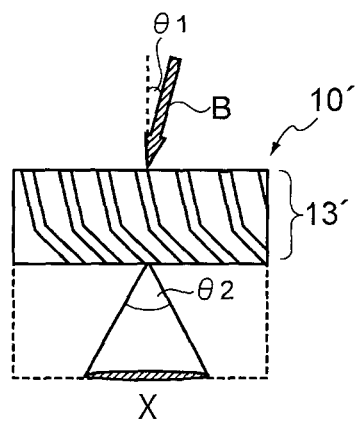

First, FIG. 5(a) presents a general view of an anisotropic light diffusion film 10' having a louver structure 13' with a bending (hereinafter, may be referred to as bent louver structure), and FIG. 5(b) presents a cross-sectional view obtainable when the anisotropic light diffusion film 10' of FIG. 5(a) is viewed from the X-direction.

As illustrated in such FIGS. 5(a) and 5(b), in the bent louver structure 13', plural plate-shaped regions having a relatively high refractive index and plural plate-shaped regions having relatively low refractive index are bent at an intermediate point along the film thickness direction.

The anisotropic light diffusion film 10' having such a bent louver structure 13' has incident angle dependency and anisotropy as its light diffusion characteristics, based on the same principle as in the case of an anisotropic light diffusion film having a conventional louver structure that does not have a bending.

However, in the anisotropic light diffusion film 10' having a bent louver structure 13', as illustrated in FIG. 5(b), the angle of aperture $\theta 2$ of diffused light increases, as compared with an anisotropic light diffusion film having a conventional louver structure.

This is because it can be construed that the bent louver structure has two kinds of louver structures having different angles of inclination of the plate-shaped regions within one sheet of film, with the intermediate point serving as the boundary.

Therefore, it is speculated to be because light that has entered is diffused by the louver structure present in the upper part, and the diffused light is further diffused by the louver structure present in the lower part, and thereby the angle of aperture $\theta 2$ of diffused light is expanded.

Figure 6A:
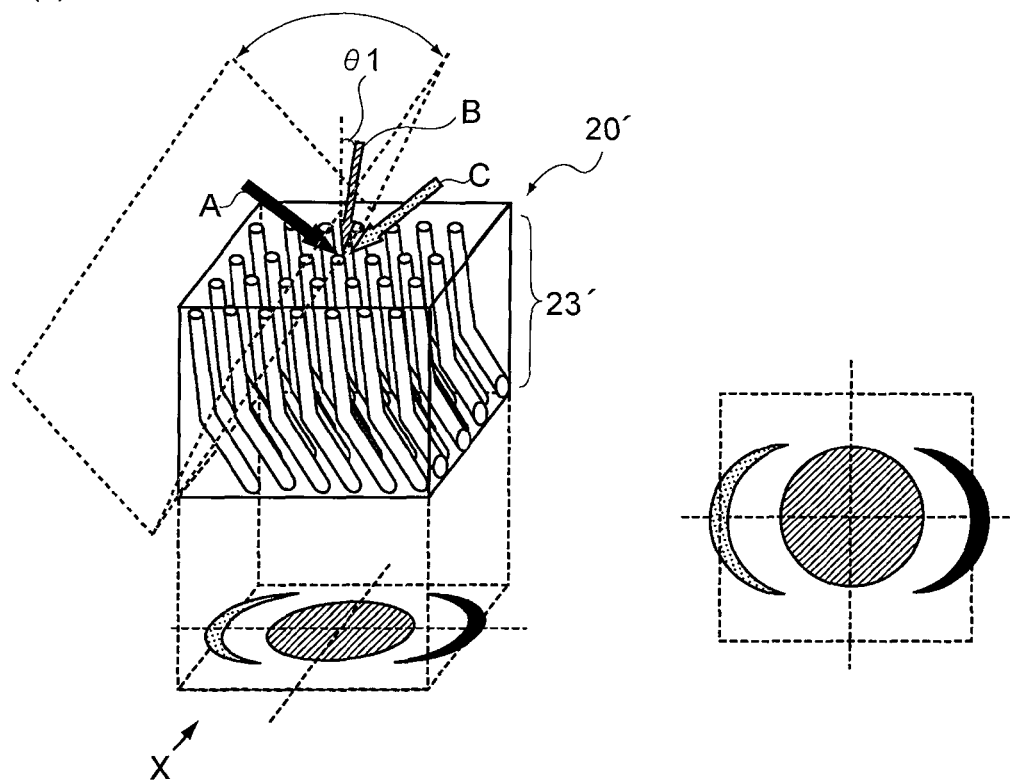
FIGS. 6(a) and 6(b) are diagrams provided to explain the incident angle dependency and isotropic light diffusion in a light diffusion film having a bent columnar structure within the film.
Figure 6B:
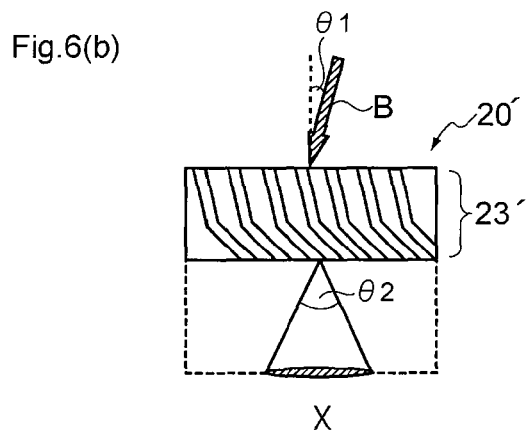

Furthermore, FIG. 6(a) presents a general view of an isotropic light diffusion film 20' having a columnar structure with a bending 23' (hereinafter, may be referred to as bent columnar structure), and FIG. 6(b) presents a cross-sectional view obtainable when the isotropic light diffusion film 20' of FIG. 6(a) is viewed from the X-direction.

As illustrated in such FIGS. 6(a) and 6(b), in the bent columnar structure 23', plural pillar-shaped objects having a relatively high refractive index are bent at an intermediate point along the film thickness direction.

An isotropic light diffusion film 20' having such a bent columnar structure 23' has incident angle dependency and isotropy as its light diffusion characteristics, based on the same principle as in the case of an isotropic light diffusion film having a conventional columnar structure that does not have a bending.

However, in the isotropic light diffusion film 20' having a bent columnar structure 23', as illustrated in FIG. 6(b), the angle of aperture $\theta 2$ of diffused light increases, as compared with an anisotropic light diffusion film having a conventional louver structure.

This is because it can be construed that, similarly to the anisotropic light diffusion film having a bent louver structure described above, the bent columnar structure has two kinds of columnar structures having different angles of inclination of the pillar-shaped objects within one sheet of film, with the intermediate point serving as the boundary.

Therefore, it is speculated to be because light that has entered is diffused by the columnar structure present in the upper part, and the diffused light is further diffused by the columnar structure present in the lower part, and thereby the angle of aperture θ2 of diffused light is expanded.

2. Component (A)

(1) Kind

The composition for light diffusion film of the present invention is characterized in that the composition includes a (meth)acrylic acid ester containing plural aromatic rings as component (A).

The reason for this is that, when a particular (meth)acrylic acid ester is incorporated as the component (A), it is speculated that a predetermined difference in the polymerization rate is produced between the component (A) and the component (B) by making the polymerization rate of the component (A) faster than the polymerization rate of the component (B), and thus copolymerizability of the two components can be effectively decreased.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed efficiently.

Furthermore, it is presumed that, by incorporating a particular (meth)acrylic ester as the component (A), sufficient compatibility with the component (B) is obtained when the component (A) is at the stage of a monomer, but at the stage of multiple connections in the course of polymerization, the compatibility with the component (B) can be decreased to a predetermined extent, and the predetermined internal structure can be formed even more efficiently.

Moreover, by incorporating a particular (meth)acrylic ester as the component (A), the refractive index of the region originating from the component (A) in the predetermined internal structure can be increased, and the difference thereof with the refractive index of the region originating from the component (B) can be adjusted to a value greater than or equal to a predetermined value.

Therefore, when a particular (meth)acrylic acid ester is incorporated as the component (A), together with the characteristics of the component (B) that will be described below, a predetermined internal structure such as a louver structure or a columnar structure, which is composed of a region originating from the component (A) and having a relatively high refractive index, and a region originating from the component (B) and having a relatively low refractive index, can be obtained efficiently.

Meanwhile, the term "(meth)acrylic ester containing a plurality of aromatic rings" means a compound having a plurality of aromatic rings in the ester residue moiety of the (meth)acrylic ester.

Furthermore, "(meth)acrylic" means both acrylic and methacrylic.

Furthermore, examples of a (meth)acrylic ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, benzylphenyloxyalkyl (meth)acrylate and the like, or compounds in which some of hydrogen atoms on the aromatic ring have been substituted by halogen, alkyl, alkoxy, halogenated alkyl, or the like.

Furthermore, it is preferable that the composition includes a compound containing a biphenyl ring as the (meth)acrylic acid ester containing plural aromatic rings as the component (A), and it is particularly preferable that the composition includes a biphenyl compound represented by the following Formula (1):

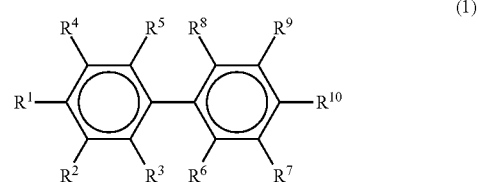

wherein in Formula (1), $R^1$ to $R^{10}$ are respectively independent of one another; and at least one of $R^1$ to $R^{10}$ represents a substituent represented by the following Formula (2), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

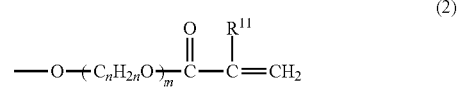

wherein in Formula (2), $R^{11}$ represents a hydrogen atom or a methyl group; the number of carbon atoms n represents an integer from 1 to 4; and the number of repetitions m represents an integer from 1 to 10.

The reason for this is that when the composition includes a biphenyl compound having a particular structure as the component (A), it is speculated that a predetermined difference is produced between the rates of polymerization of the component (A) and the component (B), thus compatibility between the component (A) and the component (B) is decreased to a predetermined extent, and thereby copolymerizability between the two components can be further decreased.

Furthermore, by increasing the refractive index of the region originating from the component (A) in the predetermined internal structure, the difference between the relevant refractive index and the refractive index of the region originating from the component (B) can be more easily adjusted to a value greater than or equal to a predetermined value.

Furthermore, in a case in which $R^1$ to $R^{10}$ in Formula (1) includes any of an alkyl group, an alkoxy group, a halogenated alkyl group, a hydroxyalkyl group, and a carboxyalkyl group, it is preferable that the number of carbon atoms of the alkyl moiety of the substituent is adjusted to a value within the range of 1 to 4.

The reason for this is that, if such a number of carbon atoms has a value of larger than 4, the polymerization rate of the component (A) decreases, or the refractive index of the region originating from the component (A) becomes too low, and it may be difficult to form the predetermined internal structure efficiently.

Therefore, in a case in which $R^1$ to $R^{10}$ in Formula (1) include any of an alkyl group, an alkoxy group, a halogenated alkyl group, a hydroxyalkyl group, and a carboxyalkyl group, it is more preferable to adjust the number of carbon atoms of the alkyl moiety of the substituent to a value within the range of 1 to 3, and it is even more preferable to adjust the number of carbon atoms to a value within the range of 1 to 2.

Furthermore, it is preferable that $R^1$ to $R^{10}$ in Formula (1) each represent a substituent other than a halogenated alkyl group or a halogen atom, that is, a substituent which does not contain halogen.

The reason for this is that generation of dioxin is prevented when the light diffusion film is incinerated or the like, and thereby it is preferable from the viewpoint of environmental protection.

Meanwhile, in regard to a conventional light diffusion film, it has been general, on the occasion of obtaining a predetermined internal structure, to subject a monomer component to halogen substitution for the purpose of imparting a higher refractive index to the monomer component.

From this point of view, when a biphenyl compound represented by Formula (1) is used, a high refractive index can be obtained even if halogen substitution is not performed.

Therefore, with a light diffusion film that is obtained by photocuring the composition for light diffusion film according to the invention, satisfactory incident angle dependency can be manifested even if the light diffusion film does not contain halogen.

Furthermore, it is preferable that any one of $R^2$ to $R^9$ in Formula (1) represents a substituent represented by Formula (2).

The reason for this is that when the position of the substituent represented by Formula (2) is set to a position other than the positions of $R^1$ and $R^{10}$, the molecules of the component (A) can be effectively prevented from being oriented and crystallized in a stage before the composition is photocured.

Furthermore, the compound is liquid at the monomer stage prior to photocuring, and the compound can be apparently uniformly mixed with the component (B) even if a diluent solvent or the like is not used.

It is because, in the photocuring stage, aggregation/phase separation at a fine level of the component (A) and the component (B) is enabled, and a light diffusion film having the predetermined internal structure can be obtained more efficiently.

Furthermore, from a similar point of view, it is particularly preferable that any one of $R^3$, $R^5$, $R^6$ and $R^8$ in Formula (1) represents a substituent represented by Formula (2).

Furthermore, it is usually preferable that the number of repetitions m for the substituent represented by Formula (2) is defined as an integer from 1 to 10.

The reason for this is that, if the number of repetitions m has a value exceeding 10, the oxyalkylene chain that links the polymerization site and the biphenyl ring becomes too long, and polymerization of the molecules of the component (A) at the polymerization site may thereby be inhibited.

Therefore, it is more preferable that the number of repetitions m for the substituent represent by Formula (2) is defined as an integer from 1 to 4, and particularly preferably to an integer of 1 or 2.

In addition, from a similar point of view, it is usually preferable that the number of carbon atoms n for the substituent represented by Formula (2) is defined as an integer from 1 to 4.

Furthermore, when it is also considered that the position of the polymerizable carbon-carbon double bond, which serves as a site of polymerization, is so close to the biphenyl ring that the biphenyl ring becomes a steric hindrance, and thus the polymerization rate of the component (A) decreases, it is more preferable that the number of carbon atoms n for the substituent represented by Formula (2) is defined as an integer from 2 to 4, and particularly preferably to an integer from 2 to 3.

Furthermore, specific preferred examples of the biphenyl compound represented by Formula (1) include compounds represented by the following Formulas (3) and (4):

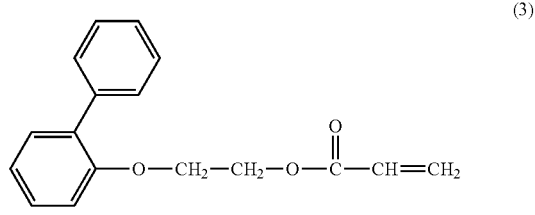

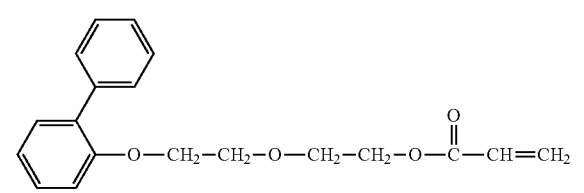

(2) Molecular Weight

Furthermore, it is preferable to adjust the molecular weight of the component (A) to a value within the range of 200 to 2,500.

The reason for this is that, by adjusting the molecular weight of the component (A) to a value in a predetermined range, it is presumed that the polymerization rate of the component (A) can be made faster, and copolymerizability of the component (A) and the component (B) can be decreased more effectively.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed more efficiently.

That is, this is because, if the molecular weight of the component (A) has a value of below 200, it is speculated that the polymerization rate is decreased due to steric hindrance and becomes close to the polymerization rate of the component (B), and copolymerization of the component (A) with the component (B) is likely to occur, and as a result, it may be difficult to form a predetermined internal structure efficiently. On the other hand, it is because if the molecular weight of the component (A) has a value of above 2,500, it is speculated that the difference in the molecular weight between the component (A) and the component (B) is decreased, while the polymerization rate of the component (A) decreases and becomes close to the polymerization rate of the component (B), so that copolymerization of the component (A) with the component (B) occurs more easily, and as a result, it may be difficult to form a predetermined internal structure efficiently.

Therefore, it is more preferable to adjust the molecular weight of the component (A) to a value within the range of 240 to 1,500, and even more preferably to a value within the range of 260 to 1,000.

Meanwhile, the molecular weight of the component (A) can be determined from the calculated value obtainable from the composition of the molecules and the atomic weight of the constituent atoms, or can be measured as the weight average molecular weight using gel permeation chromatography (GPC).

(3) Single Use

Furthermore, the composition for light diffusion film according to the present invention is characterized by including the component (A) as a monomer component that forms the region with comparatively high refractive in the predetermined internal structure, but it is preferable that the component (A) be included as a single component.

The reason for this is that when such a configuration is adopted, the fluctuations in the region originating from the component (A) can be suppressed effectively, and a light diffusion film having a predetermined internal structure can be obtained more efficiently.

That is, when the compatibility of the component (A) with the component (B) is low, for example, when the component (A) is a halogen-based compound or the like, another component (A) (for example, a non-halogen-based compound) may be used jointly as a third component for making the component (A) compatible with the component (B).

However, in that case, the refractive index in the region with comparatively high refractive index, originating from the component (A), may fluctuate or may become prone to decrease, due to the influence of such a third component.

As a result, the difference in refractive index with the region with comparatively low refractive index, originating from the component (B), may become non-uniform, or may be prone to decrease excessively.

Therefore, it is preferable to select a high refractive index monomer component having compatibility with the component (B), and use that monomer component as a single component (A).

Meanwhile, for example, since the biphenyl compound represented by Formula (3) as the component (A) has low viscosity, the compound is compatible with the component (B), and therefore, the biphenyl compound can be used alone as the component (A).

(4) Refractive Index

Furthermore, it is preferable to adjust the refractive index of the component (A) to a value within the range of 1.5 to 1.65.

The reason for this is that when the refractive index of the component (A) is adjusted to a value in such a range, the difference between the refractive index of the region originating from the component (A) and the refractive index of the region originating from the component (B) can be more easily adjusted, and a light diffusion film having a predetermined internal structure can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, if the refractive index of the component (A) has a value exceeding 1.65, the difference between the refractive index of the component (A) and the refractive index of the component (B) becomes large, but it may be difficult to even form an apparent compatibility with the component (B).

Therefore, it is more preferable to adjust the refractive index of the component (A) to a value within the range of 1.52 to 1.62 and even more preferable to a value within the range of 1.56 to 1.6.

Meanwhile, the refractive index of the component (A) means the refractive index of the component (A) prior to photocuring.

Furthermore, the refractive index can be measured according to JIS K0062.

(5) Content

Furthermore, the composition for light diffusion film is characterized in that the content of the component (A) in the composition is adjusted to a value within the range of 25 parts to 400 parts by weight relative to 100 parts by weight of the component (B) described below.

The reason for this is that if the content of the component (A) has a value of below 25 parts by weight, the existence ratio of the component (A) to the component (B) becomes smaller, the width of the part originating from the component (A) in the louver structure or the columnar structure becomes excessively small compared to the width of the part originating from the component (B), and it may be difficult to obtain a louver structure or a columnar structure, which has a sufficient angle of aperture of diffused light even if bending has been formed. On the other hand, it is because if the content of the component (A) has a value of above 400 parts by weight, the existence ratio of the component (A) to the component (B) becomes larger, the width of the part originating from the component (A) in the louver structure or the columnar structure becomes excessively large compared to the width of the part originating from the component (B), and it may be difficult to obtain a louver structure or a columnar structure, which has a sufficient angle of aperture of diffused light even if bending has been formed.

Therefore, it is more preferable to set the content of the component (A) to a value within the range of 40 parts to 300 parts by weight, and even more preferably to a value within the range of 50 parts to 200 parts by weight, relative to 100 parts by weight of the component (B).

3. Component (B)

(1) Kind

The composition for light diffusion film of the present invention is characterized in that the composition includes a urethane (meth)acrylate as component (B).

The reason for this is that, if urethane (meth)acrylate is used, the difference between the refractive index of the region originating from the component (A) and the refractive index of the region originating from the component (B) can be adjusted more easily, the fluctuations in the refractive index of the region originating from the component (B) are effectively suppressed, and thus, a light diffusion film having the predetermined internal structure can be obtained more efficiently.

Meanwhile, (meth)acrylate means both acrylate and methacrylate.

First, urethane (meth)acrylate is formed from (B1) a compound containing at least two isocyanate groups; (B2) a polyol compound, preferably a diol compound, and particularly preferably polyalkylene glycol; and (B3) hydroxyalkyl (meth)acrylate.

Meanwhile, the component (B) is intended to include an oligomer having a repeating unit of urethane bond.

Among these, examples for the component (B1), the compound containing at least two isocyanate groups, include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds and the like such as ethylene glycol, propylene glycol, neopentyl glycol, trimethylolpropane, and castor oil (for example, xylylene diisocyanate-based trifunctional adduct).

Furthermore, among the compounds described above, it is particularly preferable to have an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the reactions of the component (B1) with only the component (B2), or the component (B1) with only the component (B3) can be inhibited, and the component (B1) can react reliably with the component (B2) and the component (B3), so that generation of excess byproducts can be prevented.

As a result, the fluctuations in the refractive index of the region originating from the component (B), that is, the low refractive region, can be suppressed effectively.

Furthermore, when an alicyclic polyisocyanate is used, compatibility between the component (B) and the component (A) thus obtained can be decreased to a predetermined extent, and a predetermined internal structure can be formed more efficiently, as compared with aromatic polyisocyanates.

Moreover, when an alicyclic polyisocyanate is used, the refractive index of the component (B) thus obtained can be reduced as compared with aromatic polyisocyanates. Therefore, the difference between the refractive index of the component (B) and the refractive index of the component (A) can be increased, so that light diffusibility is exhibited more reliably, and also, the predetermined internal structure having high uniformity of diffused light in the light diffusion angle region can be formed even more efficiently.

Furthermore, among such alicyclic polyisocyanates, a compound containing two isocyanate groups via an aliphatic ring is preferred.

The reason for this is that, with such an alicyclic diisocyanate, the alicyclic diisocyanate quantitatively reacts with the component (B2) and the component (B3), and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components that form the urethane (meth)acrylate, examples of the polyalkylene glycol as the component (B2) include polyethylene glycol, polypropylene glycol, polybutylene glycol, and polyhexylene glycol, and among them, polypropylene glycol is particularly preferred.

The reason for this is that, with polypropylene glycol, when the component (B) is cured, polypropylene glycol forms a satisfactory soft segment in the cured product, and can effectively enhance handleability or mountability of the light diffusion film.

Meanwhile, the weight average molecular weight of the component (B) can be adjusted mainly by the weight average molecular weight of the component (B2). Here, the weight average molecular weight of the component (B2) is usually 2,300 to 19,500, preferably 4,300 to 14,300, and particularly preferably 6,300 to 12,300.

Furthermore, among the components forming urethane (meth)acrylate, for the component (B3), examples of hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate and the like.

Furthermore, from the viewpoint of decreasing the polymerization rate of the urethane (meth)acrylate thus obtainable, and more efficiently forming the predetermined internal structure, the component is more preferably hydroxyalkyl methacrylate, and even more preferably 2-hydroxyethyl methacrylate.

Furthermore, synthesis of the urethane (meth)acrylate based on the components (B1) to (B3) can be carried out by a conventional method.

In this case, it is preferable to adjust the mixing ratio of the components (B1) to (B3) to a mole ratio of component (B1):component (B2):component (B3)=1 to 5:1:1 to 5.

The reason for this is that, with such a mixing ratio, a urethane (meth)acrylate can be efficiently synthesized, in which each one of the isocyanate groups carried by the components (B1) has reacted with the two hydroxyl groups carried by the component (B2) and bonded thereto, and the hydroxyl groups carried by the component (B3) have reacted with the other isocyanate group respectively carried by the two components (B1) and bonded thereto.

Therefore, it is more preferable to adjust the mixing ratio of the components (B1) to (B3) to a molar ratio of component (B1):component (B2):component (B3)=1 to 3:1:1 to 3, and even more preferably to the ratio of 2:1:2.

(2) Weight Average Molecular Weight

Furthermore, it is preferable to adjust the weight average molecular weight of the component (B) to a value within the range of 3,000 to 20,000.

The reason for this is that when the weight average molecular weight of the component (B) is adjusted to a predetermined range, it is speculated that a predetermined difference can be produced between the polymerization rates of the component (A) and the component (B), and copolymerizability of the two components can be effectively decreased.

As a result, when the composition is photocured, a predetermined internal structure such as a louver structure or a columnar structure, which is composed of a region originating from the component (A) and having a relatively high refractive index, and a region originating from the component (B) and having a relatively low refractive index, can be formed efficiently.

That is, if the weight average molecular weight of the component (B) has a value of below 3,000, the polymerization rate of the component (B) is increased and gets closer to the polymerization rate of the component (A), so that copolymerization with the component (A) is likely to occur, and as a result, it may be difficult to form the predetermined internal structure efficiently. On the other hand, it is because, if the weight average molecular weight of the component (B) has a value of above 20,000, it may be difficult to form a predetermined internal structure, compatibility of the component (B) with the component (A) is excessively decreased, and thereby the component (A) may be precipitated out or the like during the application stage.

Therefore, it is more preferable to adjust the weight average molecular weight of the component (B) to a value within the range of 5,000 to 15,000, and even more preferable to adjust it to a value within the range of 7,000 to 13,000.

Meanwhile, the weight average molecular weight of the component (B) can be measured using gel permeation chromatography (GPC).

(3) Single Use

Furthermore, for the component (B), two or more kinds thereof having different molecular structures or different weight average molecular weights may be used in combination; however, from the viewpoint of suppressing fluctuations in the refractive index of the region originating from the component (B) in the predetermined internal structure, it is preferable to use only one kind.

That is, it is because when a plurality of compounds are used for the component (B), the refractive index for the region with comparatively low refractive index originating from the component (B) may fluctuate or increase, and the difference of refractive index with the region with comparatively high refractive index originating from the component (A) may become non-uniform or decrease excessively.

(4) Refractive Index

Furthermore, it is preferable to adjust the refractive index of the component (B) to a value within the range of 1.4 to 1.55.

The reason for this is that when the refractive index of the component (B) is adjusted to a value in such a range, the difference between the refractive index of the region originating from the component (A) and the refractive index of the region originating from the component (B) can be more easily adjusted, and a light diffusion film having a predetermined internal structure can be obtained more efficiently.

That is, if the refractive index of the component (B) has a value of below 1.4, the difference between the refractive index of the component (A) and the refractive index of the component (B) becomes too large, and it may be difficult to obtain an effective light diffusion angle region. On the other hand, if the refractive index of the component (B) has a value exceeding 1.55, the difference between the refractive index of the component (A) and the refractive index of the component (B) becomes too small, but it may be difficult to even form an apparent compatibility with the component (B).

Therefore, it is more preferable to adjust the refractive index of the component (B) to a value within the range of 1.45 to 1.54 and even more preferable to a value within the range of 1.46 to 1.52.

Meanwhile, the refractive index of the component (B) means the refractive index of the component (B) prior to photocuring.

Furthermore, the refractive index can be measured according to JIS K0062.

Furthermore, it is preferable to adjust the difference between the refractive indices of the component (A) and the component (B) to a value of 0.01 or more.

The reason for this is that, when such difference in refractive index is adjusted to a value in a predetermined range, a light diffusion film can be obtained, which has more satisfactory incident angle dependency in connection with the transmission and the diffusion of light, and has a broader light diffusion incident angle region.

That is, if such difference in refractive index has a value of below 0.01, because the range of angles at which the incident light undergoes total reflection in the predetermined internal structure narrows, the angle of aperture in the light diffusion may become excessively narrow. On the other hand, if such difference in refractive index becomes excessively large, the compatibility between the component (A) and the component (B) deteriorates too much, and there is concern about not being able to form the predetermined internal structure.

Therefore, it is more preferable to adjust the difference between the refractive indices of the component (A) and the component (B) to a value within the range of 0.05 to 0.5, and even more preferable to adjust it to a value within the range of 0.1 to 0.2.

Meanwhile, the refractive indices of the component (A) and the component (B) mean the refractive indices of the component (A) and the component (B) prior to photocuring.

(5) Content

Furthermore, it is preferable that the content of the component (B) in the composition for light diffusion film is adjusted to a value within the range of 10 parts to 80 parts by weight relative to 100 parts by weight of the total amount of the composition for light diffusion film.

The reason for this is that if the content of the component (B) has a value of below 10 parts by weight, the existence ratio of the component (B) to the component (A) becomes smaller, the width of the part originating from the component (B) in the louver structure or the columnar structure becomes excessively small compared to the width of the part originating from the component (A), and it may be difficult to obtain a louver structure or a columnar structure, which has a sufficient angle of aperture of diffused light even if bending has been formed. On the other hand, it is because, when the content of the component (B) has a value of above 80 parts by weight, the existence ratio of the component (B) to the component (A) becomes larger, the width of the part originating from the component (B) in the louver structure or the column structure becomes excessively large compared to the width of the part originating from the component (A), and it may be difficult to obtain a louver structure or a columnar structure, which has a sufficient angle of aperture of diffused light even if bending has been formed.

Therefore, it is more preferable that the content of the component (B) is adjusted to a value within the range of 20 parts to 70 parts by weight, and even more preferably to a value within the range of 30 parts to 60 parts by weight, relative to 100 parts by weight of the total amount of the composition for light diffusion film.

4. Component (C)

(1) Kind

Furthermore, the composition for light diffusion film is characterized in that the composition includes a photopolymerization initiator as component (C).

The reason for this is that when the composition for light diffusion film is irradiated with active energy radiation, a predetermined internal structure such as a louver structure or a columnar structure, which is composed of a region originating from the component (A) and having a relatively high refractive index, and a region originating from the component (B) and having a relatively low refractive index, can be formed efficiently.

Here, the photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo [2-hydroxy-2-methyl-1-[4-(1-methylvinyl)phenyl]propane]. Among these, one type of compound may be used alone, or two or more types of compounds may be used in combination.

Furthermore, it is preferable that the component (C) is at least one selected from the group consisting of an α-hydroxyacetophenone type photopolymerization initiator, an α-aminoacetophenone type photopolymerization initiator, and an acylphosphine oxide type photopolymerization initiator.

The reason for this is that, with such a photopolymerization initiator, bending can be produced in a more well-defined manner in the predetermined internal structure, and thereby the angle of aperture of diffused light in the resulting light diffusion film can be expanded more effectively.

That is, it is because if such a photopolymerization initiator is used, on the occasion of forming a bent louver structure or columnar structure, it is speculated that the photopolymerization initiator contributes to curing while accelerating separation of the component (A) and the component (B), so that the difference between the refractive indices of the regions originating from the component (A) and the component (B) becomes larger.

Among them, the α-hydroxyacetophenone type photopolymerization initiator is preferably 2-hydroxy-2-methyl-1-phenylpropan-1-one.

(2) Content

Furthermore, the present invention is characterized in that the content of the component (C) in the composition for light diffusion film is adjusted to a value within the range of 0.2 parts to 20 parts by weight relative to the total amount, taken as 100 parts by weight, of the component (A) and the component (B).

The reason for this is that, when the content of the component (C) is adjusted to a value within such a range, bending can be produced in the predetermined internal structure formed within the film, together with the action of the component (D) that will be described below, without inhibiting curing of the composition for light diffusion film, and thereby the angle of aperture of diffused light in the resulting light diffusion film can be expanded effectively.

That is, it is because, if the content of the component (C) has a value of below 0.2 parts by weight, there may be an insufficient number of polymerization starting points so that it may be difficult to photocure the film sufficiently. On the other hand, it is because, if the content of the component (C) has a value of above 20 parts by weight, the angle of aperture of diffused light can be expanded sufficiently, but yellowing of the film or deterioration of durability is prone to occur. It is also because ultraviolet absorption at the surface layer of the coating layer may be excessively intensified, and rather, there may be a problem such as that curing is inhibited, foul odor of the composition for light diffusion film becomes excessively strong, or the initial yellow tinge in the film may be come intense.

Therefore, it is more preferable that the content of the component (C) is adjusted to a value within the range of 0.5 parts to 15 parts by weight, and even more preferably to a value within the range of 1 part to 10 parts by weight, relative to the total amount, taken as 100 parts by weight, of the component (A) and the component (B).

5. Component (D)

(1) Kind

Also, the composition for light diffusion film of the present invention is characterized in that the composition includes an ultraviolet absorber as component (D).

The reason for this is that, by incorporating an ultraviolet absorber as the component (D), when the composition is irradiated with active energy radiation, active energy radiation having a predetermined wavelength can be selectively absorbed to a predetermined extent.

As a result, bending can be produced in the predetermined internal structure formed within the film, as illustrated in FIGS. 5(a) and 5(b) and in FIGS. 6(a) and 6(b), without inhibiting curing of the composition for light diffusion film, and thereby, the angle of aperture of diffused light in the resulting light diffusion film can be expanded effectively.

Here, at the present moment, the specific mechanism by which an ultraviolet absorber produces bending in the predetermined internal structure formed in the film is not sufficiently clearly known.

However, the mechanism is assumed to be as follows.

That is, there has been recognized a tendency that as the amount of addition of the ultraviolet absorber is smaller, the angle of bending becomes smaller, and the angle of aperture of diffused light becomes smaller.

Furthermore, it has been recognized that with an ultraviolet absorber having a peak at a site closer to the wavelength of 365 nm, which is the primary wavelength of a high pressure mercury lamp, bending is produced by a smaller amount of addition of the ultraviolet absorber.

Therefore, it is speculated that as the wavelength of the ultraviolet radiation emitted from a high pressure mercury lamp is more effectively controlled by the ultraviolet absorber, that is, as the intensity ratio of various wavelengths in the ultraviolet radiation emitted from a high pressure mercury lamp changes, the progress of polymerization in the lower part in the film thickness direction of the coating layer is delayed, and the direction of progress of polymerization changes at a depth at which polymerization has proceeded to a certain extent.

Meanwhile, the difference between the refractive indices of the component (A) and the component (B) may be considered as a factor that changes the direction of progress of polymerization; however, bending to an extent that can be actually recognized is not produced in such a difference in refractive index, according to calculations.

Furthermore, it is preferable that the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

The reason for this is that, with such an ultraviolet absorber, since bending can be produced in a more well-defined manner in the predetermined internal structure, the angle of aperture of diffused light in the resulting light diffusion film can be expanded more effectively.

That is, it is because it has been confirmed that, with such an ultraviolet absorber having a peak at a site closer to the wavelength of 365 nm, which is the primary wavelength of a high pressure mercury lamp, bending is produced by a smaller amount of addition of the ultraviolet absorber.

Furthermore, specific preferred examples of the hydroxyphenyltriazine-based ultraviolet absorber include compounds represented by the following formulas (5) to (9):

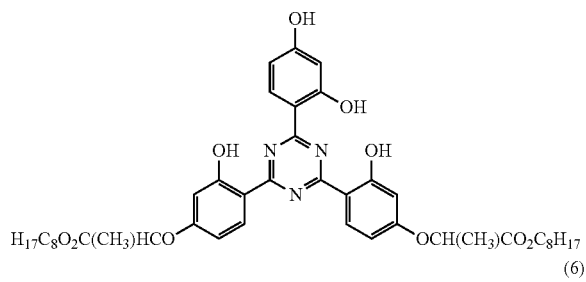

(5)

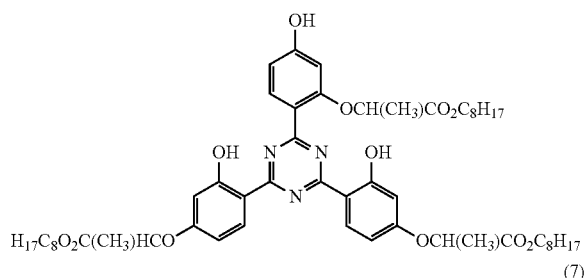

(6)

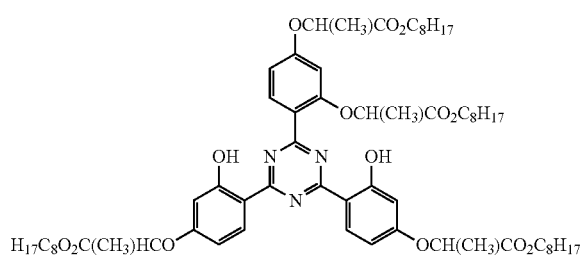

(7)

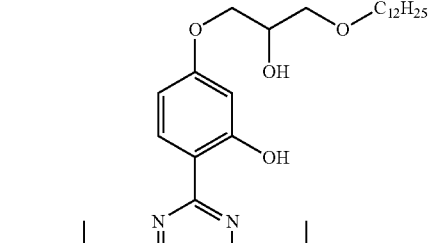

(8)

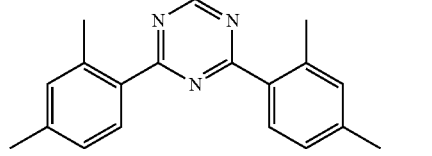

(9)

Furthermore, specific preferred examples of the benzotriazole-based ultraviolet absorber include a compound represented by the following Formula (10):

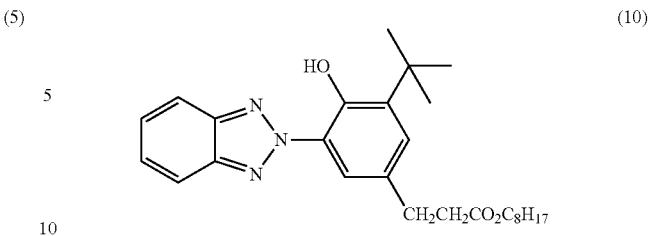

(10)

(2) Absorption Wavelength

Furthermore, it is preferable that the component (D) has an absorption peak for light having a wavelength of 330 to 380 nm.

The reason for this is that, when the absorption peak of the component (D) is in the relevant range, the component (D) can efficiently absorb the energy at 365 nm, which is the primary wavelength of a high pressure mercury lamp, and an internal structure having a bending can be formed efficiently in the resulting light diffusion film.

On the other hand, many of ultraviolet absorbers having an absorption peak at a wavelength of below 330 nm exhibit very small absorption at 365 nm. Accordingly, there are occasions in which even if such an ultraviolet absorber is used, an internal structure having a sufficient bending may not be formed in the resulting light diffusion film.

On the other hand, many of ultraviolet absorbers having an absorption peak at a wavelength of above 380 nm, exhibit reliable absorption at 365 nm as well. However, since such an ultraviolet absorber exhibits absorption over the entire ultraviolet region in many cases, it is necessary to increase the amount of addition in order to gain absorption at 365 nm. As a result, when an ultraviolet absorber having an absorption peak at a wavelength of above 380 nm is used, curing of the light diffusion film may be inhibited per se.

Therefore, it is more preferable that the absorption peak of the component (D) is adjusted to a value within the wavelength range of 335 to 375 nm, and even more preferably to a value within the wavelength range of 340 to 370 nm.

(3) Content

Furthermore, the composition for light diffusion film is characterized in that the content of the component (D) in the composition is adjusted to a value of below 2 parts by weight (provided that 0 parts by weight is excluded) relative to the total amount, taken as 100 parts by weight, of the component (A) and the component (B).

The reason for this is that, when the content of the component (D) is adjusted to a value within such a range, bending can be produced in the predetermined internal structure formed in the film without inhibiting curing of the composition for light diffusion film, and thereby, the angle of aperture of diffused light in the resulting light diffusion film can be expanded effectively.

That is, it is because, if the content of the component (D) has a value of 2 parts by weight or more, curing of the composition for light diffusion film is inhibited, and contraction wrinkles may be generated on the film surface, or curing may not occur at all. On the other hand, it is because, if the content of the component (D) is excessively small, it may be difficult to produce sufficient bending in the predetermined internal structure formed in the film, and it may be difficult to effectively expand the angle of aperture of diffused light in the resulting light diffusion film.

Therefore, it is more preferable that the content of the component (D) is adjusted to a value within the range of 0.01 to 1.5 parts by weight, and even more preferably to a value within the range of 0.02 to 1 part by weight, relative to the total amount, taken as 100 parts by weight, of the component (A) and the component (B).

6. Other Additives

Furthermore, additives other than the compounds described above can be appropriately added to the extent that the effect of the present invention is not impaired.

Examples of such additives include a hindered amine-based photostabilizer, an oxidation inhibitor, an antistatic agent, a polymerization accelerator, a polymerization inhibitor, an infrared absorber, a plasticizer, a diluent solvent, and a leveling agent.

Meanwhile, it is preferable that the content of such an additive is generally adjusted to a value within the range of 0.01 parts to 5 parts by weight, more preferably to a value within the range of 0.02 parts to 3 parts by weight, and even more preferably to a value within the range of 0.05 parts to 2 parts by weight, relative to the total amount, taken as 100 parts by weight, of the component (A) and the component (B).

Second Embodiment

A second embodiment of the present invention relates to a light diffusion film which contains an internal structure including plural regions having a relatively high refractive index in a region having a relatively low refractive index within the film, and in which the plural regions having a relatively high refractive index are bent at an intermediate point along the film thickness, the light diffusion film being formed by irradiating a composition for light diffusion film with active energy radiation, and the composition for light diffusion film including a (meth)acrylic acid ester having plural aromatic rings as component (A); a urethane (meth)acrylate as component (B); a photopolymerization initiator as component (C); and an ultraviolet absorber as component (D), characterized in that the content of the component (A) is adjusted to a value within the range of 25 parts to 400 parts by weight relative to 100 parts by weight of the component (B), the content of the component (C) is adjusted to a value within the range of 0.2 parts to 20 parts by weight relative to the total amount, taken as 100 parts by weight, of the component (A) and the component (B), and the content of the component (D) is adjusted to a value of below 2 parts by weight relative to the total amount, taken as 100 parts by weight, of the component (A) and the component (B).

Hereinafter, the second embodiment of the present invention will be specifically explained, with reference to the drawings, mainly in view of the differences between the first embodiment and the second embodiment.

1. Internal Structure

The internal structure in the light diffusion film of the second embodiment is not particularly limited as long as the internal structure causes light diffusion with incident angle dependency; however, because the composition for light diffusion film includes the component (D), basically the internal structure acquires a bending.

Meanwhile, in the light diffusion film of the second embodiment, an internal structure having a bending is formed within a single-layered film originating from a single coating layer, and such an internal structure having a bending is basically formed by single irradiation of active energy radiation.

Hereinafter, a bent louver structure and a bent columnar structure will be explained as examples.

(1) Bent Louver Structure

It is preferable that the light diffusion film of the second embodiment has a louver structure in which plural plate-shaped regions having different refractive indices are alternately arranged along any one arbitrary direction along the film plane within the film.

Furthermore, it is preferable that plural plate-shaped regions having a relatively high refractive index and plural plate-shaped regions having a relatively low refractive index are bent at an intermediate point along the film thickness direction.

The reason for this is that, with such a bent louver structure, the angle of aperture of diffused light can be expanded effectively.

Hereinafter, the bent louver structure will be explained specifically.

(1)-1 Refractive Index

In regard to the bent louver structure, it is preferable that the difference between the refractive index of the plate-shaped regions having a relatively high refractive index and the refractive index of the plate-shaped regions having a relatively low refractive index is adjusted to a value of 0.01 or more.

The reason for this is that, when such a difference in refractive index is adjusted to a value of 0.01 or more, incident light can be stably reflected within the bent louver structure, and the incident angle dependency originating from the bent louver structure can be further enhanced.

More specifically, it is because when such a difference in refractive index has a value of below 0.01, the angle range in which the incident light is totally reflected within the bent louver structure is narrowed, and therefore, the incident angle dependency may be excessively decreased.

Therefore, it is more preferable that the difference in the refractive index between plate-shaped regions having different refractive indices in the bent louver structure is adjusted to a value of 0.05 or more, and even more preferably to a value of 0.1 or more.

Meanwhile, it is more preferable if the difference between the refractive index of the high-refractive index plate-shaped regions and the refractive index of the low-refractive index plate-shaped regions is larger; however, from the viewpoint of appropriately selecting a material capable of forming a bent louver structure, it is considered that the upper limit is about 0.3.

(1)-2 Width

Figure 7A:
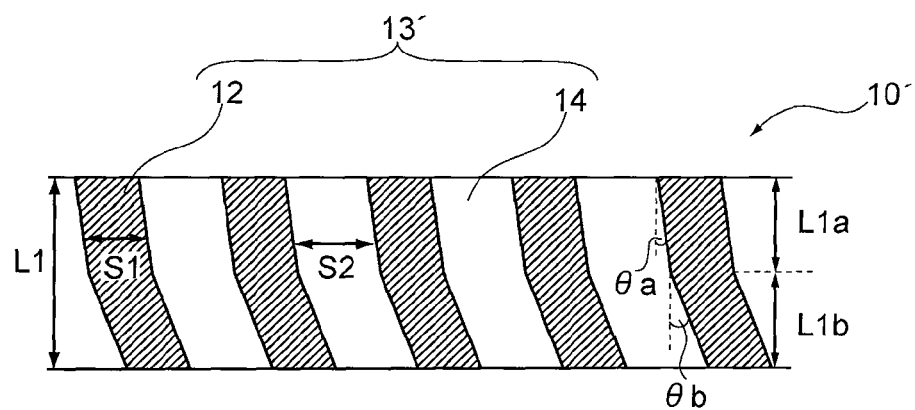
FIGS. 7(a) and 7(b) are diagrams provided to explain a bent louver structure.

Furthermore, as illustrated in FIG. 7(a), in regard to the bent louver structure, it is preferable that widths (S1, S2) of the high-refractive index plate-shaped regions 12 and the low-refractive index plate-shaped regions 14, which have different refractive indices, are respectively adjusted to values within the range of 0.1 to 15 μm.

The reason for this is that, when such a width of the plate-shaped regions is adjusted to a value within the range of 0.1 to 15 μm, incident light can be reflected more stably in the bent louver structure, and the incident angle dependency originating from the bent louver structure can be enhanced more effectively.

That is, it is because, if such a width of the plate-shaped regions has a value of below 0.1 μm, it may be difficult to exhibit light diffusion irrespective of the incident angle of the incident light. On the other hand, it is because, if such a width has a value of above 15 μm, the amount of light that propagates straight through the bent louver structure increases, and uniformity of the diffused light may be deteriorated.

Therefore, in the bent louver structure, it is more preferable that the widths of the plate-shaped regions having different refractive indices are respectively adjusted to a value within the range of 0.5 to 10 μm, and even more preferably to a value within the range of 1 to 5 μm.

Meanwhile, the width, length and the like of the plate-shaped regions that constitute the bent louver structure can be measured by observing a cross-section of the film using an opto-digital microscope.

(1)-3 Thickness

Figure 7B:
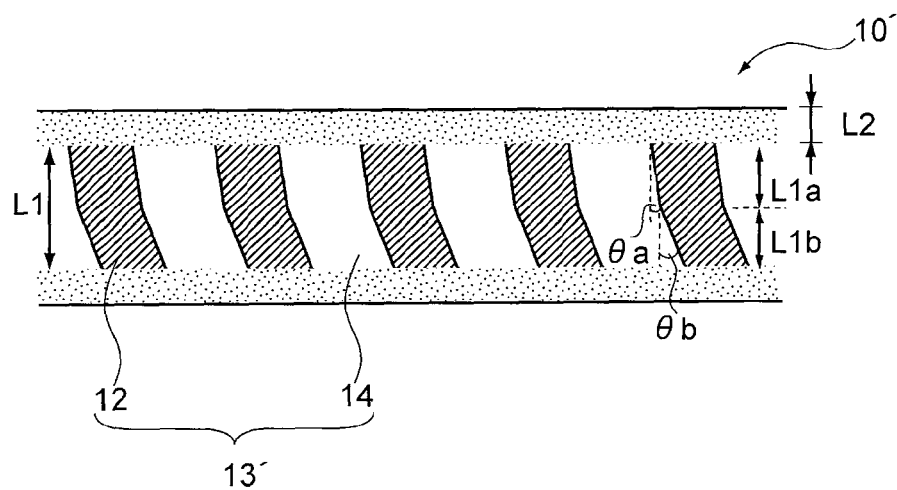

Furthermore, it is preferable that the thickness of the bent louver structure, that is, the length L1 of the plate-shaped regions in the normal line direction with respect to the film plane as illustrated in FIGS. 7(a) and 7(b), is adjusted to a value within the range of 50 to 500 μm.

The reason for this is that when the thickness of the bent louver structure is adjusted to a value within such a range, the length of the plate-shaped regions along the film thickness direction can be stably secured, the incident light in the bent louver structure can be reflected more stably, and the uniformity in the intensity of diffused light within a light diffusion angle region originating from the bent louver structure can be further enhanced.

That is, it is because, if the thickness L1 of such a bent louver structure has a value of below 50 μm, the length of the plate-shaped regions is insufficient, the amount of incident light that propagates straight through the bent louver structure increases, and it may be difficult to obtain uniformity of the intensity of diffused light within a light diffusion angle region. On the other hand, it is because, if the thickness L1 of such a bent louver structure has a value of above 500 μm, when a bent louver structure is formed by irradiating a composition for light diffusion film with active energy radiation, the direction of progress of photopolymerization is diffused by a louver structure formed in the beginning, and it may be difficult to form a desired bent louver structure.

Therefore, it is more preferable that the thickness L1 of the bent louver structure is adjusted to a value within the range of 70 to 300 μm, and even more preferably to a value within the range of 80 to 200 μm.

Furthermore, in the light diffusion film of the present invention, as illustrated in FIG. 7(a), a bent louver structure (film thickness direction length L1) may be formed over the entire film thickness direction, or as illustrated in FIG. 7(b), the light diffusion film may have a louver structure-unformed part (film thickness direction length L2) on at least any one of the upper end or the lower end of the film.

Furthermore, it is more preferable that the length L1a of the plate-shaped regions in the upper louver structure part in the film illustrated in FIGS. 7(a) and 7(b), that is, in the part upper than the bent portion (the side irradiated with active energy radiation when a light diffusion film is produced) in the bent louver structure, to a value within the range of 15 to 150 μm, more preferably to a value within the range of 25 to 100 μm, and even more preferably to a value within the range of 30 to 80 μm.

Furthermore, it is preferable that the length L1b of the plate-shaped regions in the lower louver structure part in the film illustrated in FIGS. 7(a) and 7(b), that is, in the part lower than the bent portion in the bent louver structure, to a value within the range of 35 to 350 μm, more preferably to a value within the range of 45 to 200 μm, and even more preferably to a value within the range of 50 to 120 μm.

(1)-4 Angle of Inclination

Furthermore, as illustrated in FIGS. 7(a) and 7(b), it is preferable that in the bent louver structure, high-refractive index plate-shaped regions 12 and low-refractive index plate-shaped regions 14 are arranged in parallel respectively at a certain angle of inclination with respect to the film thickness direction.

The reason for this is that by making the angle of inclination of the plate-shaped regions constant, incident light can be reflected more stably in the bent louver structure, and the incident angle dependency originating from the bent louver structure can be further enhanced.

More specifically, it is preferable that the angle of inclination θa of the plate-shaped regions in the upper louver structure part in the film illustrated in FIGS. 7(a) and 7(b) is adjusted to a value within the range of 0° to 30°.

The reason for this is that, if the angle of inclination θa of the plate-shaped regions has a value of above 30°, the absolute value of the incident angle of active energy radiation is also increased therewith, so that the proportion of reflection of active energy radiation at the interface between air and the coating layer is increased, and it is needed to irradiate active energy radiation of higher illuminance on the occasion of forming a bent louver structure. On the other hand, when active energy radiation is actually incident at 0°, there is a possibility that those factors that produce bending may not be obtained, and consequently, there is a possibility that bending may not be produced.

Therefore, it is more preferable that the angle of inclination θa of the plate-shaped regions in the upper louver structure part is adjusted to a value within the range of 0.5° to 25°, and even more preferably to a value within the range of 1° to 20°.

Furthermore, it is preferable that the angle of inclination θb of the plate-shaped regions in the lower louver structure part in the film illustrated in FIGS. 7(a) and 7(b) is adjusted to a value within the range of 1° to 60°.

The reason for this is that, if the angle of inclination θb of the plate-shaped regions has a value of below 1°, even if the synergistic effect of the upper louver structure part is considered, it may be difficult to obtain a sufficient effect of expanding the angle of aperture of diffused light. ON the other hand, it is because, if the angle of inclination θb of the plate-shaped regions has a value of above 60°, the absolute value of the incident angle of active energy radiation is also increased therewith, so that the proportion of reflection of active energy radiation at the interface between air and the coating layer is increased, and it is needed to irradiate active energy radiation of higher illuminance on the occasion of forming a bent louver structure. It is also because when the synergistic effect of the upper louver structure part is considered, even if a larger angle of inclination may not be used, the angle of aperture of diffused light can be expanded sufficiently.

Therefore, it is more preferable that the angle of inclination θb of the plate-shaped regions in the lower louver structure part is adjusted to a value within the range of 3° to 55°, and even more preferably to a value within the range of 5° to 50°.

Furthermore, it is preferable that the absolute value of θb−θa is adjusted to a value within the range of 1° to 30°, more preferably to a value within the range of 3° to 25°, and even more preferably to a value within the range of 5° to 20°.

Meanwhile, θa and θb mean angles of inclination (°) of the plate-shaped regions when the angle of the normal line with respect to the film surface as measured in a cross-section in the case of cutting the film at a plane perpendicular to the bent louver structure extended in any one arbitrary direction along the film plane is designated as 0°.

More specifically, as illustrated in FIGS. 7(a) and 7(b), θa means the narrower angle between the angles formed by the normal line of the upper end surface of the bent louver structure and the top of the plate-shaped region in the upper louver structure part.

Also, θb means the narrower angle between the angles formed by the normal line of the bent plane of the bent louver structure and the top of the plate-shaped region in the lower louver structure part.

Meanwhile, as illustrated in FIGS. 7(a) and 7(b), the angle of inclination in the case in which the plate-shaped regions are inclined to the left side is taken as the reference, and the angle of inclination in the case in which the plate-shaped regions are inclined to the right side is described with a minus sign.

(2) Bent Columnar Structure

It is also preferable that the light diffusion film of the present invention has, within the film, a columnar structure in which plural pillar-shaped objects having a relatively high refractive index are arranged to stand close together in regions having a relatively low refractive index.

Furthermore, it is preferable that plural pillar-shaped objects having a relatively high refractive index are bent at an intermediate point along the film thickness direction.

The reason for this is that, with such a bent columnar structure, the angle of aperture of diffused light can be expanded effectively.

Hereinafter, the bent columnar structure will be explained specifically.

(2)-1 Refractive Index

In the bent columnar structure, it is preferable that the difference between the refractive index of pillar-shaped objects having a relatively high refractive index and the refractive index of pillar-shaped objects having a relatively low refractive index is adjusted to a value of 0.01 or more, more preferably to a value of 0.05 or more, and even more preferably to a value of 0.1 or more.

The details will not be repeated here since the matters overlap with the contents of the section "Refractive index" in connection with the bent louver structure described above.

(2)-2 Maximum Diameter

Figure 8A:
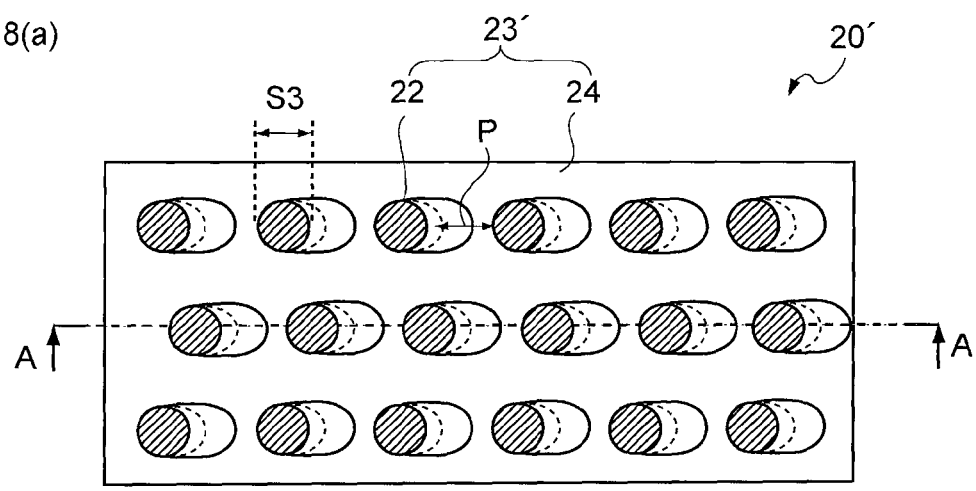
FIGS. 8(a) and 8(b) are diagrams provided to explain a bent columnar structure.

Furthermore, as illustrated in FIG. 8(a), in regard to the bent columnar structure, it is preferable that the maximum diameter S3 in a cross-section of a pillar-shaped object is adjusted to a value within the range of 0.1 to 15 µm, more preferably to a value within the range of 0.5 to 10 µm, and even more preferably to a value within the range of 1 to 5 µm.

Meanwhile, a cross-section of the pillar-shaped object means a cross-section cut by a plane that is parallel to the film plane.

Furthermore, there are no particular limitations on the cross-sectional shape of the pillar-shaped object; however, it is preferable to use, for example, a circular shape, an elliptical shape, a polygonal shape, or an irregular shape.

Meanwhile, the details will not be repeated here since the matters conform to the contents of the section "Width" in connection with the bent louver structure described above.

(2)-3 Distance Between Pillar-Shaped Objects

Furthermore, as illustrated in FIG. 8(a), in regard to the bent columnar structure, it is preferable that the distance between pillar-shaped objects, that is, the space P in adjacent pillar-shaped objects, is adjusted to a value within the range of 0.1 to 15 µm, more preferably to a value within the range of 0.5 to 10 µm, and even more preferably to a value within the range of 1 to 5 µm.

Meanwhile, the details will not be repeated here since the matters conform to the contents of the section "Width" in connection with the bent louver structure described above.

(2)-4 Thickness

Figure 8B:
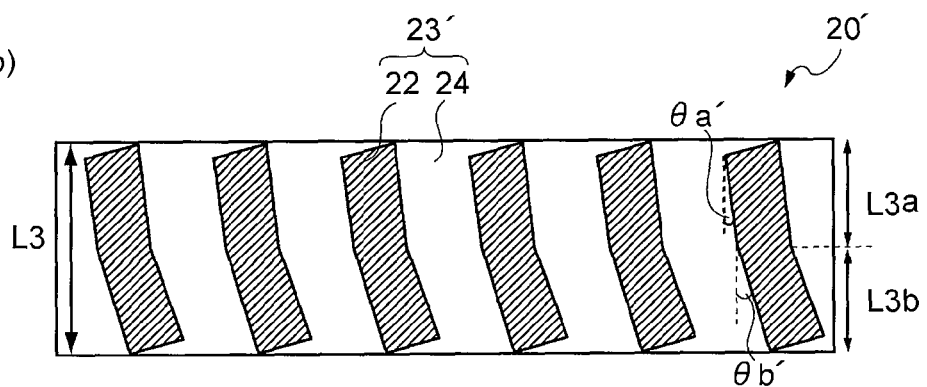

Furthermore, as illustrated in FIG. 8(b), it is preferable that the thickness of the bent columnar structure, that is, the length L3 of the pillar-shaped objects, is adjusted to a value within the range of 50 to 500 µm, more preferably to a value within the range of 70 to 300 µm, and even more preferably to a value within the range of 80 to 200 µm.

It is also preferable that the length L3a of the pillar-shaped objects in the upper columnar structure part in the film illustrated in FIG. 8(b) is adjusted to a value within the range of 15 to 150 µm, more preferably to a value within the range of 25 to 100 µm, and even more preferably to a value within the range of 30 to 80 µm.

Furthermore, it is preferable that the length L3b of the pillar-shaped objects in the lower columnar structure part in the film illustrated in FIG. 8(b) is adjusted to a value within the range of 35 to 350 µm, more preferably to a value within the range of 45 to 200 µm, and even more preferably to a value within the range of 50 to 120 µm.

Meanwhile, the details will not be repeated here since the matters conform to the contents of the section "Thickness" in connection with the bent louver structure described above.

(2)-5 Angle of Inclination

As illustrated in FIG. 8(b), in regard to the bent columnar structure, it is preferable that the pillar-shaped objects 22 are arranged to stand close together at a constant angle of inclination with respect to the film thickness direction.

More specifically, it is preferable that the angle of inclination θa' of the pillar-shaped objects in the upper columnar structure part in the film illustrated in FIG. 8(b) is adjusted to a value within the range of 0° to 30°, more preferably to a value within the range of 0.5° to 25°, and even more preferably to a value within the range of 1° to 20°.

Also, it is preferable that the angle of inclination θb' of the pillar-shaped objects in the lower columnar structure part in the film illustrated in FIG. 8(b) is adjusted to a value within the range of 1° to 60°, more preferably to a value within the range of 3° to 55°, and even more preferably to a value within the range of 5° to 50°.

Furthermore, it is preferable that the absolute value of θb'−θa' is adjusted to a value within the range of 1° to 30°, more preferably to a value within the range of 3° to 25°, and even more preferably to a value within the range of 5° to 20°.

Furthermore, θa' and θb' mean the angles of inclination (°) of the pillar-shaped objects when the angle of the normal line with respect to the film surface as measured in a cross-section in the case of cutting the film at a plane that is perpendicular to the film surface and cuts one pillar-shaped object as a whole into two along the axial line, is designated as 0° (narrower angle between the angles formed by the normal line and a pillar-shaped object).

Meanwhile, the details will not be repeated here since the matters conform to the contents of the section "Angle of inclination" in connection with the bent louver structure described above.

2. Film Thickness

Furthermore, it is preferable that the film thickness of the light diffusion film of the present invention to a value within the range of 60 to 700 µm.

The reason for this is that, if the film thickness of the light diffusion film has a value of below 60 µm, the amount of incident light that propagates straight inside the predetermined internal structure increases, and it may be difficult to manifest light diffusion. On the other hand, it is because, if the film thickness of the light diffusion film has a value of above 700 μm, when the predetermined internal structure is formed by irradiating the composition for light diffusion film with active energy radiation, the direction of progress of photopolymerization is diffused by the internal structure formed in the beginning, and it may be difficult to form a desired internal structure.

Therefore, it is more preferable to set the film thickness of the light diffusion film to a value within the range of 90 to 450 μm, and even more preferably to a value within the range of 120 to 250 μm.

3. Angle of Aperture of Diffused Light

It is preferable for the light diffusion film of the present invention that the angle of aperture of diffused light is adjusted to a value of 45° or more.

The reason for this is that, even if the internal structure such as a louver structure does not have a bending, diffusion can be achieved with an angle of aperture of diffused light of below 45°. On the other hand, if the angle of aperture of diffused light becomes excessively large, the diffused light spreads too much, and consequently, the light exit surface side may become dark even if light is irradiated to the film.

Therefore, it is more preferable that the angle of aperture of diffused light in the light diffusion film of the present invention is adjusted to a value within the range of 50° to 90°, and even more preferably to a value within the range of 55° to 80°.

4. Adhesive Layer

The light diffusion film of the present invention may also include, on one surface thereof or on both surfaces, an adhesive layer to be laminated onto an adherend.

The adhesive that constitutes such an adhesive layer is not particularly limited, and a conventionally known acrylic, silicone-based, urethane-based, rubber-based adhesives and the like can be used.

5. Production Method

Hereinafter, a method for producing the light diffusion film of the present invention will be explained; however, it is needless to say that the light diffusion film according to the present invention is not intended to be limited to the following production method.

(1) Step of Preparing Composition for Light Diffusion Film

This step is a step of preparing a predetermined composition for light diffusion film.

More specifically, it is a step of mixing the components (A) to (D) and other additives as desired.

In addition, on the occasion of mixing, the mixture may be stirred directly at room temperature; however, from the viewpoint of enhancing uniformity, it is preferable to produce a uniform mixed liquid by, for example, stirring the mixture under warmed conditions at 40° C. to 80° C.

It is also preferable to further add a diluent solvent so as to obtain a desired viscosity appropriate for coating.

Meanwhile, since the composition for light diffusion film has been explained in the first embodiment, further explanation will not be repeated here.

(2) Application Step

Figure 9A:
FIGS. 9(a) to 9(c) are diagrams provided to explain the various steps of the method for producing a light diffusion film.

Such a step is, as illustrated in FIG. 9(a), a step of applying the composition for light diffusion film on a process sheet 2 and forming a coating layer 1.

Regarding the process sheet, a plastic film and paper can all be used.

Among these, examples of plastic films include polyester-based films such as a polyethylene terephthalate film; polyolefin-based films such as a polyethylene film and a polypropylene film, cellulose-based films such as a triacetyl cellulose film, polyimide-based films, and the like.

Furthermore, examples of paper include glassine paper, coated paper, and laminate paper.

Here, from the viewpoint of high smoothness of the surface, it is preferable to use a plastic film as the process sheet.

Furthermore, in consideration of the steps that will be described below, it is preferable that the process sheet 2 is a plastic film having excellent dimensional stability against heat or active energy radiation.

Preferred examples of such film include, among those described above, a polyester-based film, a polyolefin-based film, and a polyimide-based film.

Furthermore, in the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, an olefin-based release agent or the like.

Meanwhile, usually, the thickness of the process sheet is preferably adjusted to a value within the range of 25 μm to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, in this case, it is preferable to set the film thickness of the coating layer to a value within the range of 80 to 700 μm.

(3) Active Energy Ray Irradiation Step

Figure 9B:
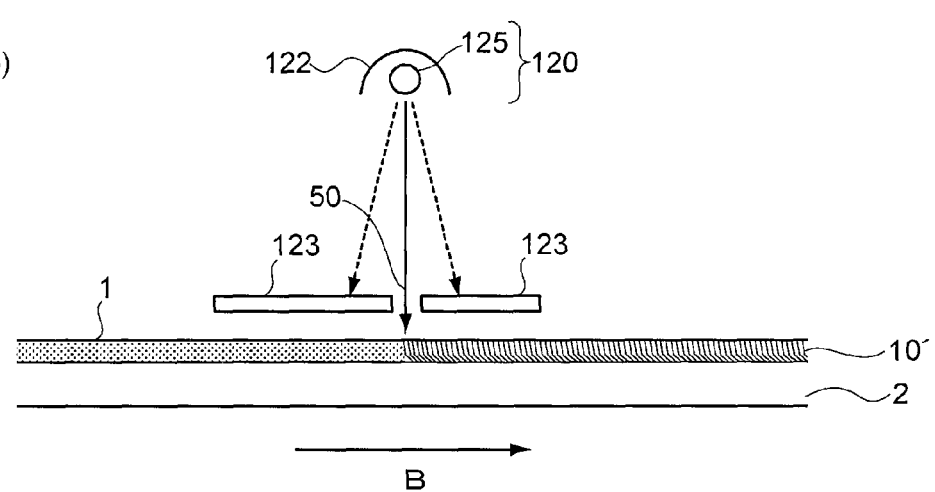
Figure 9C:
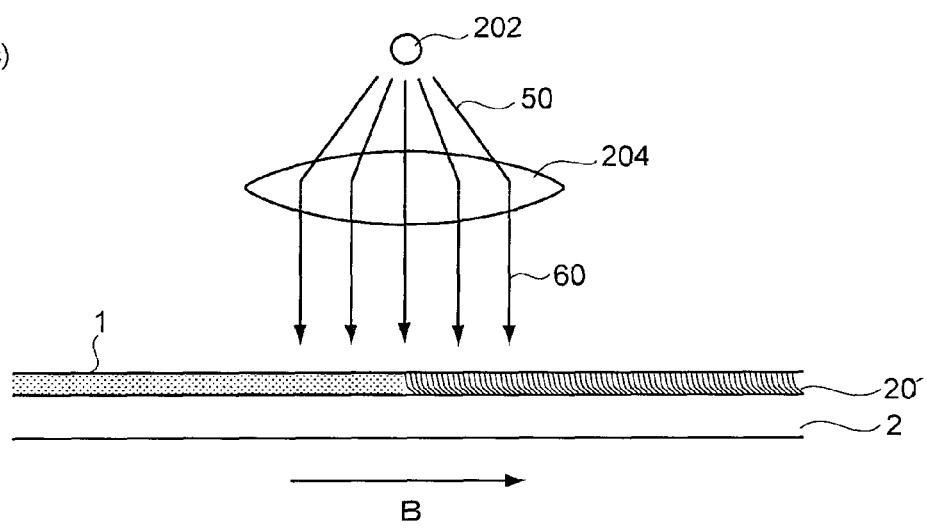

Such a step is, as illustrated in FIGS. 9(b) and 9(c), a step of irradiating the coating layer 1 with active energy radiation, forming a bent louver structure, a bent columnar structure or the like within the film, and forming a light diffusion film.

Hereinafter, the active energy ray irradiation step will be explained separately for the case of forming a bent louver structure and the case of forming a bent columnar structure.

(3)-1 Case of Forming Bent Louver Structure

In the case of forming a bent louver structure, as illustrated in FIG. 9(b), the coating layer 1 formed on the process sheet 2 is irradiated with active energy radiation 50, which is composed only of direct light at a controlled angle of irradiation.

Figure 10A:
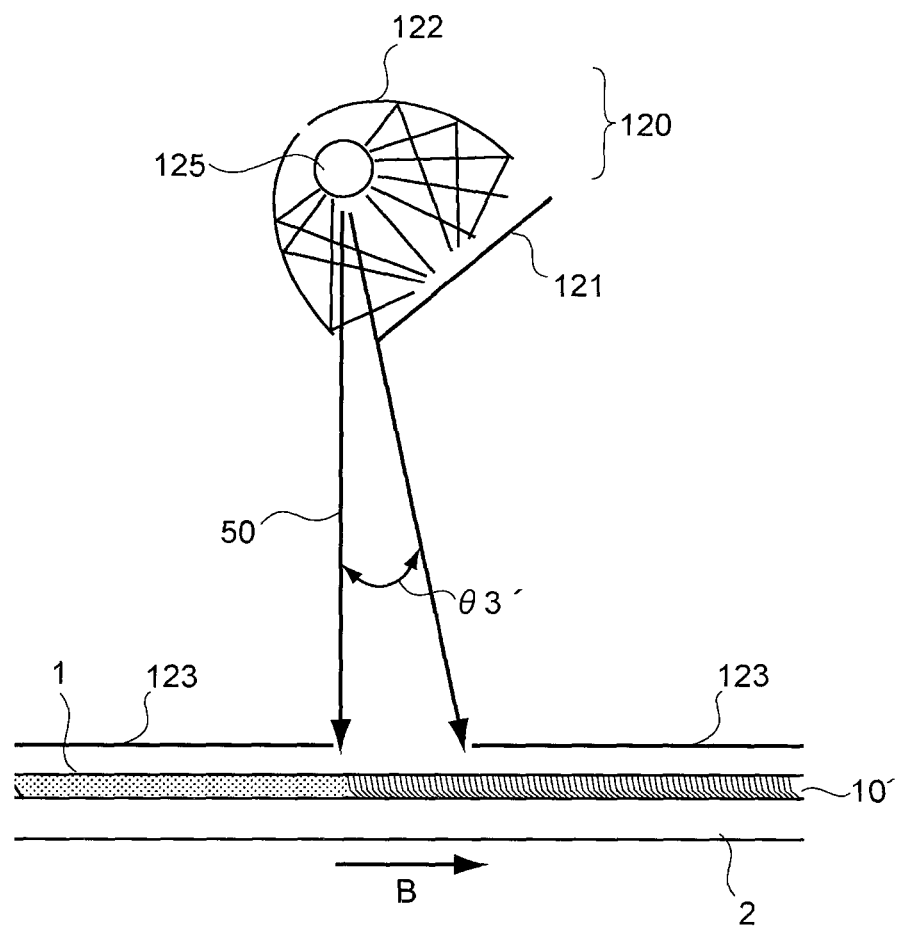
FIGS. 10(a) and 10(b) are diagrams provided to explain an active energy ray irradiation step.

More specifically, for example, as illustrated in FIG. 10(a), a light blocking plate 121 and a light blocking plate 123 are arranged in an ultraviolet irradiating apparatus 120 (for example, if a commercially available product is to be used, ECS-4011GX manufactured by Eye Graphics Co., Ltd., or the like) in which a cold mirror 122 for light collection is provided on a linear ultraviolet lamp 125, thereby active energy radiation 50 composed only of direct light at a controlled angle of irradiation is extracted, and the coating layer 1 formed on the process sheet 2 is irradiated with the active energy radiation.

Meanwhile, the linear ultraviolet lamp is installed such that the angle usually has a value within the range of −80° to 80°, preferably a value within the range of −50° to 50°, and particularly preferably a value within the range of −30° to 30°, with respect to a direction perpendicular to the longitudinal direction of the process sheet 2 having the coating layer 1, as the reference (0°).

Here, a linear light source is used because a bent louver structure in which plate-shaped regions having different refractive indices are arranged alternately and in parallel at a constant angle of inclination with respect to the film thickness direction, can be produced efficiently and stably.

More specifically, when a linear light source is used, a light that is substantially parallel when viewed from the axial direction of the linear light source, and is non-parallel when viewed from a direction perpendicular to the axial direction of the linear light source, can be radiated.

At this time, regarding the angle of irradiation of the irradiated light, as illustrated in FIG. 10(*b*), it is preferable that the angle of irradiation θ3 in the case in which the angle with respect to the normal line of the surface of the coating layer 1 is designated as 0°, is adjusted to a value within the range of −80° to 80°.

The reason for this is that, when the angle of irradiation has a value other than the range of −80° to 80°, the influence of reflection at the surface of the coating layer 1 or the like is increased, and it may be difficult to form a satisfactory bent louver structure.

Furthermore, it is preferable that the angle of irradiation θ3 has a width (width of angle of irradiation) θ3' of 1° to 80°.

The reason for this is that if such a width of angle of irradiation θ3' has a value of below 1°, the interval of the bent louver structure becomes too narrow, and it may be difficult to obtain a desired bent louver structure. On the other hand, it is because if such a width of angle of irradiation θ3' has a value of above 80°, the irradiated light is dispersed excessively, and it may be difficult to form a bent louver structure.

Therefore, it is more preferable that the width of the angle of irradiation θ3' of the angle of irradiation θ3 is adjusted to a value within the range of 2° to 45°, and even more preferably to a value within the range of 5° to 20°.

Furthermore, examples of the irradiated light include ultraviolet radiation and an electron beam; however, it is preferable to use ultraviolet radiation.

The reason for this is that, in the case of an electron beam, since the polymerization rate is so fast, the component (A) and the component (B) may not undergo sufficient phase separation during the process of polymerization, and it may be difficult to form a bent louver structure. On the other hand, it is because, when compared with visible light or the like, ultraviolet radiation is associated with a wide variety of ultraviolet-curable resins that are cured by irradiation of ultraviolet radiation, or a wide variety of photopolymerization initiators that can be used, and therefore, the widths of selection of the component (A) and the component (B) can be broadened.

Furthermore, regarding the conditions for irradiation of ultraviolet radiation, it is preferable that the peak illuminance is adjusted to a value within the range of 0.5 to 10 mW/cm$^2$, and the irradiation is carried out so as to obtain a cumulative amount of light that allows sufficient curing of the coating layer.

Meanwhile, it is also preferable that ultraviolet radiation is irradiated in multiple stages so as to obtain a cumulative amount of light that allows sufficient curing of the coating layer.

Furthermore, it is preferable to pass the coating layer formed on the process sheet through the ultraviolet irradiating portion of an ultraviolet irradiating apparatus by moving the coating layer at a speed of 0.1 to 10 m/min.

The reason for this is that if such a speed has a value of below 0.1 m/min, mass productivity may be excessively decreased. On the other hand, if such a speed has a value of above 10 m/min, the speed is faster than the speed of curing of the coating layer, in other words, the formation of a bent louver structure, and the incident angle of ultraviolet radiation with respect to the coating layer varies significantly with the film thickness direction, so that the formation of the bent louver structure may occur insufficiently.

Therefore, it is more preferable to pass the coating layer formed on the substrate through an ultraviolet irradiating portion of an ultraviolet irradiating apparatus by moving the coating layer at a speed within the range of 0.2 to 5 m/min, and even more preferably to pass the coating layer at a speed within the range of 0.5 to 3 m/min.

It is also preferable to irradiate ultraviolet radiation while controlling the temperature of the coating layer to a value within the range of 0° C. to 60° C.

The reason for this is that, when the temperature of the coating layer is controlled, the component (D) can be completely dissolved in the composition for light diffusion film, and the internal structure obtainable therefrom can be caused to bend more.

Therefore, it is more preferable to adjust the temperature of the coating layer to a value within the range of 5° C. to 50° C., and even more preferably to a temperature within the range of 15° C. to 30° C.

Meanwhile, a light diffusion film obtained after the photocuring step is finally in a state of being usable by detaching the process sheet.

Here, according to the present invention, since the composition for light diffusion film includes a predetermined amount of an ultraviolet absorber as the component (D), when the composition is irradiated with active energy radiation, the composition can absorb active energy radiation having a predetermined wavelength, selectively to a predetermined extent.

Therefore, according to the present invention, for example, it is not necessary to regulate the wavelength distribution for the active energy radiation using a band pass filter or the like.

Therefore, according to the present invention, it is preferable to irradiate the coating layer directly with the light irradiated from an active energy radiation light source without using a band pass filter or the like.

That is, since band pass filters generally use quartz glass as a substrate so as to be able to withstand active energy ray irradiation for a long time, and also have multilayer sputtered layers, band pass filters are very expensive.

Furthermore, on the occasion of forming an internal structure having a bending, plural band pass filters should be tested in a stage of inspecting the optimal conditions, and thus it is even more economically disadvantageous.

On the other hand, when an internal structure having a bending is formed using an ultraviolet absorber, the ultraviolet absorber is markedly inexpensive compared to band pass filters, and the optimal conditions can be examined more easily by regulating the combinations of the kind and the amount of addition. Thus, it is significantly economically advantageous to use an ultraviolet absorber.

Furthermore, it is also contemplated to control the wavelength of the active energy radiation by means of both a band pass filter and an ultraviolet absorber; however, in this case, the control of wavelength may be excessive, and it may be difficult to obtain an illuminance and an amount of light sufficient for curing the coating layer.

Also, increasing the light source intensity in order to supplement the illuminance and amount of light of the active energy radiation, leads to a large energy loss and an increase in production cost.

Therefore, since the advantages of using both a band pass filter and an ultraviolet absorber are insufficient, it is preferable to form an internal structure having a bending by considering the wavelength of the active energy radiation and the absorption wavelength of the photopolymerization initiator or other components, and then optimizing the kind and the amount of addition of the ultraviolet absorber, without using a band pass filter.

(3)-2 Case of Forming Bent Columnar Structure

In the case of forming a bent columnar structure, as illustrated in FIG. 9(c), parallel light having high parallelism of light is irradiated to the coating layer 1 formed on the process sheet.

Here, parallel light means an approximately parallel light for which the direction of emitted light does not spread even when viewed from any direction.

Figure 11A:
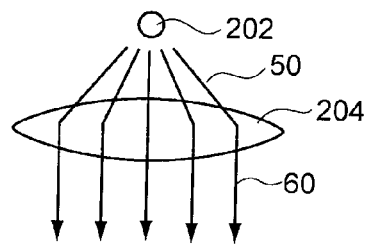
FIGS. 11(a) to 11(d) are other diagrams provided to explain an active energy ray irradiation step.
Figure 11B:
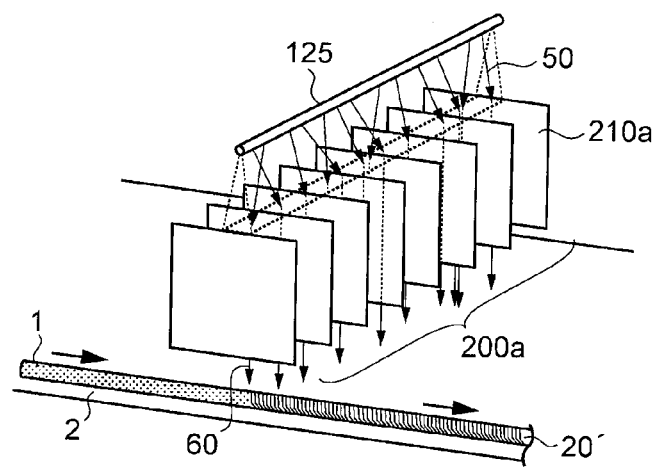
Figure 11C:
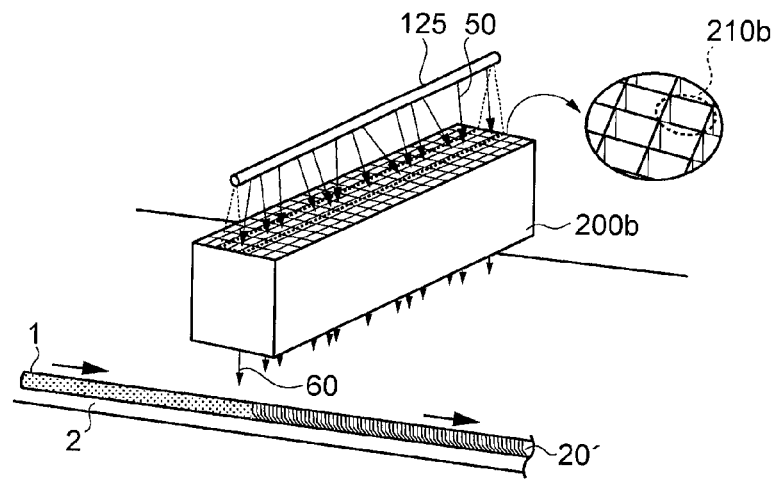

More specifically, for example, as illustrated in FIG. 11(a), it is preferable that light 50 from a point light source 202 is converted to parallel light 60 by a lens 204, and then the parallel light is irradiated to the coating layer; or as illustrated in FIGS. 11(b) and 11(c), it is preferable that irradiated light 50 is converted from a linear light source 125 to parallel light 60 by means of irradiated light parallelizing members 200 (200a and 200b), and then the parallel light is irradiated to the coating layer, or the like.

Figure 11D:
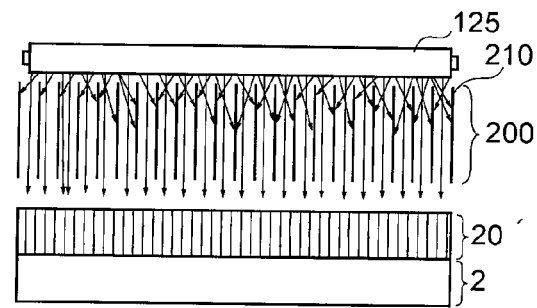

Meanwhile, as illustrated in FIG. 11(d), the irradiated light parallelizing members 200 can convert direct light emitted by a linear light source 125 to parallel light, by unifying the direction of light using, for example, light blocking members 210 such as plate-shaped members 210a or cylindrical members 210b, in a direction parallel to the axial line direction of the linear light source 125 whose direction of light is random, among the direct light emitted by the linear light source 125.

More specifically, among the direct light emitted by the linear light source 125, light with low parallelism with respect to the light blocking members 210 such as plate-shaped members 210a or cylindrical members 210b, is brought into contact with these light blocking members and is absorbed.

Therefore, only light with high parallelism, that is, parallel light, with respect to the light blocking members 210 such as plate-shaped members 210a or cylindrical members 210b can pass through the irradiated light parallelizing members 200, and as a result, the direct light emitted by the linear light source 125 is converted to parallel light by the irradiated light parallelizing members 200.

Meanwhile, the material for the light blocking members 210 such as plate-shaped members 210a or cylindrical members 210b is not particularly limited as long as the material can absorb light with low parallelism with respect to the light blocking members 210, and for example, a heat resistant black-painted ulster steel sheet can be used.

It is also preferable that the parallelism of the irradiated light is adjusted to a value of 10° or less.

The reason for this is that when the parallelism of the irradiated light is adjusted to a value within such a range, a bent columnar structure in which plural pillar-shaped objects are arranged to stand close together at a constant angle of inclination with respect to the film thickness direction, can be formed efficiently and stably.

Therefore, it is more preferable to adjust the parallelism of the irradiated light to a value of 5° or less, and even more preferably to a value of 2° or less.

Meanwhile, in regard to other conditions for irradiation, the details will not be repeated here since the conditions are equivalent to the conditions for the "Case of forming bent louver structure" described above.

EXAMPLES

Hereinafter, the present invention will be described in more detail by way of Examples.

Example 1

1. Synthesis of Component (B) Low-Refractive Index Polymerizable Compound

In a container, 2 moles of isophorone diisocyanate (IPDI) as a component (B1) and 2 moles of 2-hydroxyethyl methacrylate (HEMA) as a component (B3) were introduced with respect to 1 mole of polypropylene glycol (PPG) having a weight average molecular weight of 9,200 as a component (B2), and then the compounds were reacted according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:

GPC analyzer: manufactured by Tosoh Corp., HLC-8020

GPC column: manufactured by Tosoh Corp. (hereinafter, described in order of passage)

TSK GUARD COLUMN HXL-H
TSK GEL GMHXL (x2)
TSK GEL G2000HXL

Measurement solvent: Tetrahydrofuran
Measurement temperature: 40° C.

2. Preparation of Composition for Light Diffusion Film

Next, a composition for light diffusion film was obtained by mixing 100 parts by weight of a polyether urethane methacrylate having a weight average molecular weight of 9,900 as the component (B) thus obtained, with 150 parts by weight of o-phenylphenoxy ethoxyethyl acrylate having a molecular weight of 268 represented by the above Formula (3) (manufactured by Shin Nakamura Chemical Co., Ltd., NK ESTER A-LEN-10) as component (A); 0.25 parts by weight (0.1 parts by weight relative to the total amount (100 parts by weight) of the component (A) and the component (B)) of a mixture of ultraviolet absorbers represented by the above formulas (5) to (7) (manufactured by BASF SE, TINUVIN 477) as component (D); and 20 parts by weight (8 parts by weight relative to the total amount (100 parts by weight) of the component (A) and the component (B)) of 2-hydroxy-2-methyl-1-phenylpropan-1-one as component (C), and then heating and mixing the mixture under the conditions of 80° C.

Meanwhile, the refractive indices of the component (A) and the component (B) were measure according to JIS K0062 using an Abbe refractometer (manufactured by Atago Co., Ltd., Abbe refractometer DR-M2, Na light source, wavelength 589 nm), and the refractive indices were 1.58 and 1.46, respectively.

Furthermore, the light absorption characteristics of the various components that constitute the composition for light diffusion film were analyzed.

That is, the transmittances (%) or absorbances (-) for various wavelengths (nm) of the component (A), component (B), component (C) and component (D) used were measured using an ultraviolet-visible-near infrared spectrophotometer (manufactured by Shimadzu Corp., UV-3600). Wavelength-transmittance charts or wavelength-absorbance charts thus obtained are presented in FIGS. 12 to 14.

Figure 12:
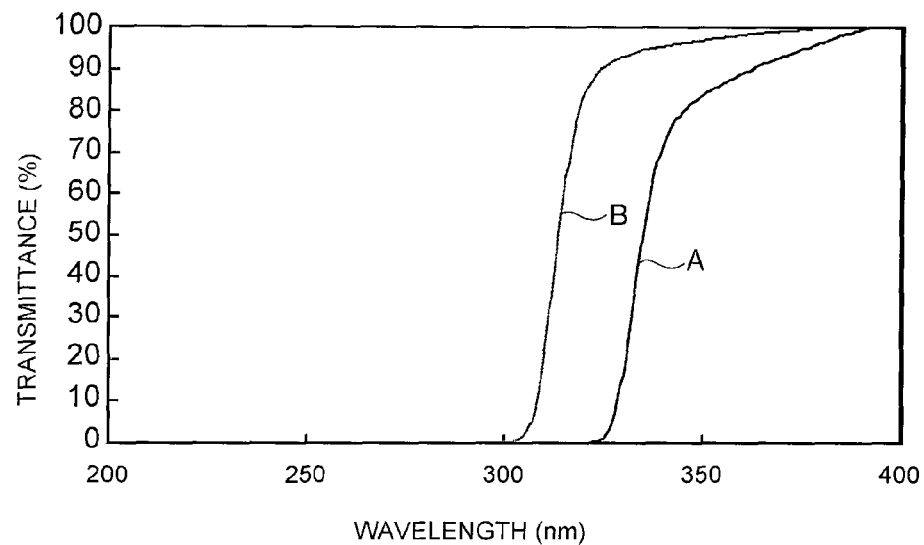
FIG. 12 is a diagram provided to show wavelength-transmittance charts for the component (A) and the component (B).
Figure 13:
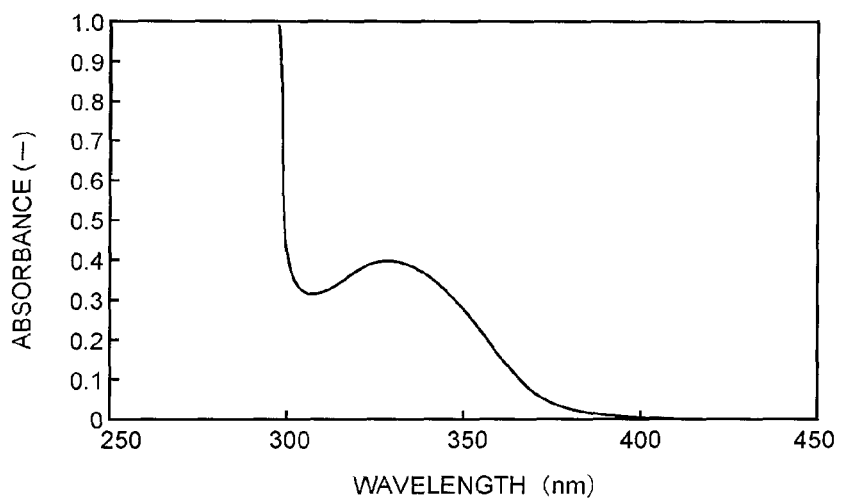
FIG. 13 is a diagram provided to show a wavelength-absorbance chart for the component (C).
Figure 14A:
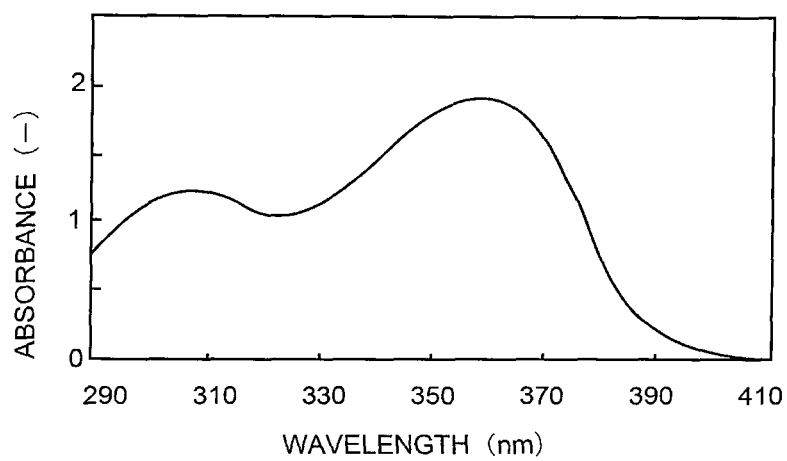
FIGS. 14(a) to 14(c) are diagrams provided to show a wavelength-absorbance chart for the component (D).

Meanwhile, in FIG. 12, the characteristic curve A is a wavelength-transmittance chart for the component (A) used, and the characteristic curve B is a wavelength-transmittance chart for the component (B) used. FIG. 13 is a wavelength-absorbance chart for the component (C) used, and FIG. 14(a) is a wavelength-absorbance chart for the component (D) used.

Figure 14B:
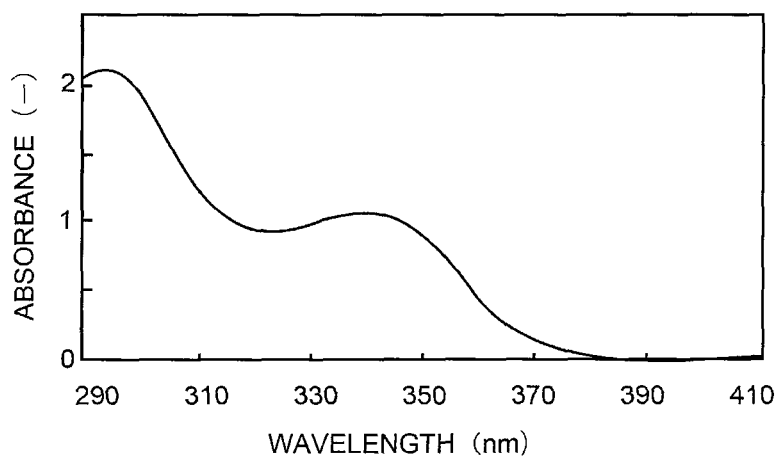
Figure 14C:
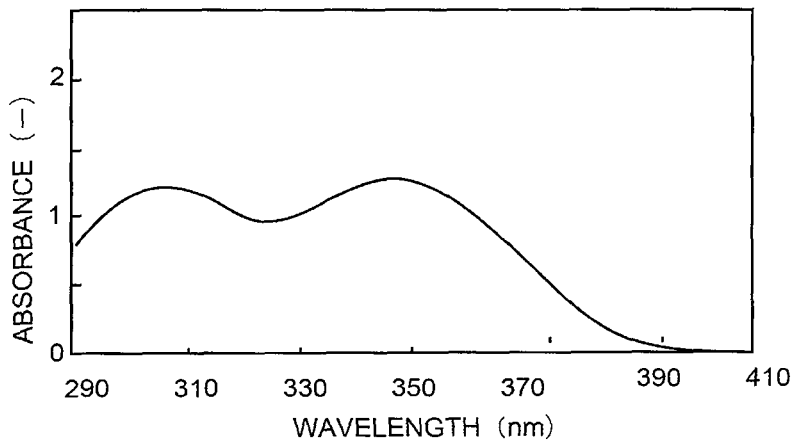

Furthermore, FIG. 14(b) is a wavelength-absorbance chart for the component (D) used in Examples 4 and 5, and FIG. 14(c) is a wavelength-absorbance chart for the component (D) used in Examples 6 and 7.

3. Application Step

Next, the composition for light diffusion film thus obtained was applied on a film-like transparent polyethylene terephthalate (hereinafter, referred to as PET) as a process sheet, and thus a coating layer having a film thickness of 175 µm was formed.

4. Active Energy Ray Irradiation

Subsequently, an ultraviolet irradiating apparatus (manufactured by Eye Graphics Co., Ltd., ECS-4011GX) in which a linear high pressure mercury lamp was provided with a cold mirror for light collection as illustrated in FIG. 10(a), was prepared.

Subsequently, a light blocking plate was installed on a heat wire cut-off filter frame, and the ultraviolet radiation (ultraviolet radiation having a primary peak wavelength at 365 nm, and additional peaks at 254, 303 and 313 nm) irradiated to the surface of the coating layer was set up such that when the normal line of the coating layer surface when viewed from the major axis direction of the linear light source was designated as 0°, the angle of irradiation of direct ultraviolet radiation emitted from the linear light source (θ3 in FIG. 10(b)) would be 16°.

At this time, the height from the coating layer surface to the linear light source was set to 500 mm, the peak illuminance was set to 2.0 mW/cm$^2$, and the cumulative amount of light was set to 50 mJ/cm$^2$.

Furthermore, in order to prevent the light reflected at the light blocking plate or the like, from becoming stray light inside the irradiator and affecting the photocuring of the coating layer, a light blocking plate was also provided near the conveyor, and the apparatus was set up such that only the ultraviolet radiation emitted directly from the linear light source would be irradiated to the coating layer.

Subsequently, the coating layer was irradiated with ultraviolet radiation while the coating layer was moved by a conveyor toward the right side as in FIG. 10(a) at a speed of 0.2 m/min.

At this time, the temperature of the coating layer was maintained at 23° C.

Next, in order to promote reliable curing, an ultraviolet-transmissible peeling film having a thickness of 38 µm (manufactured by Lintec Corp., SP-PET 382050; center line average roughness at the surface on the side irradiated with ultraviolet radiation: 0.01 µm, haze value: 1.80%, image definition: 425, transmittance for a wavelength of 360 nm: 84.3%) was laminated on the exposed surface side of the coating layer.

Subsequently, the laminate was irradiated with scattered light in which the direction of propagation of ultraviolet radiation from the above-described linear light source was made random, through the top of the peeling film at a peak illuminance of 10 mW/cm$^2$ and a cumulative amount of light of 150 mJ/cm$^2$ to completely cure the coating layer, and thus a light diffusion film having a film thickness of 200 µm was obtained.

Meanwhile, the peak illuminance and the cumulative amount of light were measured by installing a UV METER (manufactured by Eye Graphics Co., Ltd., EYE ultraviolet cumulative illuminometer UVPF-A1) equipped with a light receiver at the position of the coating layer.

Furthermore, the film thickness of the light diffusion film thus obtained was measured using a constant pressure thickness meter (manufactured by Takara Co., Ltd., TECLOCK PG-02J).

Figure 15A:
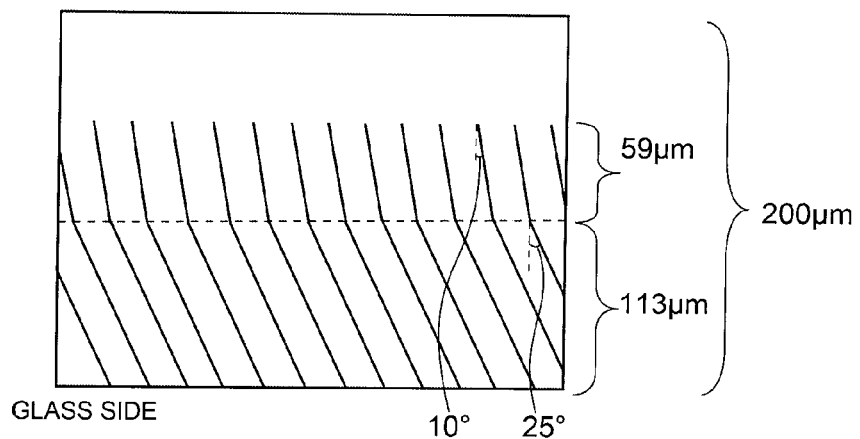
FIGS. 15(a) to 15(c) are a schematic diagram and photographs provided to show a cross-section of the light diffusion film of Example 1.
Figure 15B:
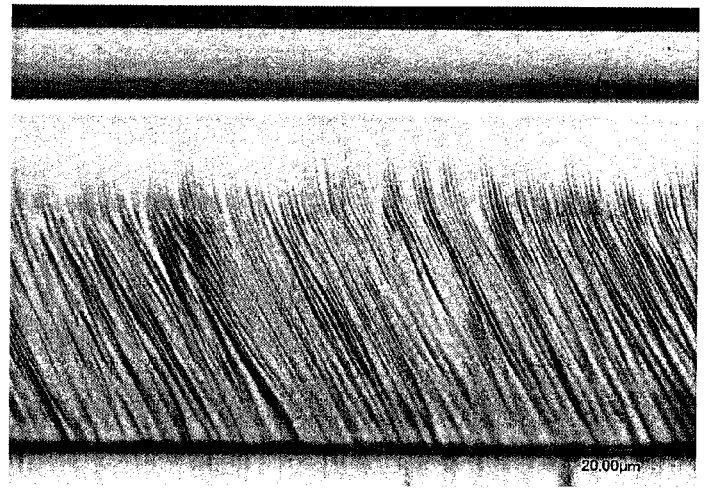
Figure 15C:
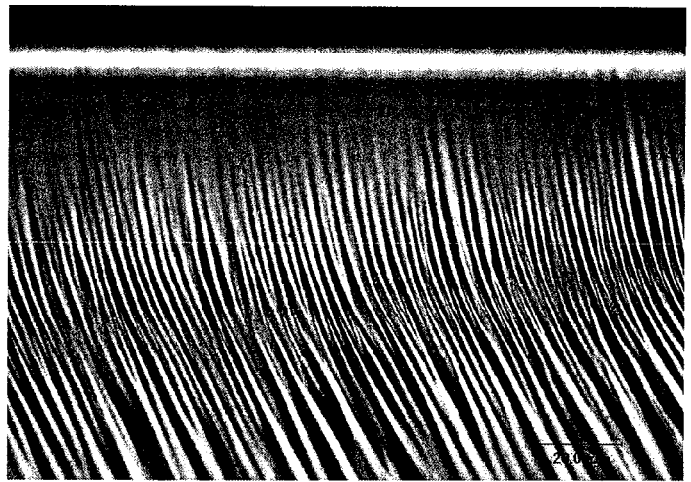

Furthermore, a schematic diagram of a cross-section obtained by cutting the light diffusion film thus obtained at a plane that is parallel to the traveling direction of the coating layer and is perpendicular to the film plane, is shown in FIG. 15(a), and photographs of the cross-section are presented in FIGS. 15(b) and 15(c).

Meanwhile, FIG. 15(c) is a photograph showing a magnified view of the vicinity of the bent portion of the bent louver structure in FIG. 15(b), which has been subjected to contrast correction.

Meanwhile, cutting of the light diffusion film was carried out using a razor, and image capturing of the cross-section was carried out by reflective observation using a digital microscope (manufactured by Keyence Corp., VHX-2000).

5. Evaluation of Light Diffusion Characteristics

The light diffusion characteristics of the light diffusion films thus obtained were evaluated.

That is, an adhesive layer was provided on the PET surface of the light diffusion film obtained in a state of being sandwiched between PET and a peeling film, and the adhesive layer was adhered to a soda glass plate having a thickness of 1.1 mm. Thus, a specimen for evaluation was obtained.

Figure 16:
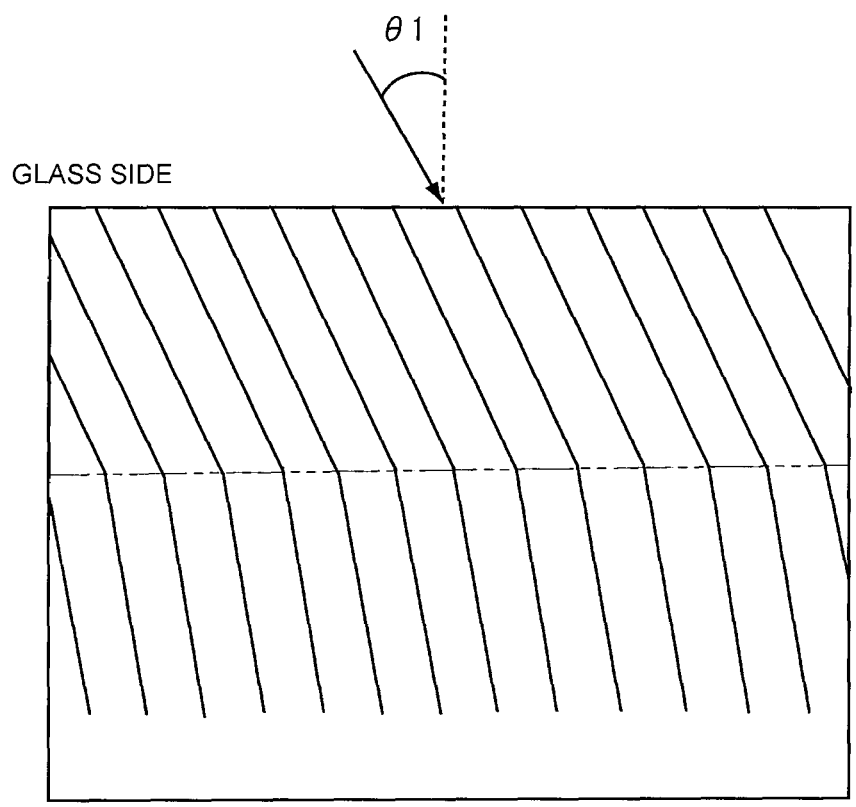
FIG. 16 is a diagram provided to explain the incident angle θ1 for a light diffusion film when light diffusion characteristics are measured.
Figure 17A:
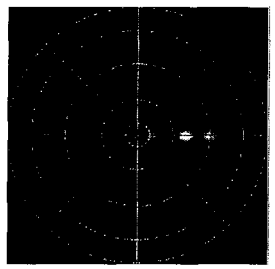
FIGS. 17(a) to 17(l) are photographs provided to compare the light diffusion characteristics of the light diffusion films of Examples 1 to 3 and Comparative Example 1.
Figure 17B:
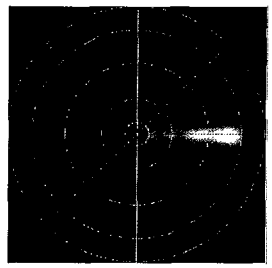
Figure 17C:
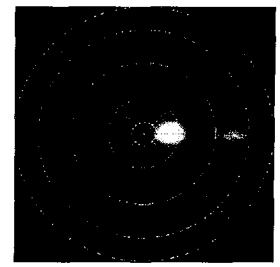
Figure 17D:
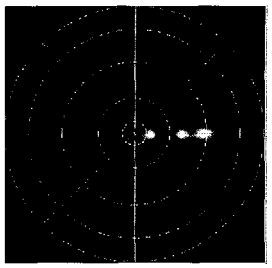
Figure 17E:
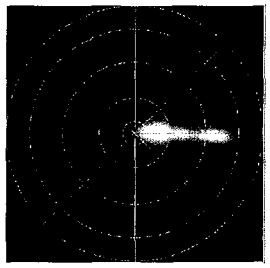
Figure 17F:
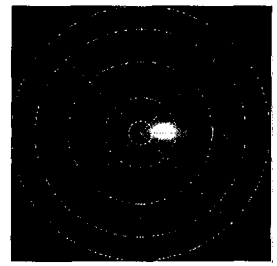
Figure 17G:
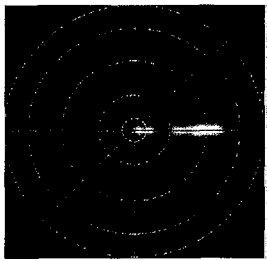
Figure 17H:
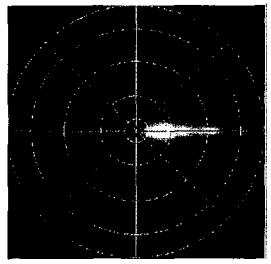
Figure 17I:
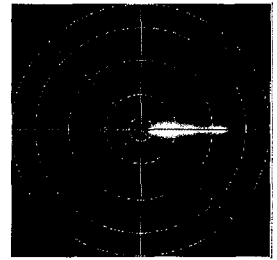
Figure 17J:
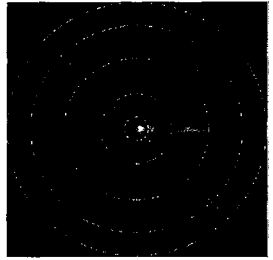
Figure 17K:
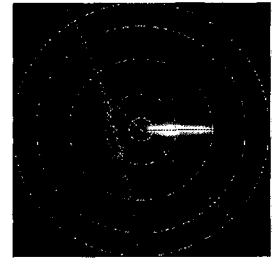
Figure 17L:
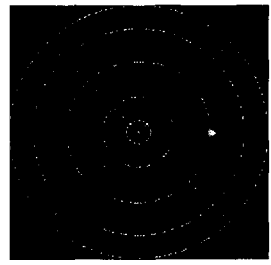
Figure 18A:
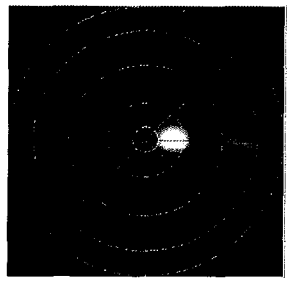
FIGS. 18(a) to 18(l) are other photographs provided to compare the light diffusion characteristics of the light diffusion films of Examples 1 to 3 and Comparative Example 1.
Figure 18B:
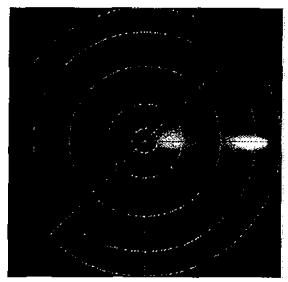
Figure 18C:
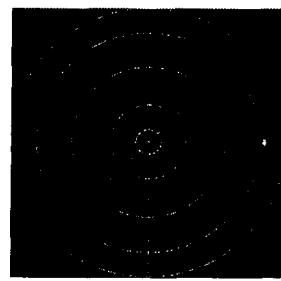
Figure 18D:
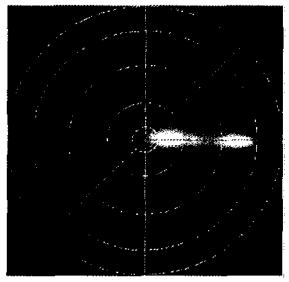
Figure 18E:
Figure 18F:
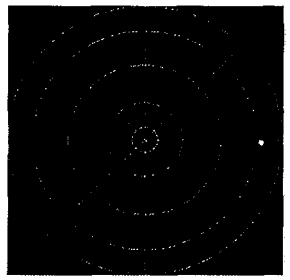
Figure 18G:
Figure 18H:
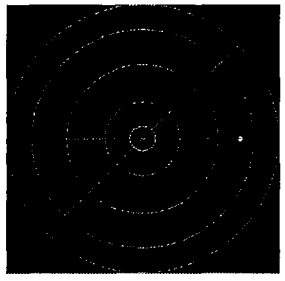
Figure 18I:
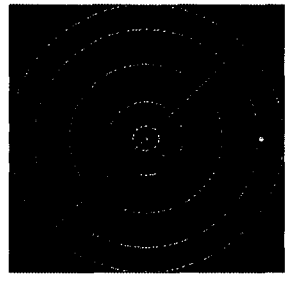
Figure 18J:
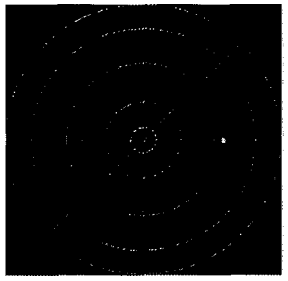
Figure 18K:
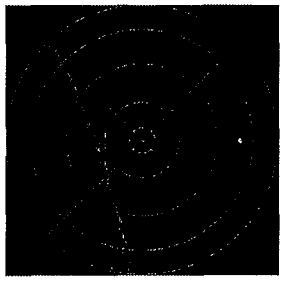
Figure 18L:
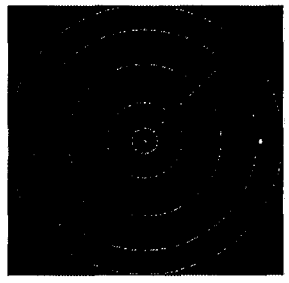

Subsequently, as illustrated in FIG. 16, light was caused to enter through the glass side of the specimen using a conoscope (manufactured by Autronic-Melchers GmbH) such that the incident angle θ1 was 10°, 20°, 30°, 40°, 50°, or 60° with respect to the light diffusion film. The conoscopic images thus obtained are presented in FIGS. 17(a) to 17(c) and FIGS. 18(a) to 18(c).

Furthermore, for a comparison, conoscopic images of Example 2 (amount of addition of component (D): 0.067 parts by weight relative to 100 parts by weight of the total amount of the component (A) and the component (B)) are presented in FIGS. 17(d) to 17(f) and FIGS. 18(d) to 18(f); conoscopic images of Example 3 (amount of addition of component (D): 0.033 parts by weight relative to 100 parts by weight of the total amount of the component (A) and the component (B)) are presented in FIGS. 17(g) to 17(i) and FIGS. 18(g) to 18(i); and conoscopic images of Comparative Example 1 (amount of addition of component (D): 0 parts by weight) are presented in FIGS. 17(j) to 17(l) and FIGS. 18(j) to 18(l).

Furthermore, luminance (cd/cm$^2$) corresponding to the emission angle (°) of diffused light in the case of light entering at an incident angle θ1 of 20°, was measured using a conoscope. An emission angle-luminance chart thus obtained is presented in FIG. 19.

Figure 19:
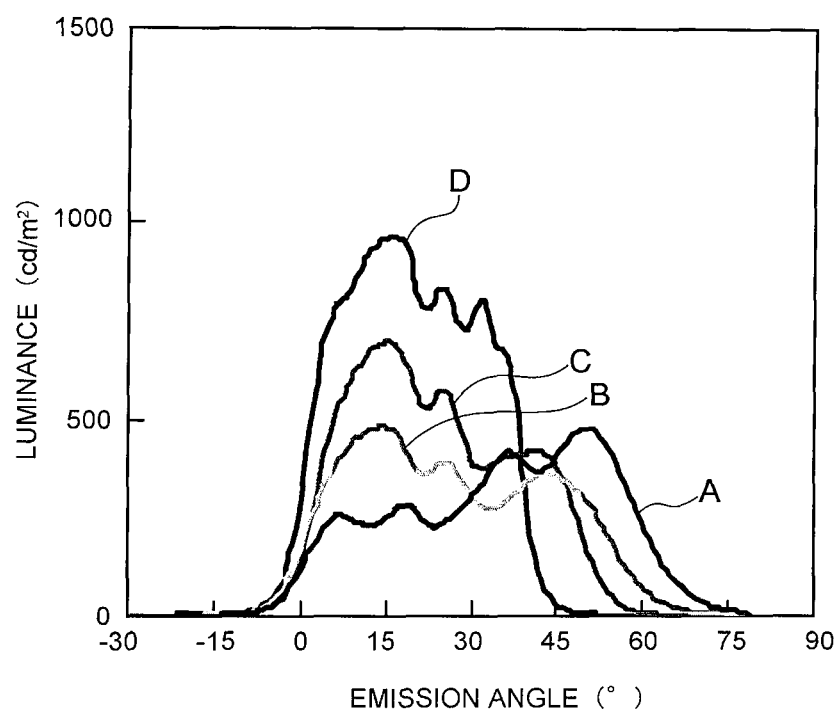
FIG. 19 is a diagram provided to compare the light diffusion characteristics of the light diffusion films of Examples 1 to 3 and Comparative Example 1.

Meanwhile, the characteristic curve A in FIG. 19 is an emission angle-luminance chart for Example 1 (amount of addition of component (D): 0.1 parts by weight relative to 100 parts by weight of the total amount of the component (A) and the component (B)); the characteristic curve B is an emission angle-luminance chart for Example 2 (amount of addition of component (D): 0.067 parts by weight relative to 100 parts by weight of the total amount of the component (A) and the component (B)); the characteristic curve C is an emission angle-luminance chart for Example 3 (amount of addition of component (D): 0.033 parts by weight relative to 100 parts by weight of the total amount of the component (A) and the component (B)); and the characteristic curve D is an emission angle-luminance chart for Comparative Example 1 (amount of addition of component (D): 0 parts by weight).

Meanwhile, the amount of addition of the ultraviolet absorber, the conditions for film production, and the kind of the internal structure formed in the film for various Examples and Comparative Examples are presented in Table 1.

Example 2

In Example 2, a light diffusion film was produced in the same manner as in Example 1, except that when the composition for light diffusion film was prepared, the amount of addition of the ultraviolet absorber as the component (D) was changed to 0.167 parts by weight (0.067 parts by weight relative to the total amount (100 parts by weight) of the component (A) and the component (B)), and the light diffusion film was evaluated. The results thus obtained are presented in Table 1, FIG. 20, and FIGS. 17 to 19.

Figure 20A:
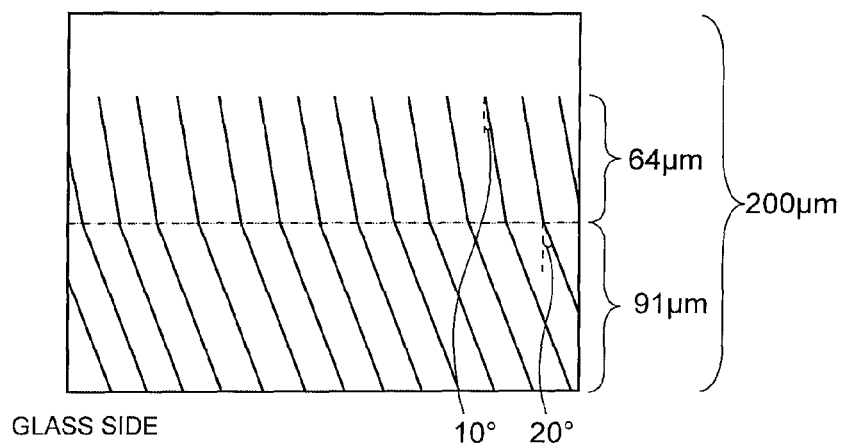
FIGS. 20(a) and 20(b) are a schematic diagram and a photograph provided to show a cross-section of the light diffusion film of Example 2.
Figure 20B:
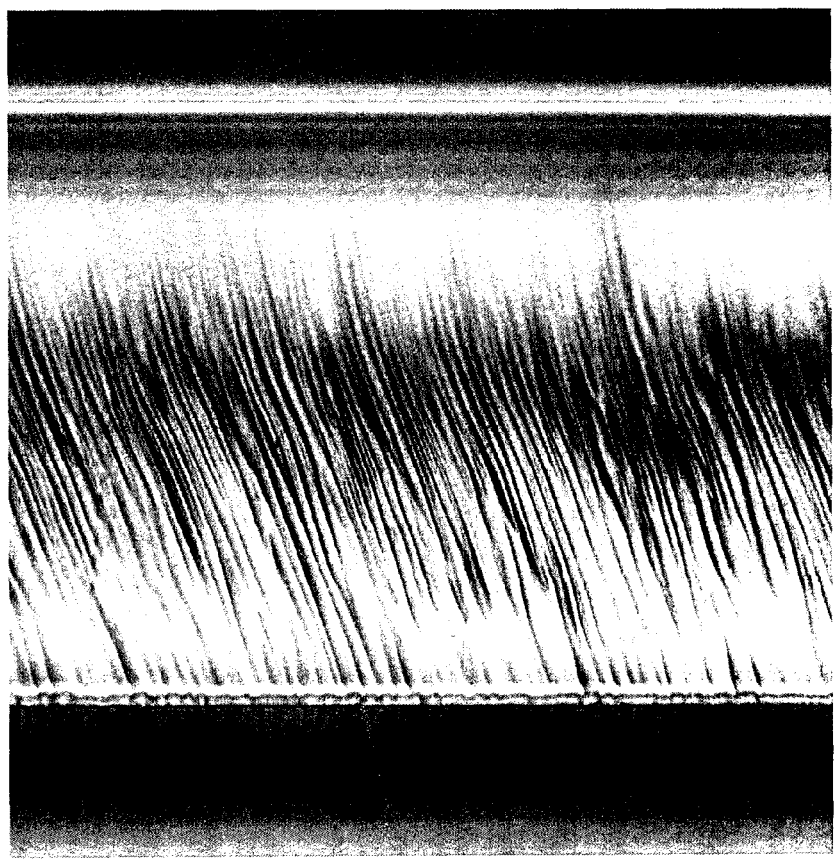

Meanwhile, FIG. 20(a) is a schematic diagram of a cross-section obtained by cutting the light diffusion film thus obtained, at a plane that is parallel to the traveling direction of the coating layer and is perpendicular to the film plane, and FIG. 20(b) is a photograph of the cross-section that has been subjected to contrast correction for the cross-section.

Also, FIGS. 17(d) to 17(f) and FIGS. 18(d) to (f) are conoscopic images of Example 2, the characteristic curve B in FIG. 19 is an emission angle-luminance chart for Example 2.

Example 3

In Example 3, a light diffusion film was produced in the same manner as in Example 1, except that when the composition for light diffusion film was prepared, the amount of addition of the ultraviolet absorber as the component (D) was changed to 0.083 parts by weight (0.033 parts by weight relative to the total amount (100 parts by weight) of the component (A) and the component (B)), and the light diffusion film was evaluated. The results thus obtained are presented in Table 1, FIG. 21, and FIGS. 17 to 19.

Figure 21A:
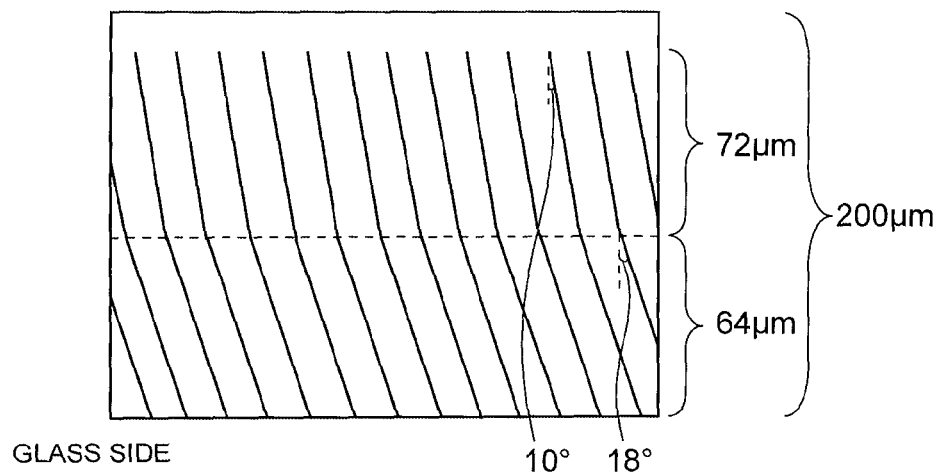
FIGS. 21(a) and 21(b) are a schematic diagram and a photograph provided to show a cross-section of the light diffusion film of Example 3.
Figure 21B:
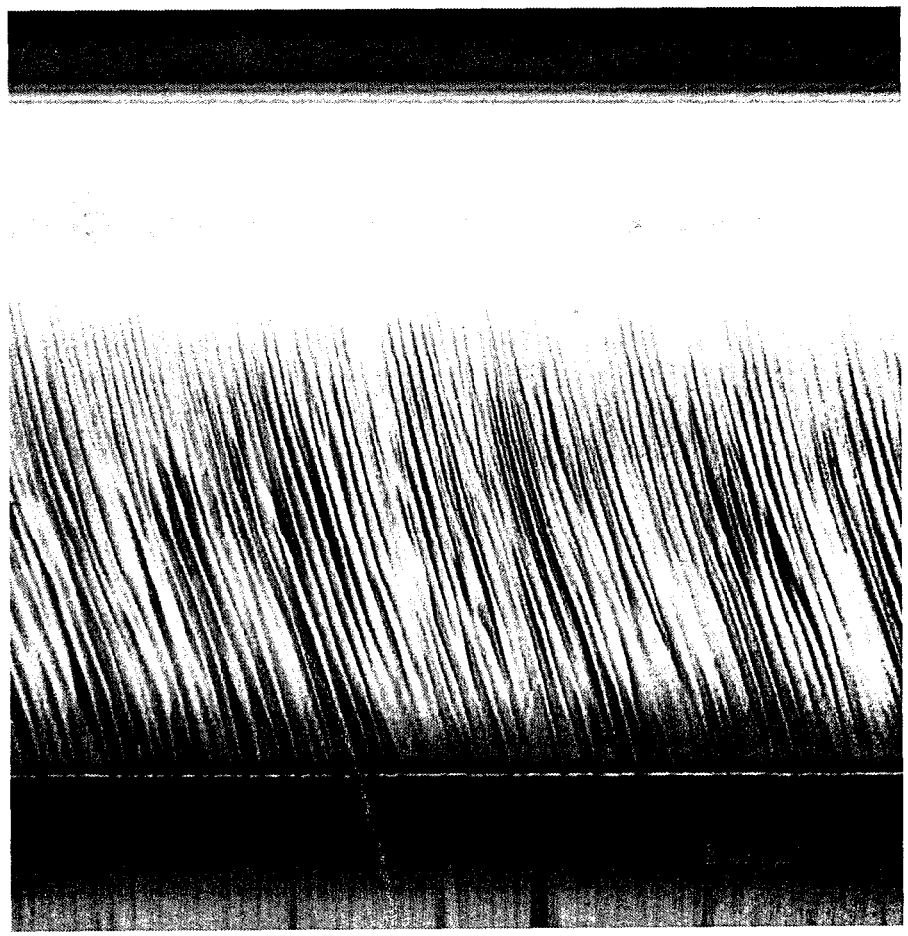

Meanwhile, FIG. 21(a) is a schematic diagram of a cross-section obtained by cutting the light diffusion film thus obtained, at a plane that is parallel to the traveling direction of the coating layer and is perpendicular to the film plane, and FIG. 21(b) is a photograph of the cross-section that has been subjected to contrast correction for the cross-section.

Furthermore, FIGS. 17(g) to 17(i) and FIGS. 18(g) to 18(i) are conoscopic images for Example 3, and the characteristic curve C in FIG. 19 is an emission angle-luminance chart for Example 3.

Example 4

In Example 4, a light diffusion film was produced in the same manner as in Example 1, except that when the composition for light diffusion film was prepared, the ultraviolet absorber as the component (D) was changed to TINUVIN 400 manufactured by BASF SE, which is a mixture of compounds represented by the above formulas (8) and (9), and also, the amount of addition of the ultraviolet absorber was changed to 1.5 parts by weight (0.6 parts by weight relative to the total amount (100 parts by weight) of the component (A) and the component (B)), and the light diffusion film was evaluated. The results thus obtained are presented in Table 1 and FIGS. 22 to 25.

Figure 22A:
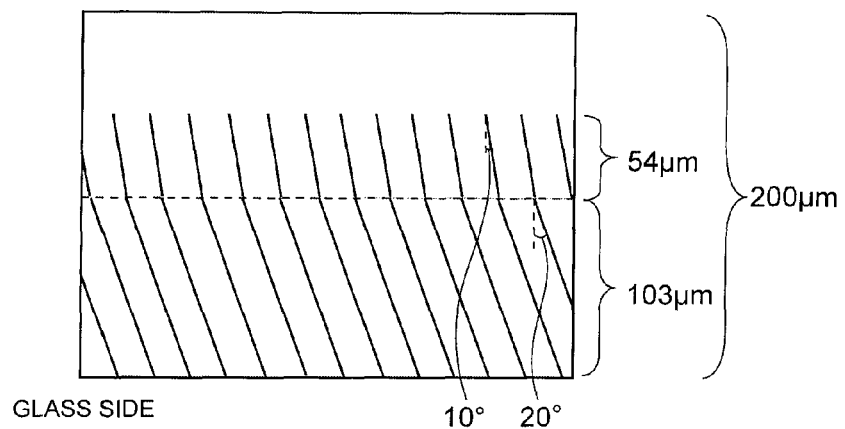
FIGS. 22(a) and 22(b) are a schematic diagram and a photograph provided to show a cross-section of the light diffusion film of Example 4.
Figure 22B:
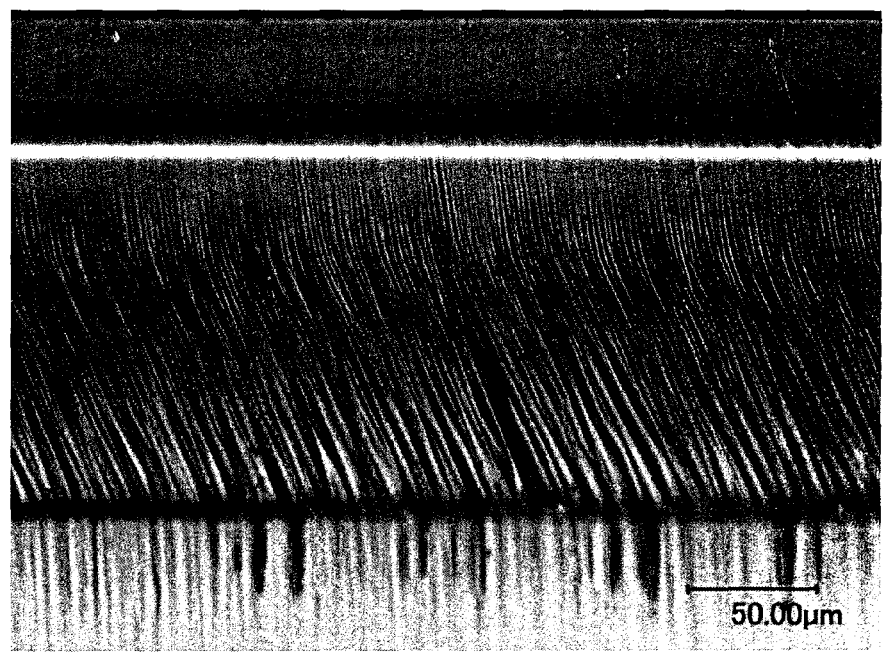
Figure 23A:
FIGS. 23(a) to 23(i) are photographs provided to compare the light diffusion characteristics of the light diffusion films of Examples 4 and 5 and Comparative Example 1.
Figure 23B:
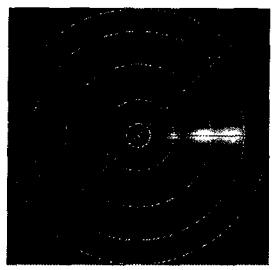
Figure 23C:
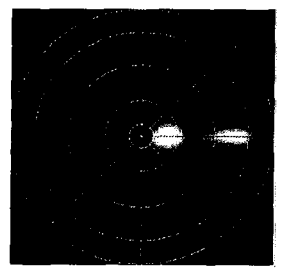
Figure 23D:
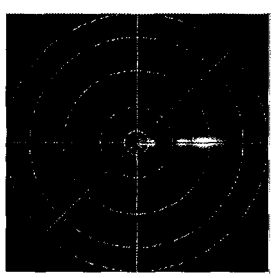
Figure 23E:
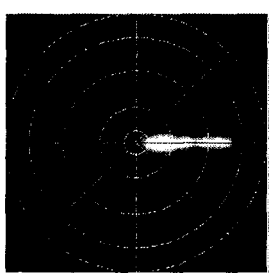
Figure 23F:
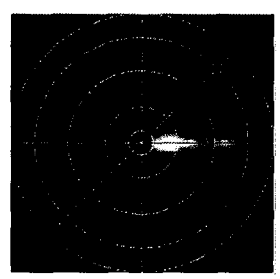
Figure 23G:
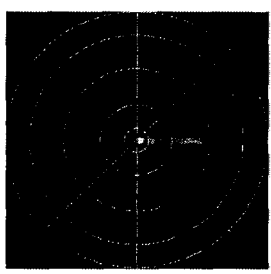
Figure 23H:
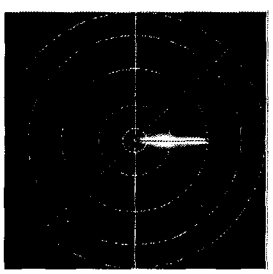
Figure 23I:
Figure 24A:
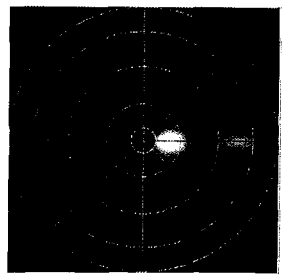
FIGS. 24(a) to 24(i) are other photographs provided to compare the light diffusion characteristics of the light diffusion films of Examples 4 and 5 and Comparative Example 1.
Figure 24B:
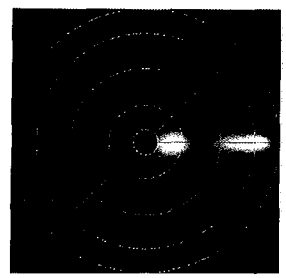
Figure 24C:
Figure 24D:
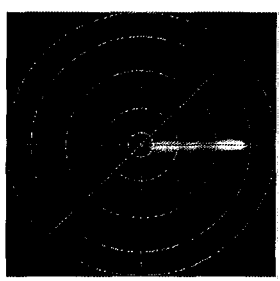
Figure 24E:
Figure 24F:
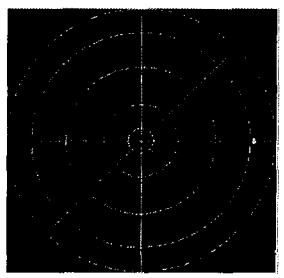
Figure 24G:
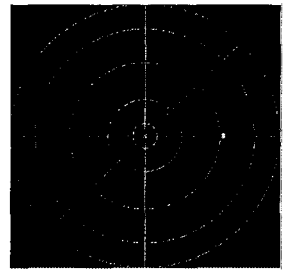
Figure 24H:
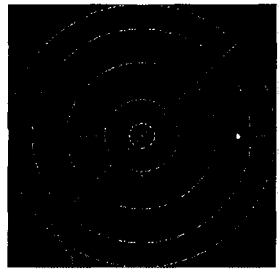
Figure 24I:
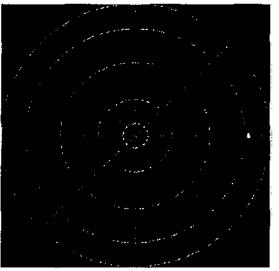

Meanwhile, FIG. 22(a) is a schematic diagram of a cross-section obtained by cutting the light diffusion film thus obtained, at a plane that is parallel to the traveling direction of the coating layer and is perpendicular to the film plane, and FIG. 22(b) is a photograph of the cross-section that has been subjected to contrast correction for the cross-section.

Furthermore, FIGS. 23(a) to 23(c) and FIGS. 24(a) to 24(c) are conoscopic images for Example 4.

Also, for a comparison, conoscopic images of Example 5 (amount of addition of component (D): 0.3 parts by weight relative to 100 parts by weight of the total amount of the component (A) and the component (B)) are presented in FIGS. 23(d) to 23(f) and FIGS. 24(d) to 24(f), and conoscopic images of Comparative Example 1 (amount of addition of component (D): 0 parts by weight) are presented in FIGS. 23(g) to 23(i) and FIGS. 24(g) to 24(i).

Figure 25:
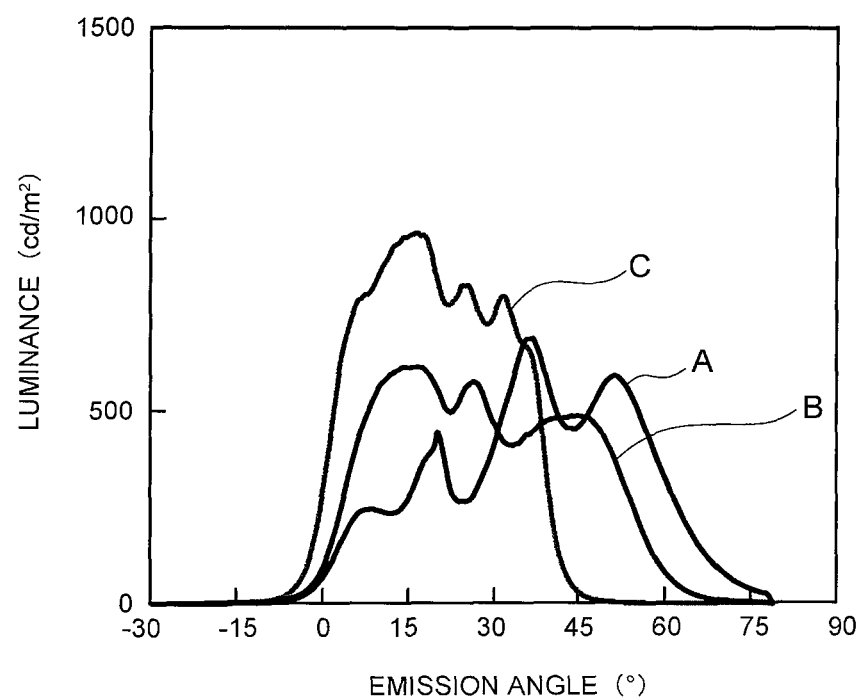
FIG. 25 is a diagram provided to compare the light diffusion characteristics of Examples 4 and 5 and Comparative Example 1.

Furthermore, the characteristic curve A in FIG. 25 is an emission angle-luminance chart for Example 4 (amount of addition of component (D): 0.6 parts by weight relative to 100 parts by weight of the total amount of the component (A) and the component (B)); the characteristic curve B is an emission angle-luminance chart for Example 5 (amount of addition of component (D): 0.3 parts by weight relative to 100 parts by weight of the total amount of the component (A) and the component (B)); and the characteristic curve C is an emission angle-luminance chart for Comparative Example 1 (amount of addition of component (D): 0 parts by weight).

Example 5

In Example 5, a light diffusion film was produced in the same manner as in Example 1, except that when the composition for light diffusion film was prepared, the ultraviolet absorber as the component (D) was changed to TINUVIN 400 manufactured by BASF SE, which is a mixture of compounds represented by the above formulas (8) and (9), and also, the amount of addition of the ultraviolet absorber was changed to 0.75 parts by weight (0.3 parts by weight relative to the total amount (100 parts by weight) of the component (A) and the component (B)), and the light diffusion film was evaluated. The results thus obtained are presented in Table 1, FIG. 26, and FIGS. 23 to 25.

Figure 26A:
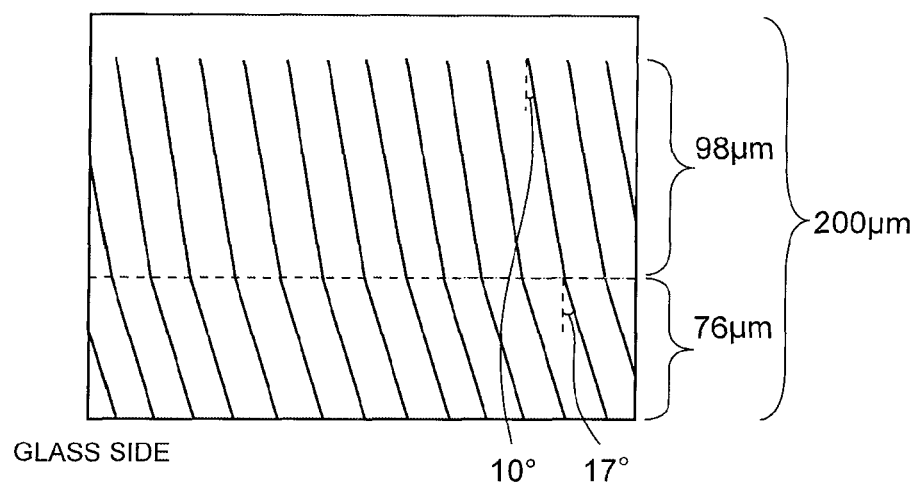
FIGS. 26(a) and 26(b) are a schematic diagram and a photograph provided to show a cross-section of the light diffusion film of Example 5.
Figure 26B:
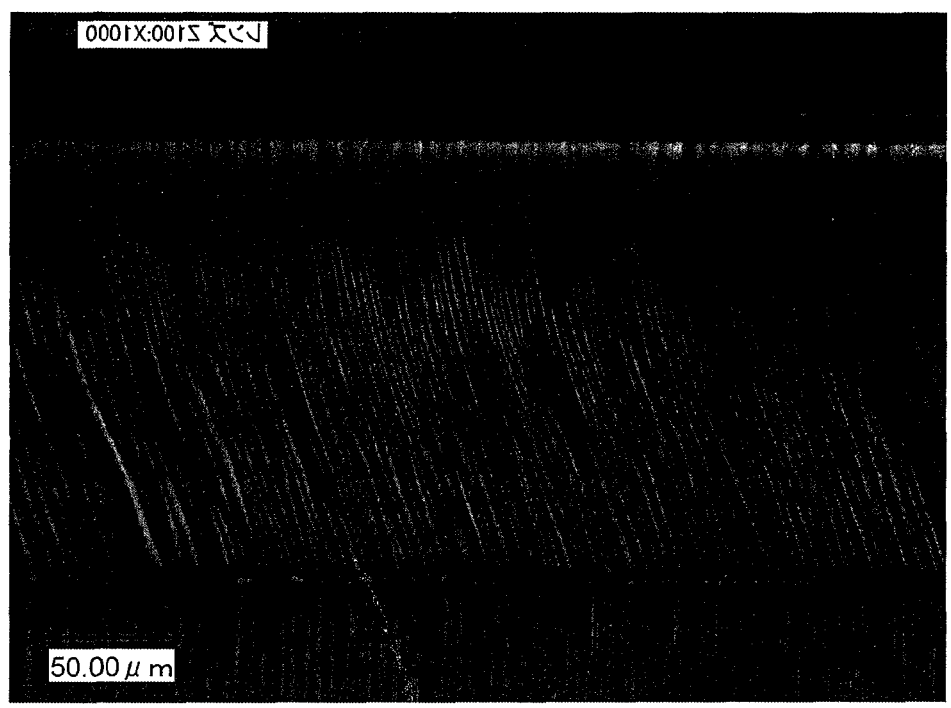

Meanwhile, FIG. 26(a) is a schematic diagram of a cross-section obtained by cutting the light diffusion film thus obtained, at a plane that is parallel to the traveling direction of the coating layer and is perpendicular to the film plane, and FIG. 26(b) is a photograph of the cross-section that has been subjected to contrast correction for the cross-section.

Furthermore, FIGS. 23(d) to 23(f) and FIGS. 24(d) to 24(f) are conoscopic images for Example 5, and the characteristic curve B in FIG. 25 is an emission angle-luminance chart for Example 5.

Example 6

In Example 6, a light diffusion film was produced in the same manner as in Example 1, except that when the composition for light diffusion film was prepared, the ultraviolet absorber as the component (D) was changed to TINUVIN 384-2 manufactured by BASF SE, which is represented by the above Formula (10), and also, the amount of addition of the ultraviolet absorber was changed to 0.5 parts by weight (0.2 parts by weight relative to the total amount (100 parts by weight) of the component (A) and the component (B)), and the light diffusion film was evaluated. The results thus obtained are presented in Table 1 and FIGS. 27 to 30.

Figure 27A:
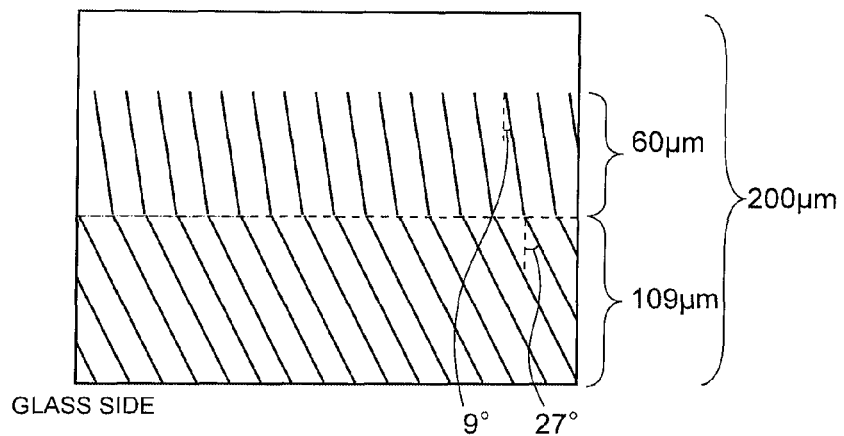
FIGS. 27(a) and 27(b) are a schematic diagram and a photograph provided to show a cross-section of the light diffusion film of Example 6.
Figure 27B:
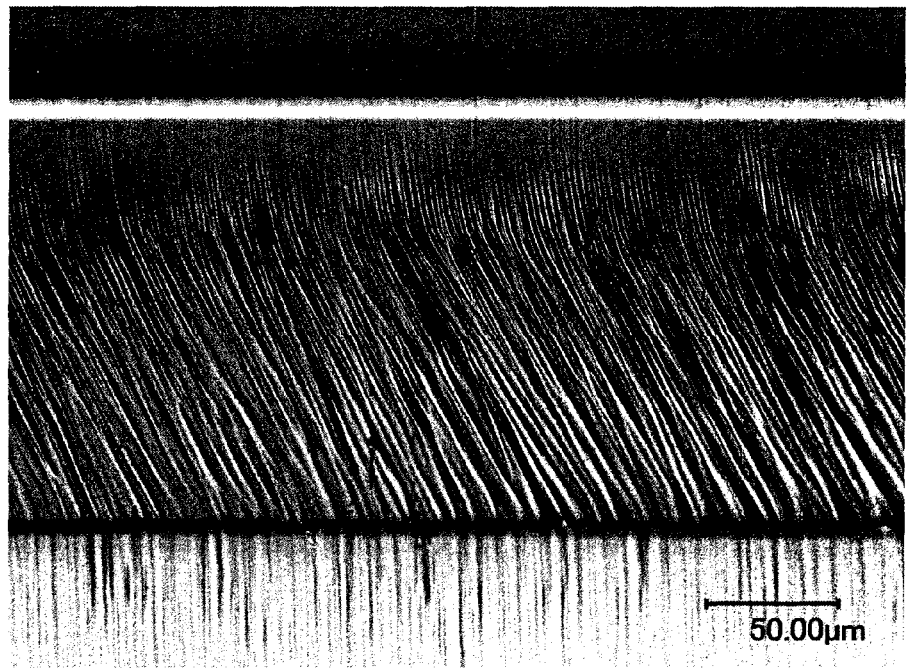
Figure 28A:
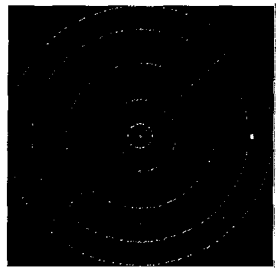
FIGS. 28(a) to 28(i) are photographs provided to compare the light diffusion characteristics of the light diffusion films of Examples 6 and 7 and Comparative Example 1.
Figure 28B:
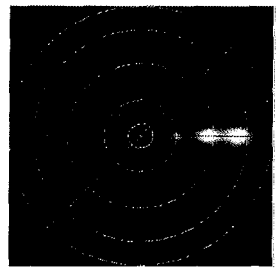
Figure 28C:
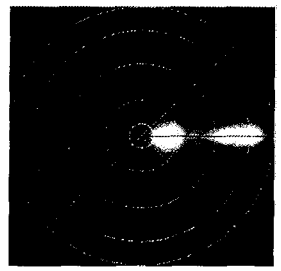
Figure 28D:
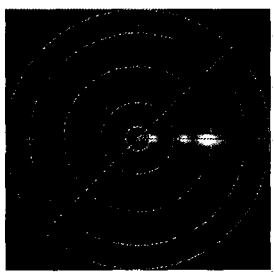
Figure 28E:
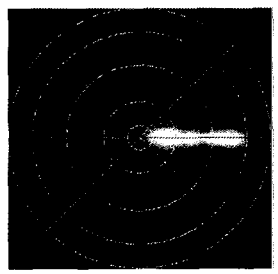
Figure 28F:
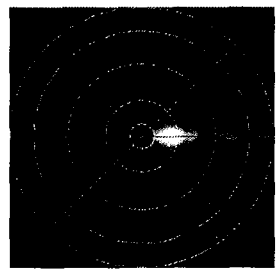
Figure 28G:
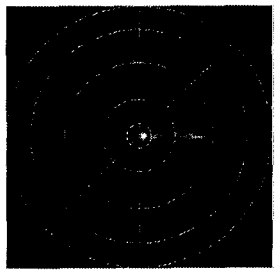
Figure 28H:
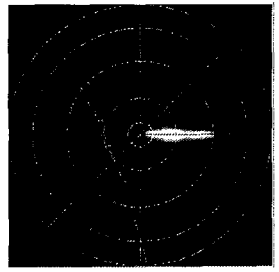
Figure 28I:
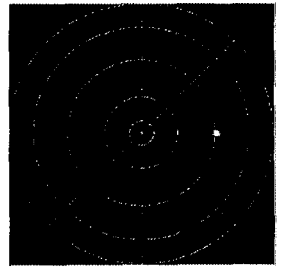
Figure 29A:
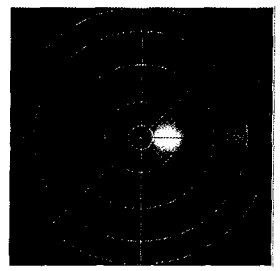
FIGS. 29(a) to 29(i) are other photographs provided to compare the light diffusion characteristics of the light diffusion films of Examples 6 and 7 and Comparative Example 1.
Figure 29B:
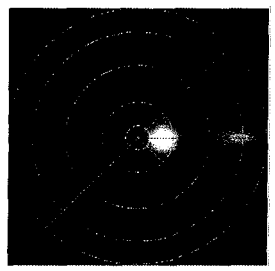
Figure 29C:
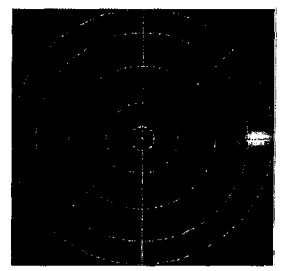
Figure 29D:
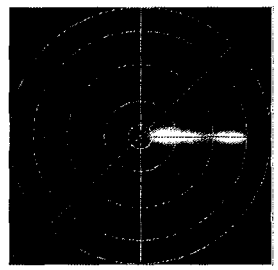
Figure 29E:
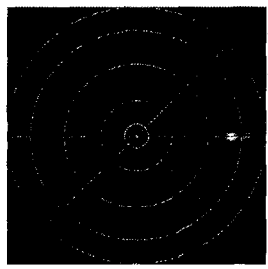
Figure 29F:
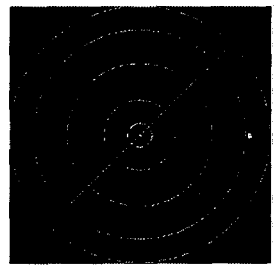
Figure 29G:
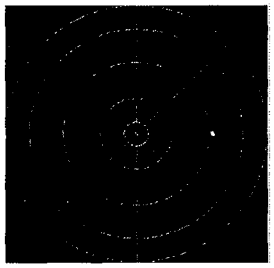
Figure 29H:
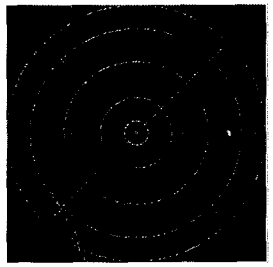
Figure 29I:
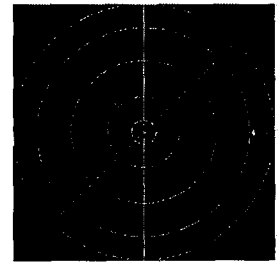

Meanwhile, FIG. 27(a) is a schematic diagram of a cross-section obtained by cutting the light diffusion film thus obtained, at a plane that is parallel to the traveling direction of the coating layer and is perpendicular to the film plane, and FIG. 27(b) is a photograph of the cross-section that has been subjected to contrast correction for the cross-section.

Furthermore, FIGS. 28(a) to 28(c) and FIGS. 29(a) to 29(c) are conoscopic images for Example 6.

Also, for a comparison, conoscopic images of Example 7 (amount of addition of component (D): 0.1 parts by weight relative to 100 parts by weight of the total amount of the component (A) and the component (B)) are presented in FIGS. 28(d) to 28(f) and FIGS. 29(d) to 29(f), and conoscopic images of Comparative Example 1 (amount of addition of component (D): 0 parts by weight) are presented in FIGS. 28(g) to 28(i) and FIGS. 29(g) to 29(i).

Figure 30:
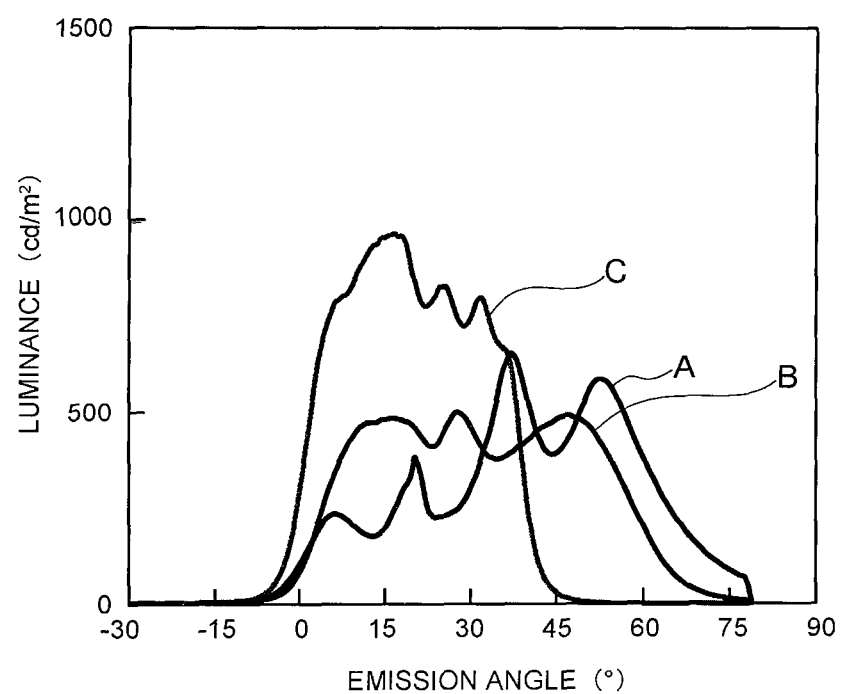
FIG. 30 is a diagram provided to compare the light diffusion characteristics of Examples 6 and 7 and Comparative Example 1.

Furthermore, the characteristic curve A in FIG. 30 is an emission angle-luminance chart for Example 6 (amount of addition of component (D): 0.2 parts by weight relative to 100 parts by weight of the total amount of the component (A) and the component (B)); the characteristic curve B is an emission angle-luminance chart for Example 7 (amount of addition of component (D): 0.1 parts by weight relative to 100 parts by weight of the total amount of the component (A) and the component (B)); and the characteristic curve C is an emission angle-luminance chart for Comparative Example 1 (amount of addition of component (D): 0 parts by weight).

Example 7

In Example 7, a light diffusion film was produced in the same manner as in Example 1, except that when the composition for light diffusion film was prepared, the ultraviolet absorber as the component (D) was changed to TINUVIN 384-2 manufactured by BASF SE, which is represented by the above Formula (10), and also, the amount of addition of the ultraviolet absorber was changed to 0.25 parts by weight (0.1 parts by weight relative to the total amount (100 parts by weight) of the component (A) and the component (B)), and the light diffusion film was evaluated. The results thus obtained are presented in Table 1, FIG. 31, and FIGS. 28 to 30.

Figure 31A:
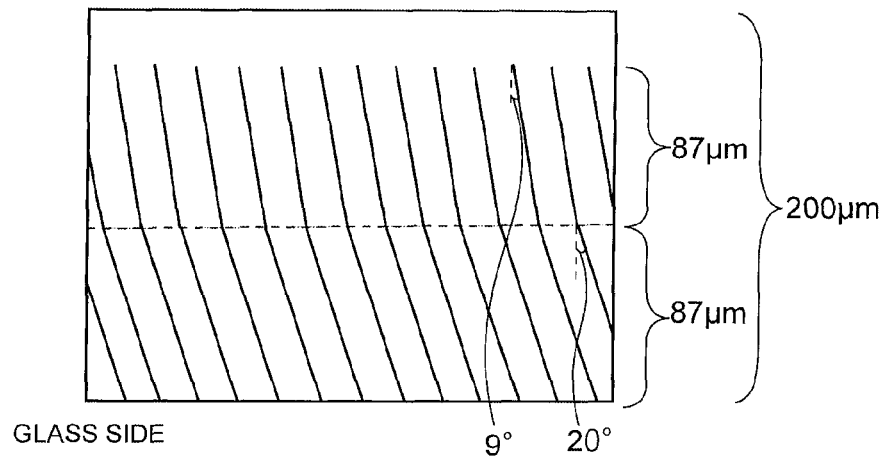
FIGS. 31(a) and 31(b) are a schematic diagram and a photograph provided to show a cross-section of the light diffusion film of Example 7.
Figure 31B:
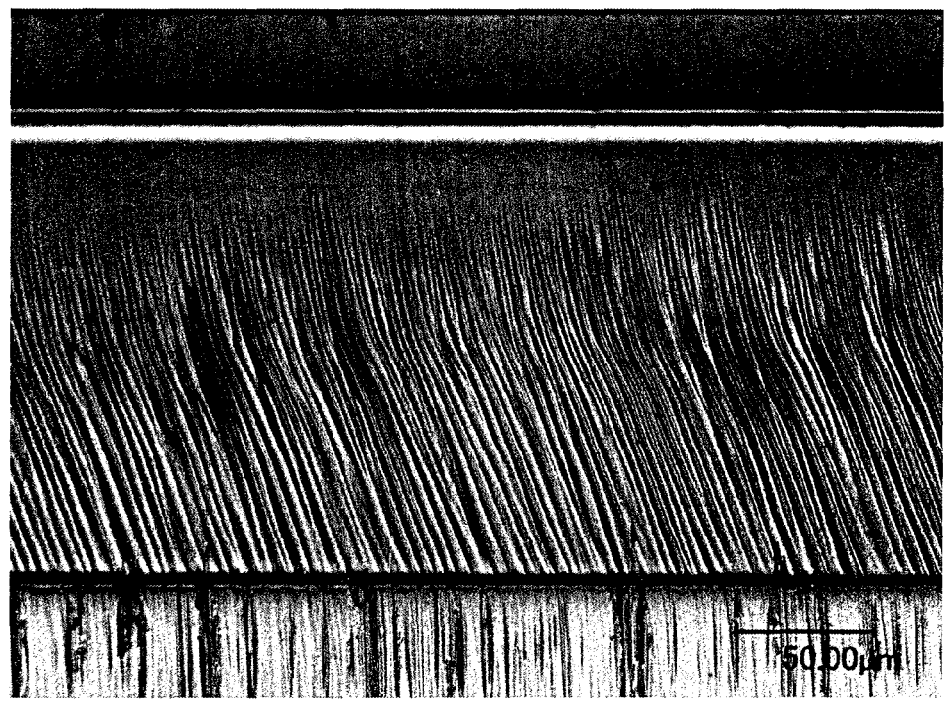

Meanwhile, FIG. 31(a) is a schematic diagram of a cross-section obtained by cutting the light diffusion film thus obtained, at a plane that is parallel to the traveling direction of the coating layer and is perpendicular to the film plane, and FIG. 31(b) is a photograph of the cross-section that has been subjected to contrast correction for the cross-section.

Furthermore, FIGS. 28(d) to 28(f) and FIGS. 29(d) to 29(f) are conoscopic images for Example 7, and the characteristic curve B in FIG. 30 is an emission angle-luminance chart for Example 7.

Example 8

In Example 8, a light diffusion film was produced in the same manner as in Example 1, except that the coating layer was left to stand for 15 minutes in an environment at 5° C. before the coating layer was irradiated with active energy radiation, and thereafter, the coating layer in a state of being cooled to 5° C. was immediately irradiated with active energy radiation, and the light diffusion film was evaluated. The results thus obtained are presented in Table 1 and FIGS. 32 to 34.

Figure 32A:
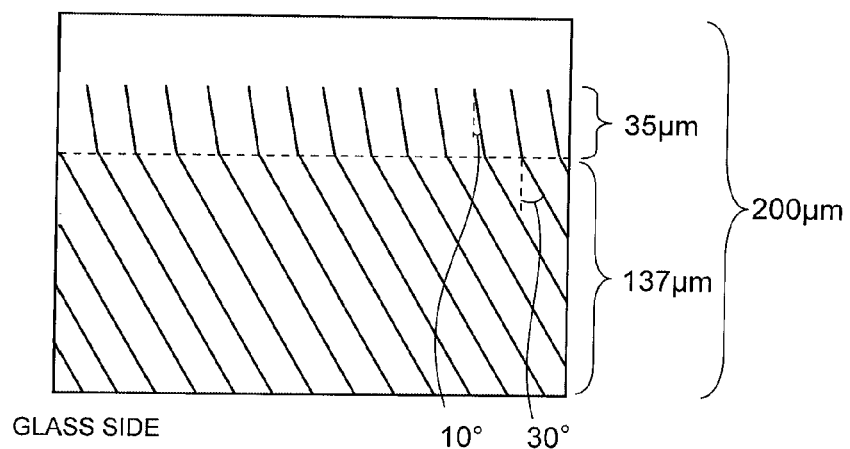
FIGS. 32(a) and 32(b) are diagrams provided to show a cross-section of the light diffusion film of Example 8.
Figure 32B:
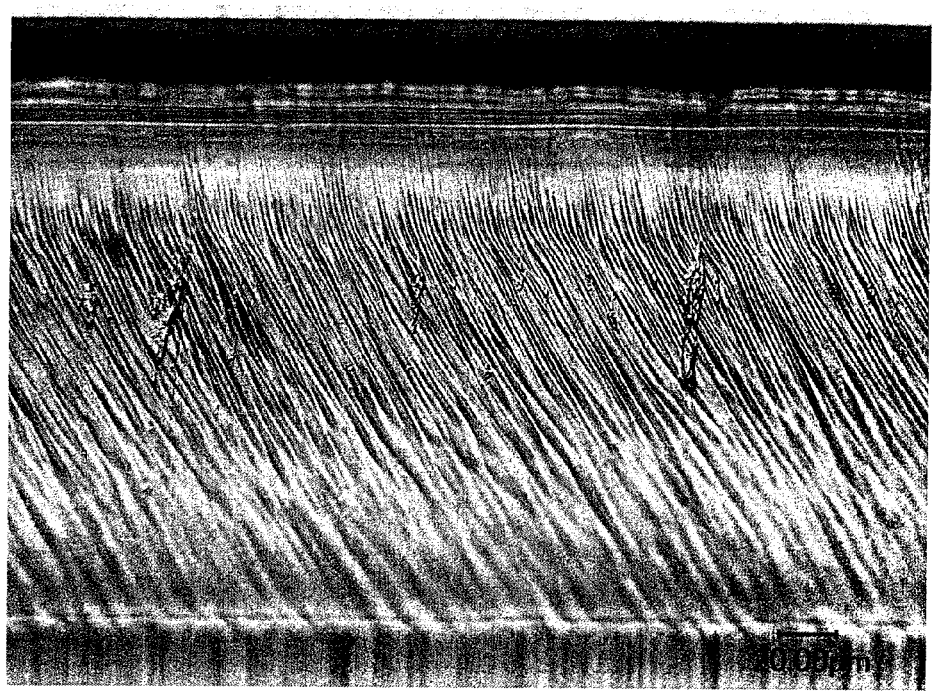
Figure 33A:
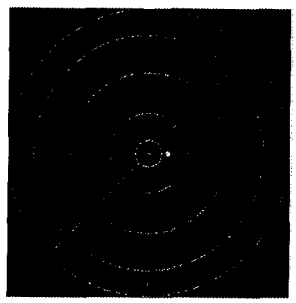
FIGS. 33(a) to 33(i) are photographs provided to compare the light diffusion characteristics of the light diffusion films of Example 8, Example 1, and Comparative Example 1.
Figure 33B:
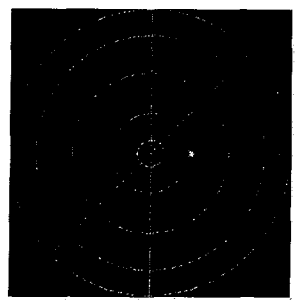
Figure 33C:
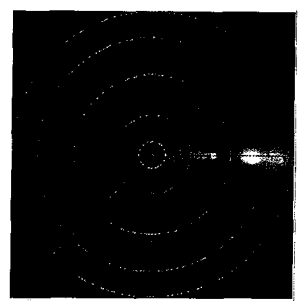
Figure 33D:
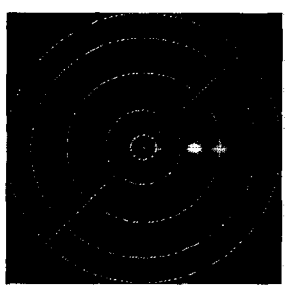
Figure 33E:
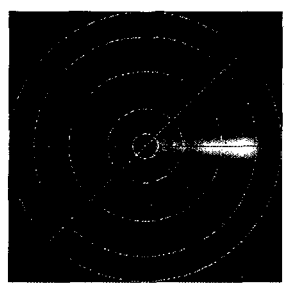
Figure 33F:
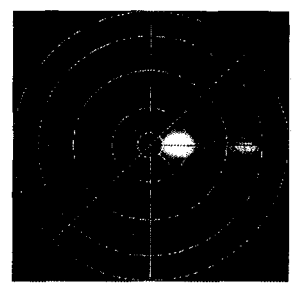
Figure 33G:
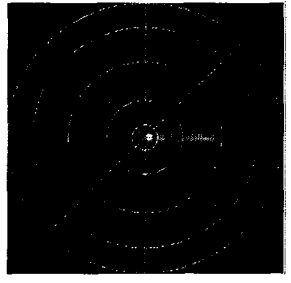
Figure 33H:
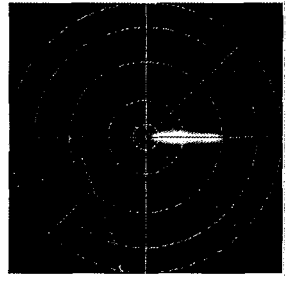
Figure 33I:
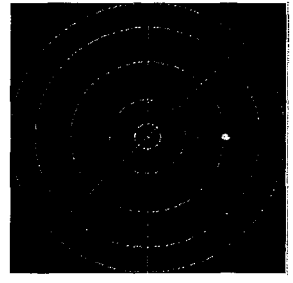
Figure 34A:
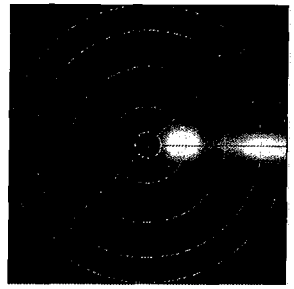
FIGS. 34(a) to 34(i) are other photographs provided to compare the light diffusion characteristics of the light diffusion films of Examples 8, Example 1, and Comparative Example 1.
Figure 34B:
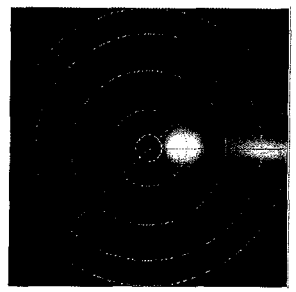
Figure 34C:
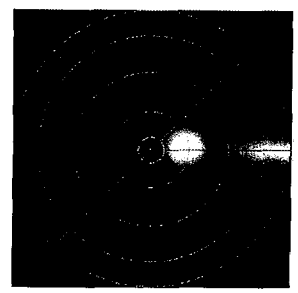
Figure 34D:
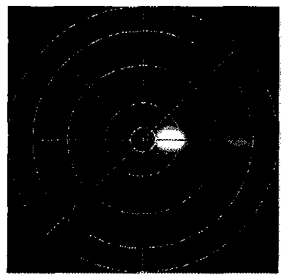
Figure 34E:
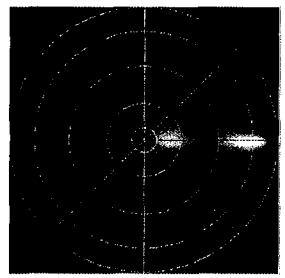
Figure 34F:
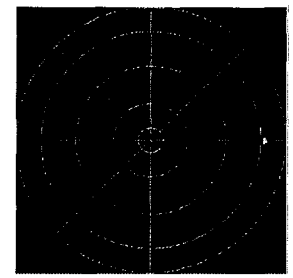
Figure 34G:
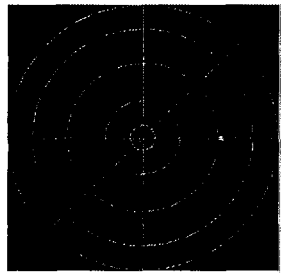
Figure 34H:
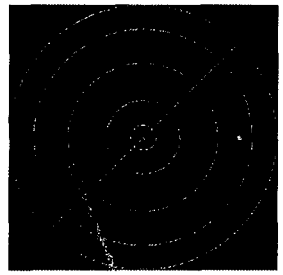
Figure 34I:
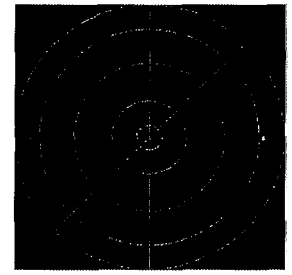

Meanwhile, FIG. 32(a) is a schematic diagram of a cross-section obtained by cutting the light diffusion film thus obtained, at a plane that is parallel to the traveling direction of the coating layer and is perpendicular to the film plane, and FIG. 32(b) is a photograph of the cross-section that has been subjected to contrast correction for the cross-section.

Furthermore, FIGS. 33(a) to 33(c) and FIGS. 34(a) to 34(c) are conoscopic images for Example 8.

Also, for a comparison, conoscopic images of Example 1 (amount of addition of component (D): 0.1 parts by weight relative to 100 parts by weight of the total amount of the component (A) and the component (B)) are presented in FIGS. 33(d) to 33(f) and FIGS. 34(d) to 34(f), and conoscopic images of Comparative Example 1 (amount of addition of component (D): 0 parts by weight) are presented in FIGS. 33(g) to 33(i) and FIGS. 34(g) to 34(i).

Example 9

In Example 9, when the coating layer was irradiated with active energy radiation, irradiated light parallelizing members formed by arranging plural plate-shaped members respectively in parallel were disposed between a linear ultraviolet lamp and the coating layer, as illustrated in FIG. 11(b), and the coating energy was irradiated with active energy radiation.

Figure 10B:
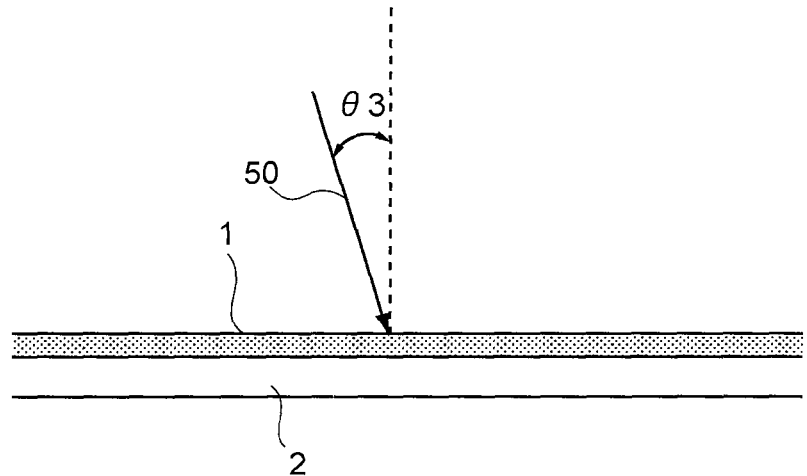

Furthermore, at this time, a light diffusion film was produced in the same manner as in Example 6, except that a light diffusion film having a film thickness of 175 μm was obtained by adjusting the irradiation angle (θ3 in FIG. 10(b)) of direct ultraviolet radiation from a linear light source to 10°, the peak illuminance to 2.7 mW/cm$^2$, and the cumulative amount of light to 53 mJ/cm$^2$, and the light diffusion film was evaluated. The results thus obtained are presented in Table 1 and FIGS. 35 to 36.

Figure 35A:
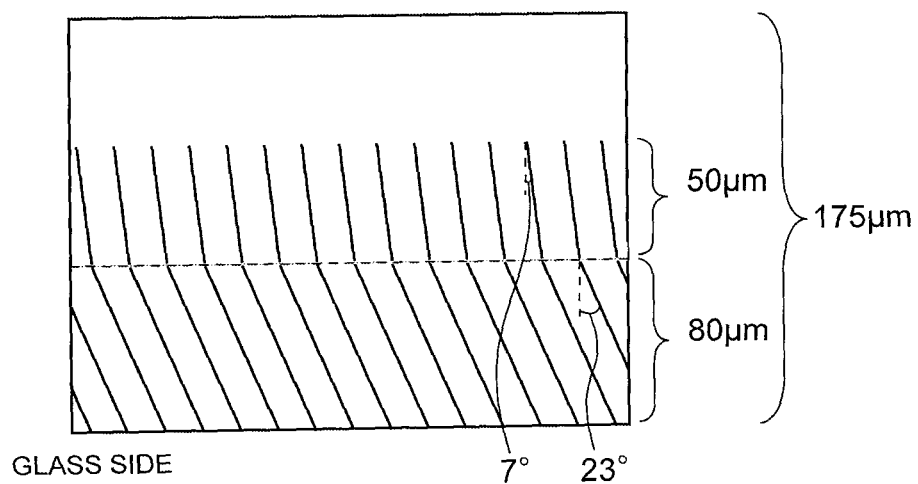
FIGS. 35(a) and 35(b) are a schematic diagram and a photograph provided to show a cross-section of the light diffusion film of Example 9.
Figure 35B:
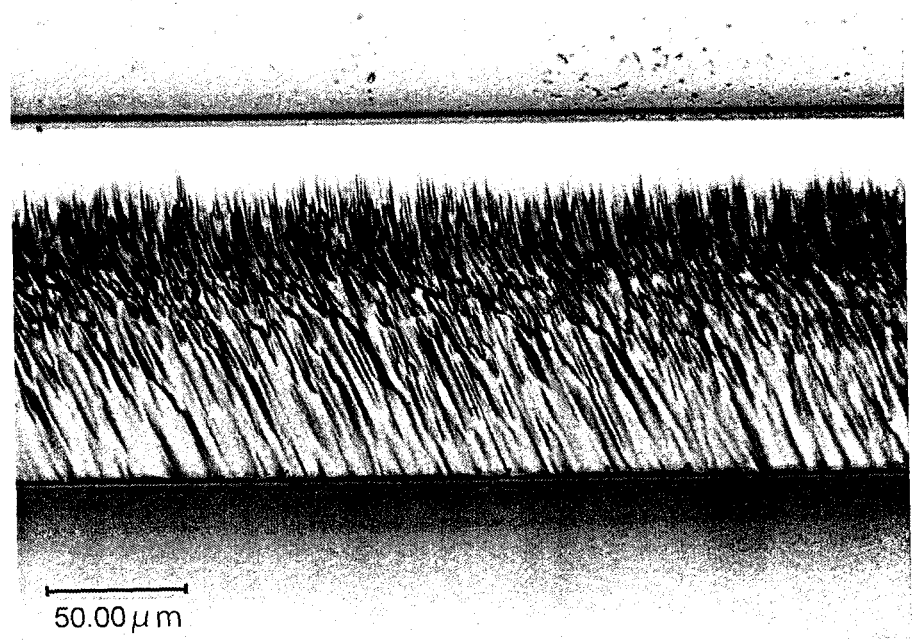
Figure 36A:
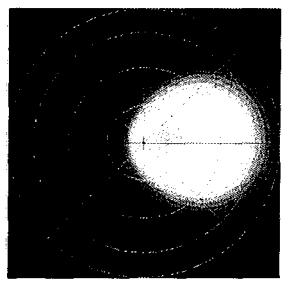
FIGS. 36(a) to 36(f) are photographs provided to compare the light diffusion characteristics of the light diffusion films of Example 9 and Comparative Example 3.
Figure 36B:
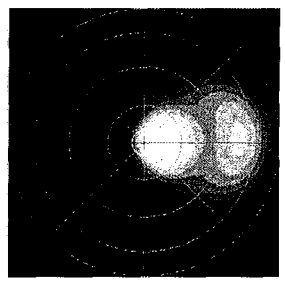
Figure 36C:
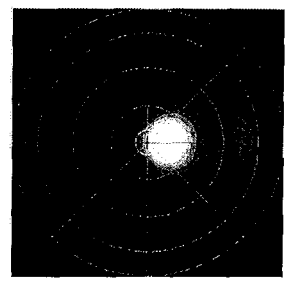
Figure 36D:
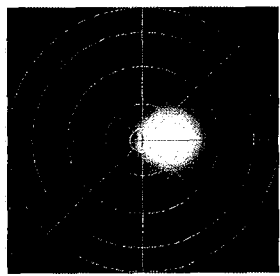
Figure 36E:
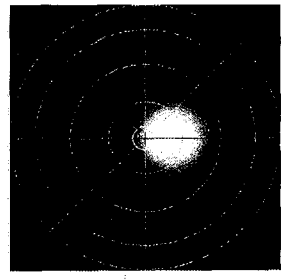
Figure 36F:
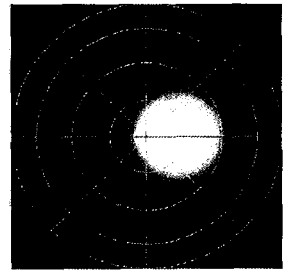
Figure 37A:
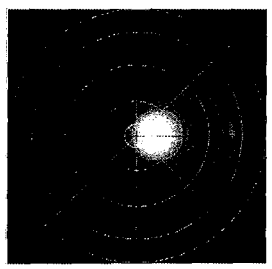
FIGS. 37(a) to 37(f) are other photographs provided to compare the light diffusion characteristics of the light diffusion films of Example 9 and Comparative Example 3.
Figure 37B:
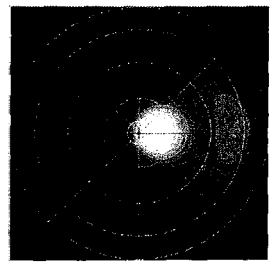
Figure 37C:
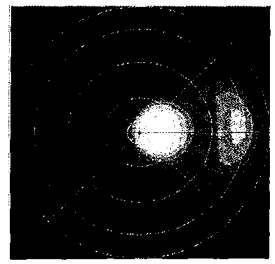
Figure 37D:
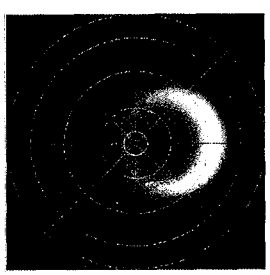
Figure 37E:
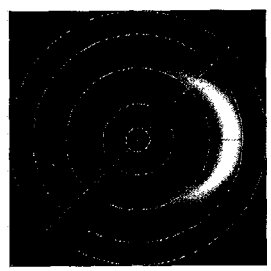
Figure 37F:
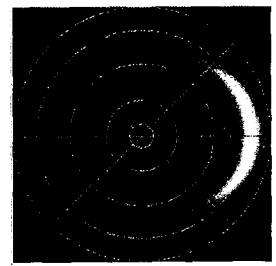

Meanwhile, FIG. 35(a) is a schematic diagram of a cross-section obtained by cutting the light diffusion film thus obtained, at a plane that is parallel to the traveling direction of the coating layer and is perpendicular to the film plane, and FIG. 35(b) is a photograph of the cross-section that has been subjected to contrast correction for the cross-section.

Furthermore, FIGS. 36(a) to 36(c) and FIGS. 37(a) to 37(c) are conoscopic images for Example 9.

Also, for a comparison, conoscopic images of Comparative Example 3 (amount of addition of component (D): 0 parts by weight) are presented in FIGS. 36(d) to 36(f) and FIGS. 37(d) to 37(f).

Comparative Example 1

In Comparative Example 1, a light diffusion film was produced in the same manner as in Example 1, except that an ultraviolet absorber as the component (D) was not added when the composition for light diffusion film was prepared, and the light diffusion film was evaluated. The results thus obtained are presented in Table 1, FIG. 38, FIGS. 17 to 19, FIGS. 23 to 25, FIGS. 28 to 30, and FIGS. 33 to 34.

Figure 38A:
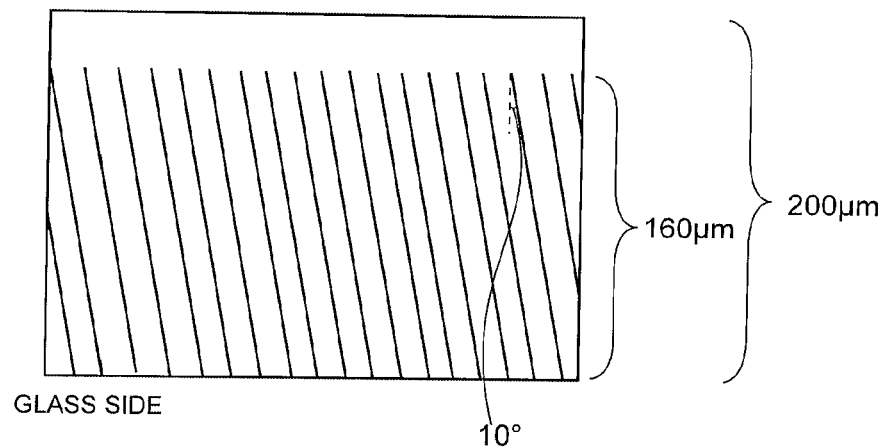
FIGS. 38(a) to 38(c) are a schematic diagram and photographs provided to show a cross-section of the light diffusion film of Comparative Example 1.
Figure 38B:
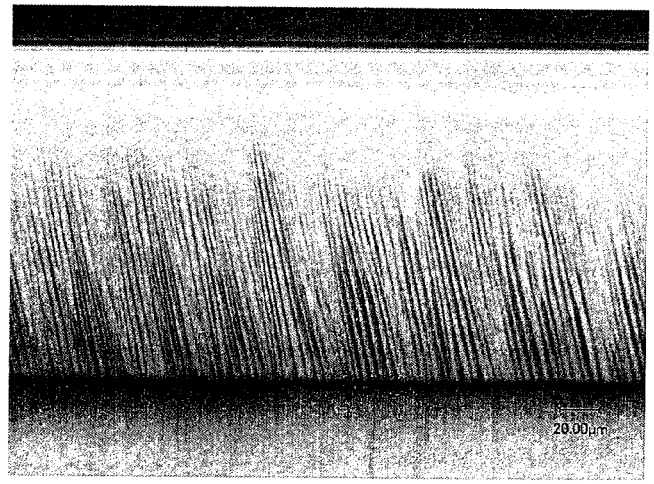
Figure 38C:
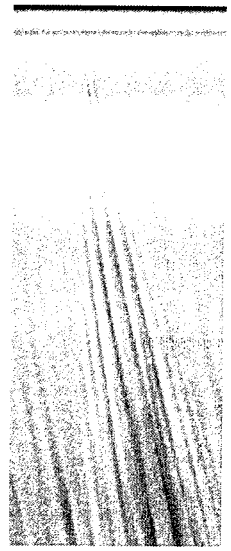

Meanwhile, FIG. 38(a) is a schematic diagram of a cross-section obtained by cutting the light diffusion film thus obtained, at a plane that is parallel to the traveling direction of the coating layer and is perpendicular to the film plane, FIG. 38(b) is a photograph of the cross-section, and FIG. 38(c) is a photograph showing a magnified view of the vicinity of the upper end of the louver structure in FIG. 38(b), which has been subjected to contrast correction.

Furthermore, FIGS. 17(j) to 17(l), FIGS. 18(j) to 18(l), FIGS. 23(g) to 23(i), FIGS. 24(g) to 24(i), FIGS. 28(g) to 28(i), FIGS. 29(g) to 29(i), FIGS. 33(g) to 33(i), FIGS. 34(g) to 34(i), and the like are conoscopic images for Comparative Example 1, and the characteristic curve D in FIG. 19, the characteristic curve C in FIG. 25, and the characteristic curve C in FIG. 30 are emission angle-luminance charts for Comparative Example 1.

Comparative Example 2

In Comparative Example 2, production of a light diffusion film was attempted in the same manner as in Example 1, except that when the composition for light diffusion film was prepared, the amount of addition of the ultraviolet absorber as the component (D) was changed to 5 parts by weight (2 parts by weight relative to the total amount (100 parts by weight) of the component (A) and the component (B)).

As a result, the film was not cured at all.

Comparative Example 3

In Comparative Example 3, a light diffusion film was produced in the same manner as in Example 9, except that an ultraviolet absorber as the component (D) was not added when the composition for light diffusion film was prepared, and the light diffusion film was evaluated. The results thus obtained are presented in Table 1, FIG. 39, and FIGS. 36 to 37.

Figure 39A:
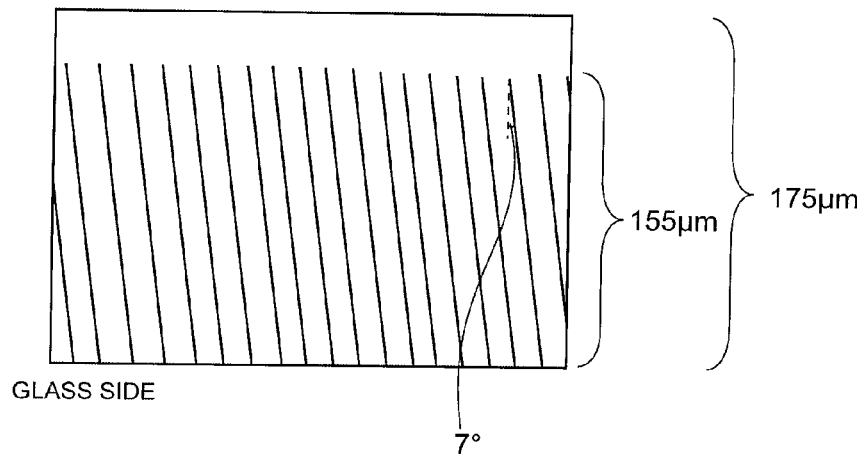
FIGS. 39(a) and 39(b) are a schematic diagram and a photograph provided to show a cross-section of the light diffusion film of Comparative Example 3.
Figure 39B:
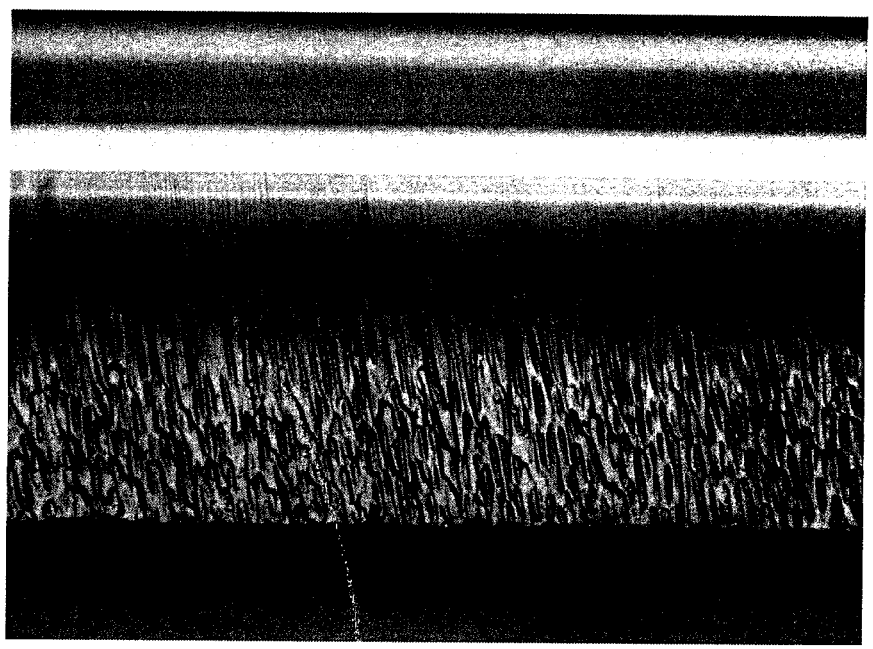

Meanwhile, FIG. 39(a) is a schematic diagram of a cross-section obtained by cutting the light diffusion film thus obtained, at a plane that is parallel to the traveling direction of the coating layer and is perpendicular to the film plane, and FIG. 39(b) is a photograph of the cross-section that has been subjected to contrast correction for the cross-section.

Furthermore, FIGS. 36(d) to 36(f) and FIGS. 37(d) to 37(f) are conoscopic images for Comparative Example 3.

Comparative Example 4

In Comparative Example 4, a light diffusion film was produced in the same manner as in Comparative Example 1, except that when the coating layer was irradiated with active energy radiation, a band pass filter having a characteristic of transmitting only an ultraviolet radiation having a wavelength of near 370 nm (manufactured by Edmund Optics, Inc., B-370) was disposed between a linear ultraviolet lamp and the coating layer, and the coating layer was irradiated with active energy radiation, and the light diffusion film was evaluated. The results thus obtained are presented in Table 1 and FIGS. 40 to 42.

Figure 40A:
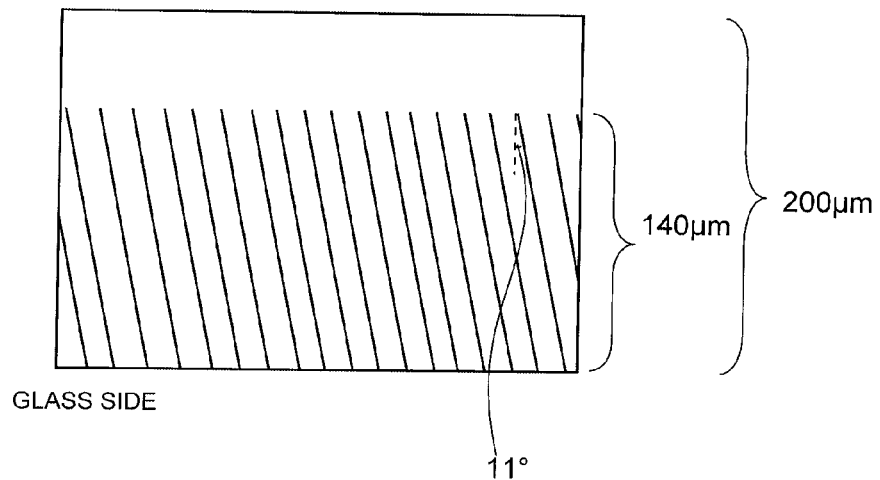
FIGS. 40(a) and 40(b) are a schematic diagram and a photograph provided to show a cross-section of the light diffusion film of Comparative Example 4.
Figure 40B:
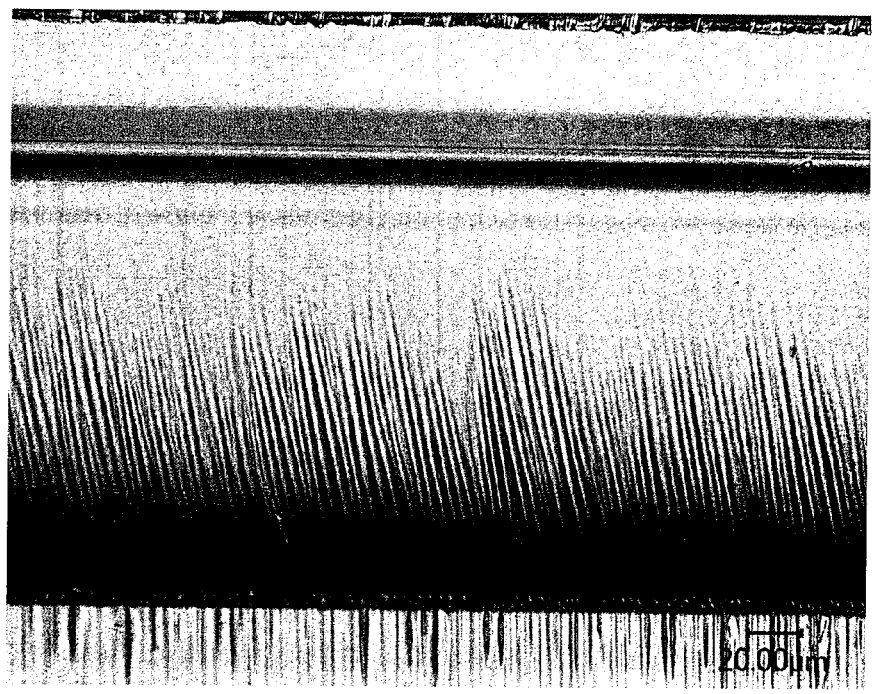
Figure 41A:
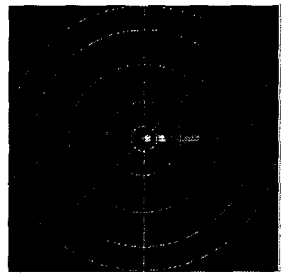
FIGS. 41(a) to 41(i) are photographs provided to compare the light diffusion characteristics of the light diffusion films of Comparative Example 4, Example 1, and Comparative Example 1.
Figure 41B:
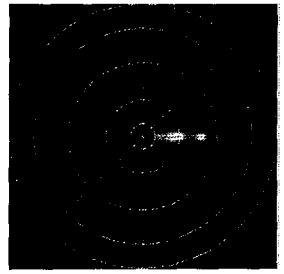
Figure 41C:
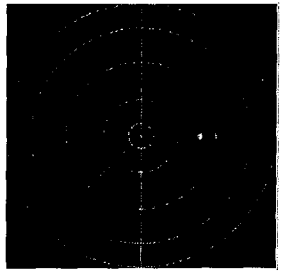
Figure 41D:
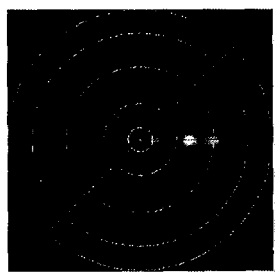
Figure 41E:
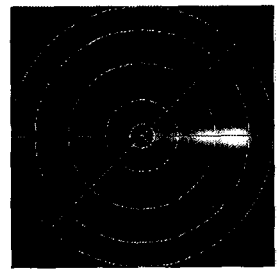
Figure 41F:
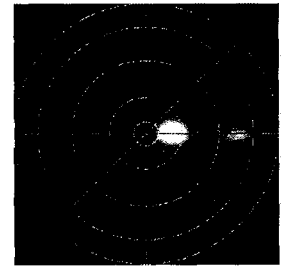
Figure 41G:
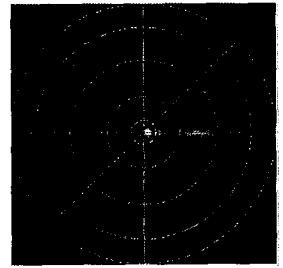
Figure 41H:
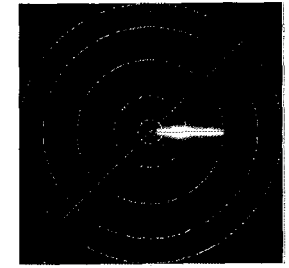
Figure 41I:
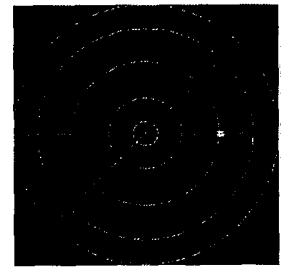
Figure 42A:
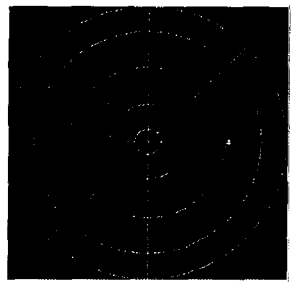
FIGS. 42(a) to 42(i) are photographs provided to compare the light diffusion characteristics of the light diffusion films of Comparative Example 4, Example 1, and Comparative Example 1.
Figure 42B:
Figure 42C:
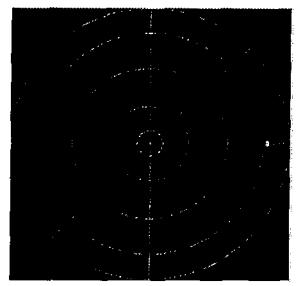
Figure 42D:
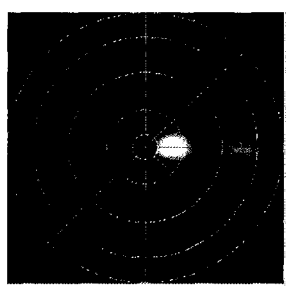
Figure 42E:
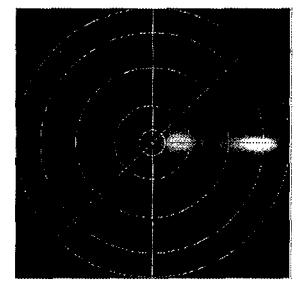
Figure 42F:
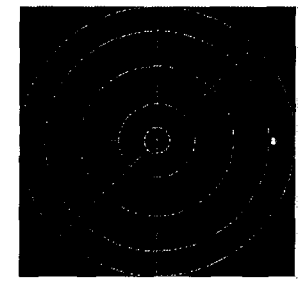
Figure 42G:
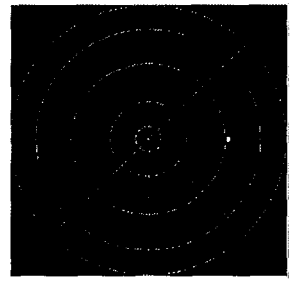
Figure 42H:
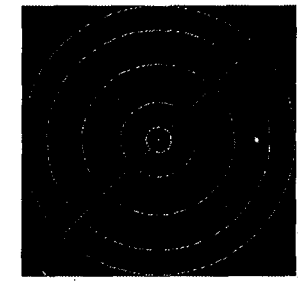
Figure 42I:
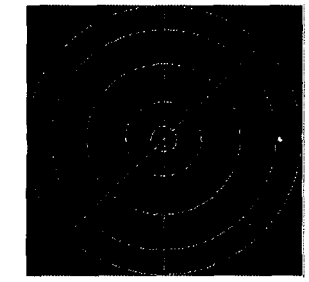

Meanwhile, FIG. 40(a) is a schematic diagram of a cross-section obtained by cutting the light diffusion film thus obtained, at a plane that is parallel to the traveling direction of the coating layer and is perpendicular to the film plane, and FIG. 40(b) is a photograph of the cross-section.

Furthermore, FIGS. 41(a) to 41(c) and FIGS. 42(a) to 42(c) are conoscopic images for Comparative Example 4.

Also, for a comparison, conoscopic images of Example 1 (amount of addition of component (D): 0.1 parts by weight relative to 100 parts by weight of the total amount of the component (A) and the component (B)) are presented in FIGS. 41(d) to 41(f) and FIGS. 42(d) to 42(f), and conoscopic images of Comparative Example 1 (amount of addition of component (D): 0 parts by weight) are presented in FIGS. 41(g) to 41(i) and FIGS. 42(g) to 42(i).

Figure 43:
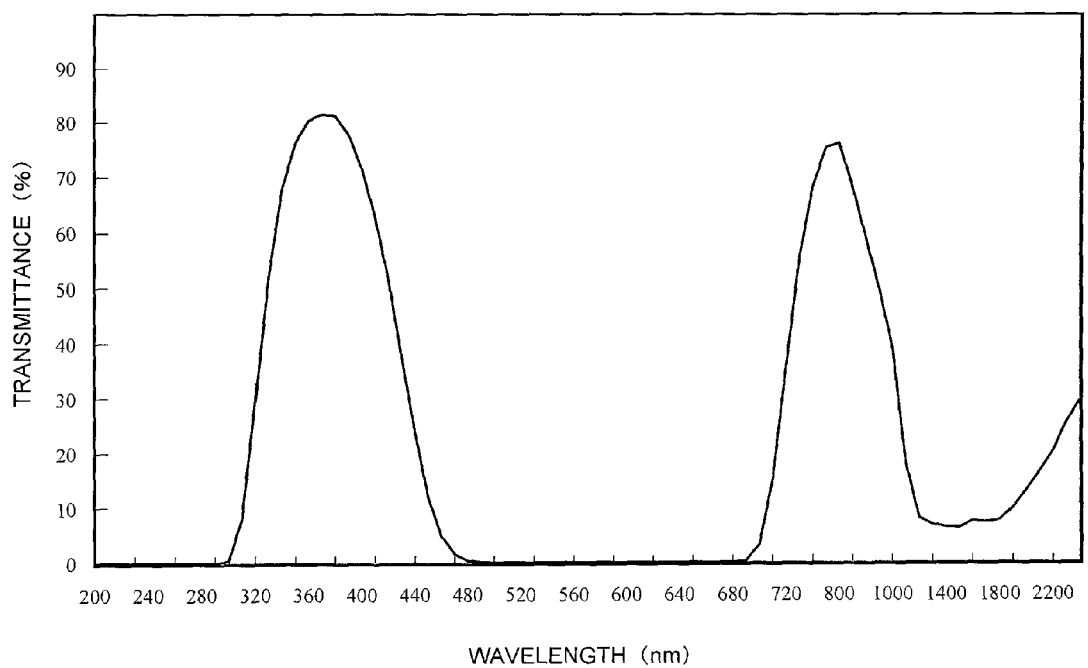
FIG. 43 is a diagram provided to show a wavelength-transmittance chart for a band pass filter.

Furthermore, a wavelength-transmittance chart showing the light transmission characteristics of the band pass filter used is presented in FIG. 43.

Comparative Example 5

In Comparative Example 5, a light diffusion film was produced in the same manner as in Example 1, except that when the coating layer was irradiated with active energy radiation, a band pass filter having a characteristic of transmitting only an ultraviolet radiation having a wavelength of near 370 nm (manufactured by Edmund Optics, Inc., B-370) was disposed between a linear ultraviolet lamp and the coating layer, and the coating layer was irradiated with active energy radiation.

Figure 44:
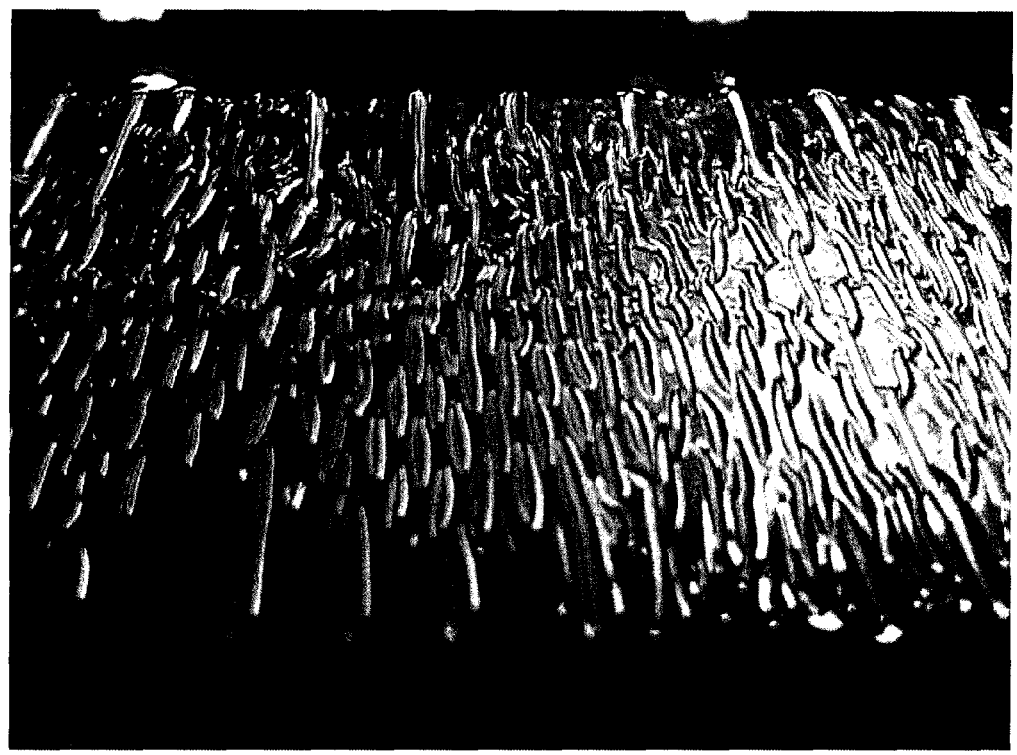
FIG. 44 is a photograph provided to explain the appearance of the light diffusion film of Comparative Example 5.

As a result, as illustrated in FIG. 44, only the surface of the film was cured, and contraction wrinkles were generated.

TABLE 1

| | Composition for light diffusion film Ultraviolet absorber | | Temperature of | Use of band | Internal structure |
|---|---|---|---|---|---|
| | Kind | Amount of addition | coating layer (° C.) | pass filter | formed |
| Example 1 | TINUVIN 477 | 0.25 (*0.1) | 23 | No | Bent louver structure |
| Example 2 | | 0.167 (0.067) | | | |
| Example 3 | | 0.083 (0.033) | | | |
| Example 4 | TINUVIN 400 | 1.5 (0.6) | | | |

TABLE 1-continued

| | Composition for light diffusion film Ultraviolet absorber | | Temperature of coating layer (° C.) | Use of band pass filter | Internal structure formed |
|---|---|---|---|---|---|
| | Kind | Amount of addition | | | |
| Example 5 | | 0.75 (0.3) | | | |
| Example 6 | TINUVIN 384-2 | 0.5 (0.2) | | | |
| Example 7 | | 0.25 (0.1) | | | |
| Example 8 | TINUVIN 477 | 0.25 (0.1) | 5 | | |
| Example 9 | | 0.5 (0.2) | 23 | | Bent columnar structure |
| Comparative Example 1 | — | 0 (0) | | | Louver structure |
| Comparative Example 2 | TINUVIN 477 | 5 (2) | | | *— |
| Comparative Example 3 | — | 0 (0) | | Yes | Columnar structure |
| Comparative Example 4 | — | 0 (0) | | | Louver structure |
| Comparative Example 5 | TINUVIN 477 | 0.25 (0.1) | | | *— |

*The values within parentheses represent the amounts of addition (parts by weight) of the component (D) relative to the total amount (100 parts by weight) of the component (A) and the component (B).
*In Comparative Example 2, even if active energy radiation was irradiated, the coating layer was not cured, and a film could not be obtained.
*In Comparative Example 5, only the surface of the film was cured, contraction wrinkles were generated, and a film could not be obtained.

It is understood from Examples 1 to 9 and Comparative Examples 1 to 3 described above that when an ultraviolet absorber is added to a predetermined composition for light diffusion film to a predetermined extent, a predetermined louver structure composed of plate-shaped regions having a bent portion, or the like can be formed, and a light diffusion film in which the angle of aperture of diffusion light has been expanded effectively is obtained.

Furthermore, it is understood from Comparative Examples 4 and 5 that when ultraviolet radiation was irradiated using a band pass filter, a predetermined louver structure including plate-shaped regions having a bending may not be formed.

INDUSTRIAL APPLICABILITY

As described above, according to the present invention, when a (meth)acrylic acid ester having a particular structure, a urethane (meth)acrylate, a photopolymerization initiator, and an ultraviolet absorber are blended at predetermined proportions, and then the mixture is photocured, a light diffusion film in which the angle of aperture of diffused light has been expanded effectively can be obtained.

Therefore, a light diffusion film obtainable using the composition for light diffusion film of the present invention can be applied to light controlling films for reflective type liquid crystal display devices, as well as viewing angle control films, viewing angle expansion films, and projection screens, and the light diffusion film is expected to contribute significantly to quality enhancement of these applications.

EXPLANATIONS OF LETTERS OR NUMERALS

1: Coating layer, 2: process sheet, 10: anisotropic light diffusion film, 10': anisotropic light diffusion film having a bent louver structure, 12: plate-shaped region having a relatively high refractive index, 13: louver structure, 13': bent louver structure, 13a: boundary surface of louver structure, 14: plate-shaped region having a relatively low refractive index, 20: isotropic light diffusion film, 20': isotropic light diffusion film having a bent columnar structure, 22: pillar-shaped object having a relatively high refractive index, 23: columnar structure, 23': bent columnar structure, 23a: boundary surface of columnar structure, 24: region having a relatively low refractive index, 50: irradiated light from a light source, 60: parallel light, 120: ultraviolet irradiating apparatus, 122: cold mirror, 123: light blocking plate, 125: linear light source, 200: irradiated light parallelizing member, 202: point light source, 204: lens, 210: light blocking member, 210a: plate-shaped member, 210b: cylindrical member

The invention claimed is:

1. A composition for light diffusion film, for obtaining a light diffusion film, which contains an internal structure including plural regions having a relatively high refractive index in a region having a relatively low refractive index within the film and in which the plural regions having a relatively high refractive index are bent at an intermediate point along the film thickness direction,
   the composition for light diffusion film comprising a (meth)acrylic acid ester containing plural aromatic rings as component (A), a urethane (meth)acrylate as component (B), a photopolymerization initiator as component (C), and an ultraviolet absorber as component (D),
   wherein a content of the component (A) is adjusted to a value within a range of 25 parts to 400 parts by weight relative to 100 parts by weight of the component (B),
   a content of the component (C) is adjusted to a value within a range of 0.2 parts to 20 parts by weight relative to the total amount, taken as 100 parts by weight, of the component (A) and the component (B), and
   a content of the component (D) is adjusted to a value of below 2 parts by weight relative to the total amount, taken as 100 parts by weight, of the component (A) and the component (B).

2. The composition for light diffusion film according to claim 1, wherein the component (D) has an absorption peak for light having a wavelength of 330 to 380 nm.

3. The composition for light diffusion film according to claim 1, wherein the component (D) is at least one selected from the group consisting of a hydroxyphenyltriazine-based ultraviolet absorber, a benzotriazole-based ultraviolet absorber, a benzophenone-based ultraviolet absorber, and a hydroxybenzoate-based ultraviolet absorber.

4. The composition for light diffusion film according to claim 1, wherein the component (A) is represented by the following Formula (1):

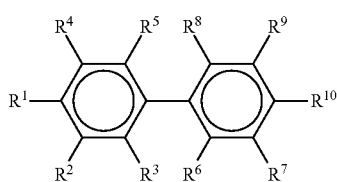

wherein in Formula (1), $R^1$ to $R^{10}$ are respectively independent of one another; and at least one of $R^1$ to $R^{10}$ represents a substituent represented by the following Formula (2), while the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom;

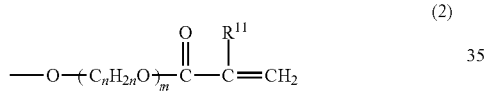

wherein in Formula (2), $R^{11}$ represents a hydrogen atom or a methyl group; a number of carbon atoms n represents an integer from 1 to 4; and a number of repetitions m represents an integer from 1 to 10.

5. The composition for light diffusion film according to claim 4, wherein in Formula (1), any one of $R^2$ to $R^9$ represents a substituent represented by the above Formula (2).

6. The composition for light diffusion film according to claim 1, wherein the component (B) is a urethane (meth) acrylate which has a weight average molecular weight value within a range of 3,000 to 20,000, has constituent components derived from the following components (B1) to (B3), (B1) a compound containing two isocyanate groups via an aliphatic ring;

(B2) a polyalkylene glycol; and (B3) a hydroxyalkyl (meth)acrylate, and is composed at a molar ratio of component (B1): component (B2):component (B3)=1 to 5:1:1 to 5.

7. A light diffusion film which contains an internal structure including plural regions having a relatively high refractive index in a region having a relatively low refractive index within the film, in which the plural regions having a relatively high refractive index are bent at an intermediate point along the film thickness, the light diffusion film being formed by irradiating a composition for light diffusion film with active energy radiation, and the composition for light diffusion film including a (meth) acrylic acid ester containing plural aromatic rings as component (A); a urethane (meth)acrylate as component (B); a photopolymerization initiator as component (C); and an ultraviolet absorber as component (D), wherein a content of the component (A) is adjusted to a value within a range of 25 parts to 400 parts by weight relative to 100 parts by weight of the component (B), a content of the component (C) is adjusted to a value within a range of 0.2 parts to 20 parts by weight relative to the total amount, taken as 100 parts by weight, of the component (A) and the component (B), and a content of the component (D) is adjusted to a value of below 2 parts by weight relative to the total amount, taken as 100 parts by weight, of the component (A) and the component (B).

* * * * *